(12) United States Patent
Shinjo et al.

(10) Patent No.: US 8,250,089 B2
(45) Date of Patent: Aug. 21, 2012

(54) BIT STRING SEARCH APPARATUS, SEARCH METHOD, AND PROGRAM

(75) Inventors: Toshio Shinjo, Chiba (JP); Mitsuhiro Kokubun, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 57 days.

(21) Appl. No.: 12/659,562

(22) Filed: Mar. 12, 2010

(65) Prior Publication Data

US 2010/0174742 A1    Jul. 8, 2010

Related U.S. Application Data

(63) Continuation of application No. PCT/JP2008/002362, filed on Aug. 28, 2008.

(30) Foreign Application Priority Data

Sep. 14, 2007   (JP) ................. 2007-240177

(51) Int. Cl.
G06F 7/00 (2006.01)
G06F 17/30 (2006.01)
(52) U.S. Cl. ......... 707/769; 707/758; 707/803; 707/812
(58) Field of Classification Search .............. 707/769, 707/758, 803, 812
See application file for complete search history.

(56) References Cited

U.S. PATENT DOCUMENTS 6,675,163 B1 *   1/2004   Bass et al. .................. 1/1

FOREIGN PATENT DOCUMENTS

| JP | 2001-202277 A | 7/2001 |
|---|---|---|
| JP | 2001-357070 A | 12/2001 |
| JP | 2003-224581 A | 8/2003 |
| WO | WO-2008/065735 A1 | 10/2007 |
| WO | WO-2008/090588 A1 | 10/2007 |
| WO | WO-2008/004335 A1 | 1/2008 |
| WO | WO-2008/053583 A1 | 5/2008 |

OTHER PUBLICATIONS

Nilsson et al., "IP-Address Lookup Using LC-Tries", IEEE Journal on Selected Areas in Communications, IEEE Service Center, Piscataway, US, vol. 17, No. 6, Jun. 1, 1999, pp. 1083-1092.
Ruiz-Sanchez et al., "Survey and Taxonomy of IP Address Lookup Algorithms", IEEE Network, IEEE Service Center, New York, NY, US, vol. 15, No. 2, Mar. 1, 2001, pp. 8-23.
Sklower, "A Tree-based Packet Routing Table for Berleley Unix", Proceedings of the Usenix CC++, Berkeley, CA, US, Jan. 21, 1991, pp. 93-103.

(Continued)

*Primary Examiner* — John E Breene
*Assistant Examiner* — Joshua Bullock
(74) *Attorney, Agent, or Firm* — Rader, Fishman & Grauer PLLC

(57) ABSTRACT

To provide a method that lessens the reduction in efficiency of processing using a coupled node tree even if the scale of the coupled node tree grows large. Is stored a termination node, whose discrimination bit position has a value smaller than 0, in a search path stack that holds the search history while successively storing therein branch nodes that have been traversed in the search path. The coupled node indicator of the stored branch node is converted to a value wherein a 1 is added if the link target is node [1].

45 Claims, 63 Drawing Sheets

OTHER PUBLICATIONS

Supplemental European Search Report from European Patent Office for application No. 08790516.2-2201 dated Aug. 10, 2011.

Susumu Yata et al., "Patricai Try ni Taisuru Kanketsu na Hairetsu Hyogen", vol. 107, No. 127, pp. 101-106, IEICE Technical Report, (Jun. 22, 2007).

"Patorishia Tsuri (Patricia Tree)", vol. 11, No. 2, pp. 337-339, Journal of Japanese Society for Artificial Intelligence (Mar. 1, 1996).

International Search Report mailed on Oct. 7, 2008.

Li, et al., "Stateful Inspection Firewall Session Table Processing", School of Computer Science and Technology, Harbin Institute of Technology, International Journal of Information Technology, vol. 11, No. 2, 2005, pp. 21-30.

* cited by examiner (a) PROCESSING SOURCE (2)

(3)

(b) PROCESSING TARGET (a) PROCESSING SOURCE (b) PROCESSING TARGET

BIT STRING SEARCH APPARATUS, SEARCH METHOD, AND PROGRAM

CROSS-REFERENCE TO RELATED APPLICATIONS

This application is a continuation of PCT/JP2008/002362 filed on Aug. 28, 2008, and is based and claims the benefit of priority of the prior Japanese Patent Application No. 2007-240177, filed on Sep. 14, 2007, the entire contents of which are incorporated herein by reference. The contents of PCT/JP2008/002362 are incorporated herein by reference in their entity.

BACKGROUND OF THE INVENTION

1. Field of the Invention

The present invention relates to a search apparatus, method, and program for searching for a desired bit string from a set of bit strings, and more particularly to the field of art intending to improve search speeds and others by devising an innovative data configuration for storing bit strings.

2. Description of Related Art

In recent years, with advancements in information-based societies, large-scale databases have come to be used in various places.

To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database.

In order to perform the above-noted searching for bit strings at high speed, conventional art makes various refinements on the data structure in which bit strings are stored. One of these is a tree structure known as a Patricia tree.

FIG. 1 describes an example of a Patricia tree used for search processing in the above-noted conventional art. A node of a Patricia tree is formed to include an index key, a test bit position for a search key, and right and left link pointers. Although it is not explicitly described, a node of course includes information for the purpose of accessing a record corresponding to the index key.

In the example described in FIG. 1, the node 1750a that holds the index key "100010", is a root node, the test bit position 1730a of which is 0. The node 1750b is connected to the left link 1740a of the node 1750a, and the node 1750f is connected to the right link 1741a.

The index key held by the node 1750b is "010011", and the test bit position 1730b is 1. The node 1750c is connected to the left link 1740b of the node 1750b, and the node 1750d is connected to the right link 1741b of the node 1750b. The index key held by the node 1750c is "000111", and the test bit position is 3. The index key held by the node 1750d is "011010", and the test bit position is 2.

The parts connected to the node 1750c by solid lines show the right and left link pointers of the node 1750c, and the left pointer 1740c that is not connected by the dotted line indicates that that field is blank. The dotted line connection destination of the right pointer 1741c that is connected by a dotted line expresses the address indicated by the pointer, and in this case this indicates that the right pointer points to the node 1750c.

The right pointer 1741d of the node 1750d points to the node 1750d itself, and the node 1750e is connected to the left link 1740d. The index key held by 1750e is "010010", and the test bit position is 5. The left pointer 1740e of the node 1750e points to the node 1750b, and the right pointer 1741e points to the node 1750e.

The index key held by the node 1750f is "101011", and the test bit position 1730f is 2. The node 1750g is connected to the left link 1740f of the node 1750f and the node 1750h is connected to the right link 1741f.

The index key held by the node 1750g is "100011", and the test bit position 1730g is 5. The left pointer 1740g of the node 1750g points to the node 1750a, and the right pointer 1741g points to the node 1750g.

The index key held by the node 1750h is "101100", and the test bit position 1730h is 3. The left pointer 1740h of the node 1750h points to the node 1750f, and the right pointer 1741h points to the node 1750h.

In the example of FIG. 1, the configuration is such that, as the tree is traversed downward from the root node 1750a the test bit position of successive nodes increases.

When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0. Unless the test bit position of a link target node is larger than the bit position of the link origin node, that is, if the link target is not below but rather returns upward (the returning links described by the dotted lines in FIG. 1 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, the delay in the search processing by comparison with an index key for the first time by returning by a back link, and the difficulty of data maintenance such as adding and deleting a node.

Art such as disclosed in the patent document 1 below exists as an attempt to solve these problems of the Patricia tree. In the Patricia tree described in the patent document 1 below, in addition to reducing the storage capacity for pointers by storing the lower level left and right nodes in contiguous regions, the back link decision processing is reduced by providing a bit at each node that indicates whether the next link is or is not a back link.

Even in the art disclosed in the patent document 1 below, however, because one node always occupies an index key region and a pointer region, and because there is one pointer by storing lower level left and right nodes in contiguous regions, there is not that great an effect of reducing the storage capacity, for example, it being necessary to assign the same capacity to the left pointer 1740c and the right pointer 1741h, which are lowermost parts in FIG. 1. In addition, there is no improvement of the problem of delay in search processing caused by back links, and the difficulty of adding and deleting a node.

Patent Document 1: Japanese Published Patent Application 2001-357070

SUMMARY OF THE INVENTION

In order to solve the above-described problems with conventional searching methods of the past, the applicant, in Japanese Patent Application 2006-187827 proposed a coupled node tree that is a tree used for bit string searching formed by a root node and a node pair that is a branch node and a leaf node, or branch nodes, or leaf nodes disposed in adjacent memory storage areas, wherein the root node is a node that expresses a starting point of the tree and which is a leaf node when there is one node in the tree and a branch node when there are two or more nodes in the tree, the branch node including a discrimination bit position in a search key for performing bit string searching and position information indicating a position of one node of a node pair of a link target, and the leaf node including an index key that is a bit string that is the target of a search.

The above-noted patent application shows, among other things, basic searching methods using a coupled node tree, such as a method for generating a coupled node tree from a given set of index keys, and a basic method for searching for a single index key from a coupled node tree.

Searching for a bit string includes various requests, such as the determining of a minimum value or a maximum value, or determining values within a given range. Given this, the applicant, in Japanese Patent Application 2006-293619, proposed, among other things, a method for determining the minimum/maximum value of an index key included in an arbitrary subtree of a coupled node tree.

In addition, the applicant proposed a method for splitting and conjoining coupled node trees in Japanese Patent Application 2006-319407.

The search methods proposed in the above three patent applications are based on operations of traversing successively branch nodes from a search start node to a leaf node and obtaining an index key stored in the leaf node, and the position information of nodes on the path from the search start node until the leaf node is stored in a stack as the search history. In some of the processing references are also made to nodes stored in the position pointed to by position information stored in the stack.

If the coupled node tree is stored in an array, an array element number in that array can be used as the position information and the number of bits expressing that position information can be reduced.

In addition, the applicant also proposed a processing efficiency improvement by storing in the stack a discrimination bit position of a branch node in a search path in Japanese Patent Application 2007-13211.

Since there is a trend for databases to grow immensely in the future, ever more efficient database processing is being demanded. Thus the purpose of this invention is to provide methods enabling even faster processing of various searches using a coupled node tree.

In accordance with one preferred embodiment of this invention, in the various search processing of basic searches or searches for maximum or minimum values and such using coupled node trees, the branch nodes encountered on a search path are stored in a search path stack holding the search history.

Also, in accordance with another embodiment of this invention, a termination node with a discrimination bit position smaller than 0 is stored first in a search path stack as a virtual branch node.

In accordance with this invention, when the contents of a branch node traversed in the search process are needed, those contents can be obtained from the search path stack that holds the history of the search and, even if the size of the coupled node tree increases, the probability of cache misses can be reduced and high speed search processing can be projected.

DESCRIPTION OF THE PREFERRED EMBODIMENTS

First, the coupled node tree premised in this invention and proposed by this applicant previously in the above cited applications is described using an example of storing a coupled node tree in an array. Although it is possible to use address information in a storage device as the data indicating the position of a link target held by a branch node, by using an array formed by array elements that can store a larger storage capacity area occupied by branch nodes and leaf nodes, it is possible to express the node position as an array element number, enabling a reduction of the amount of position information.

Figure 2A:
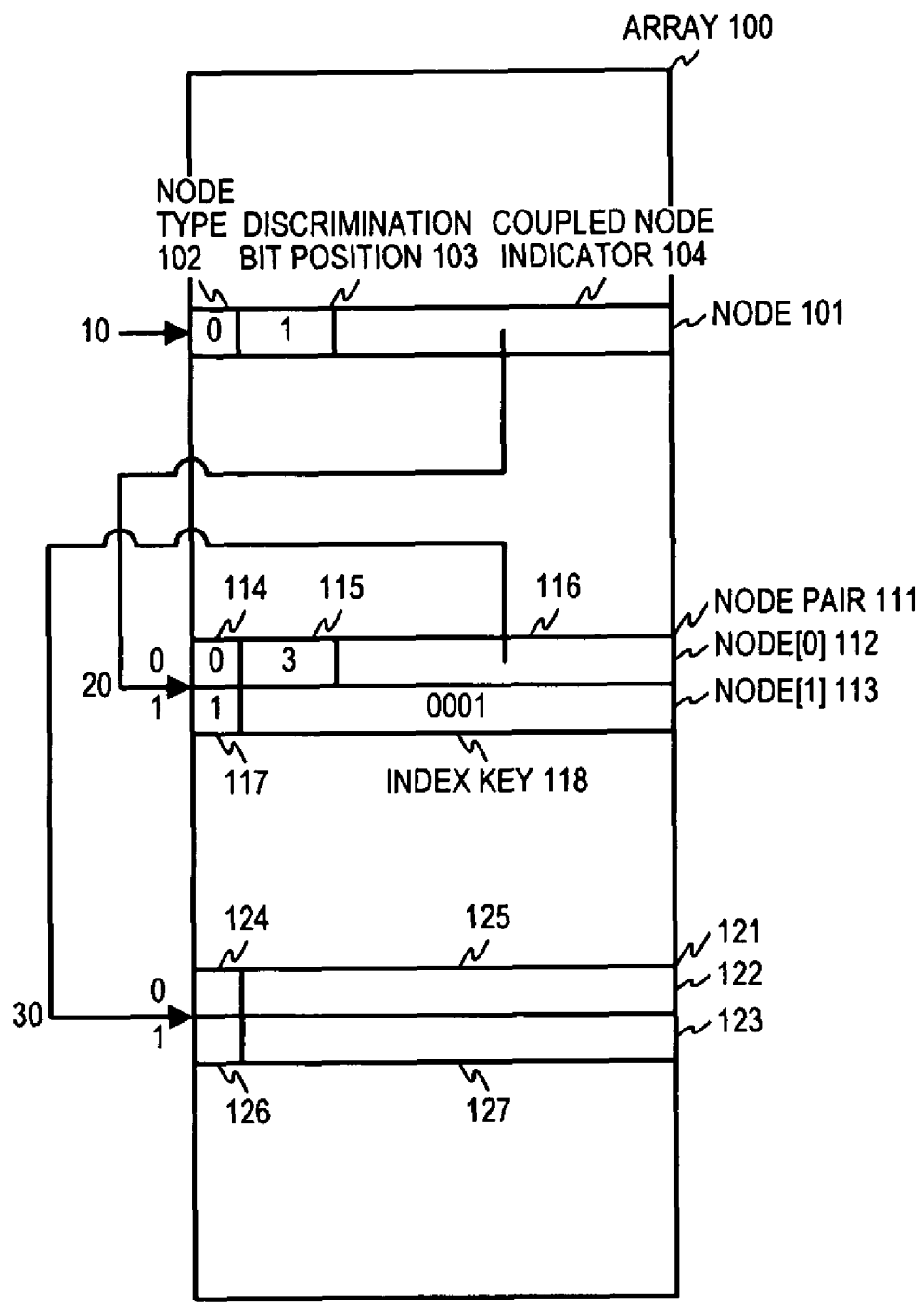
FIG. 2A is a drawing describing an exemplary configuration of a coupled node tree stored in an array.

FIG. 2A is a drawing that describes an exemplary configuration of a coupled node tree that is stored in an array.

Referring to FIG. 2, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0] 112, which is the primary node of the node pair 111. The node [1] 113 forming a pair with the primary node is stored into the next, adjacent, array element (array element number 20+1). The value 0 is stored in the node type 114 of the node [0] 112, the value 3 is stored in the discrimination bit position 115, and the value 30 is stored in the coupled node indicator 116. The value 1 is stored in the node type 117 of the node [1] 113, thereby indicating that the node [1] 113 is a leaf node. The value "0001" is stored in the index key 118. In the same manner as in a Patricia tree described above, although information for accessing a record corresponding to an index key is of course included in a leaf node, this is omitted from the notation.

Primary nodes are indicated as the node [0], and nodes that are paired therewith are indicated as the node [1]. Also the node stored in an array element with some array element number is called the node of that array element number and the array element number stored in the array element of that node is also called the array element number of the node.

The codes "0" and "1" prefixed to node [0] 112 and node [1] 113 are a node position that expresses which array element in the node pair holds that node. For example, by storing the contents of node [0] in the array element in the array with an even array element number, and the like, the node position can be determined from the array element number. Thus, in such a case, if the array element number is an even number the node position of the node with that array element number is "0", and if the array element number is an odd number the node position of the node with that array element number is "1".

The contents of the node pair 121 formed by the node 122 and the node 123 that are stored in the array elements having array element numbers 30 and 31 are not shown.

The node position 0 or 1 that is appended respectively to the array elements stored in the node [0] 112, the node [1] 113, the node 122, and the node 123 can be thought to indicate to which node of the node pair linking is to be done when performing a search using a search key. Linking is done to the appropriate node of the node pair specified by the coupled node indicator using, as node position, the 0 or 1 that is the bit value of the search key at the discrimination bit position of the immediately previous branch node.

Therefore, by adding the bit value of the discrimination bit position of the search key to the coupled node indicator of the immediately previous branch node, it is possible to determine the array element number of an array element storing a node at the link target.

Although in the above-noted example the smaller of the array element numbers at which the node pair is located is used as the coupled node indicator, it will be understood that it is also possible to use the larger of the array element numbers in the same manner.

Figure 1:
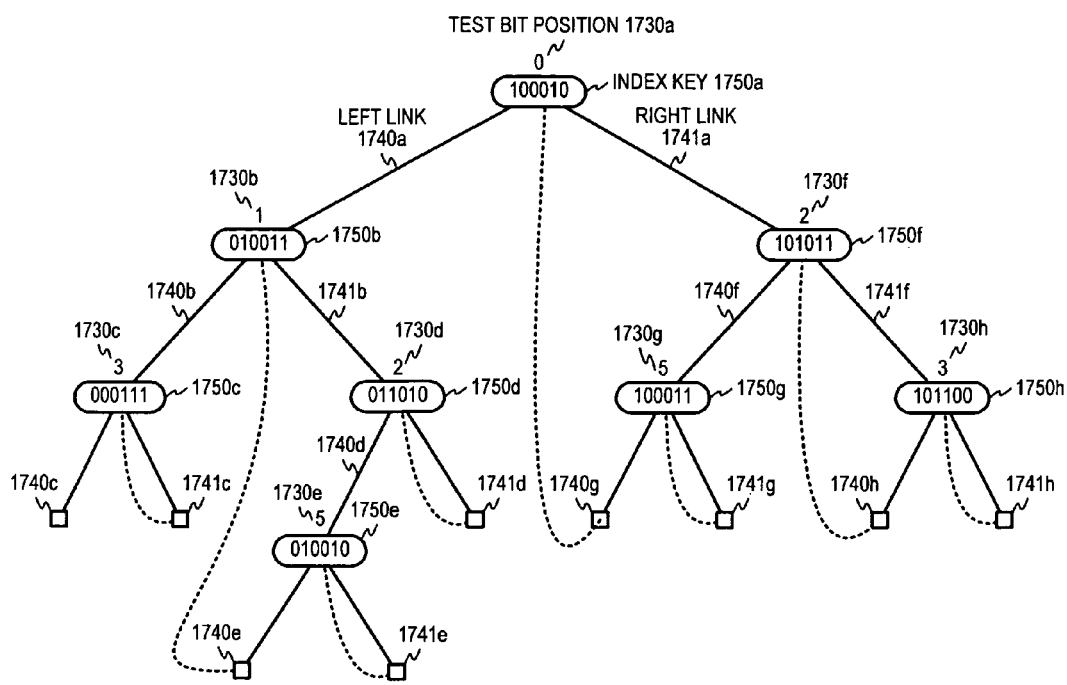
FIG. 1 is a drawing showing an example of a Patricia tree used in searching in the conventional art.
Figure 2B:
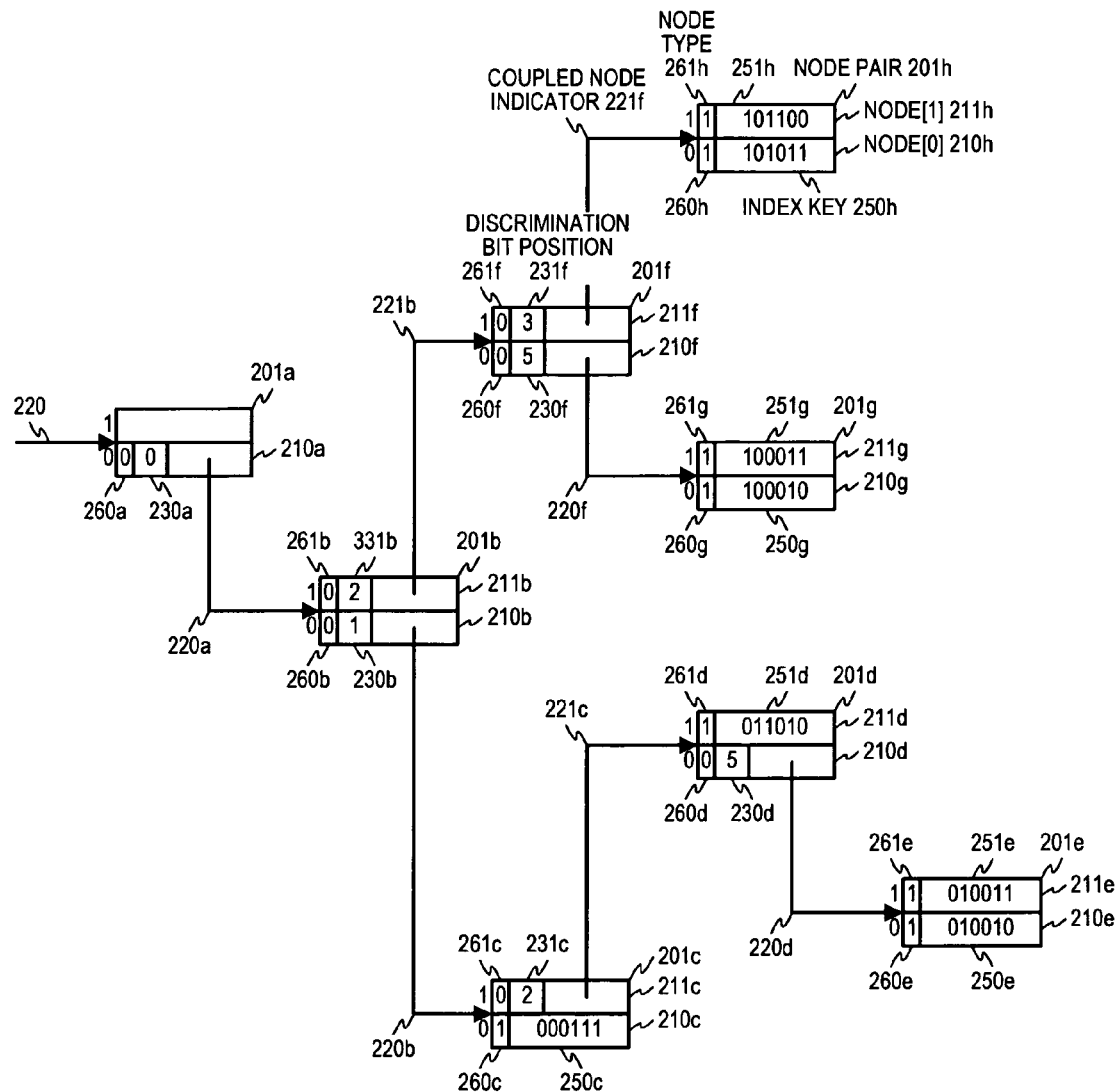
FIG. 2B is a drawing showing a tree configuration of a coupled node tree.

FIG. 2B is a drawing that conceptually shows an embodiment of a tree structure of a coupled node tree. The 6-bit index key that is illustrated is the same as that of the Patricia tree described as an example in FIG. 1.

The reference code 210a shows the root node. In the example described, the root node 210a is the primary node of the node pair 201a located at the array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the codes that are appended before the array element numbers described in FIG. 2A, and indicates the node position. The tree is traversed in accordance with the bit values at discrimination bit positions of the search key, so that the leaf node that is the object of the search is found.

In the example described, the node type 260a of the root node 210a is 0, thereby indicating that this is a branch node, and the discrimination bit position 230a shows 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The discrimination bit position 230b of the node 210b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes an index key. "000111" is stored in the index key 250c. The node type 261c of the node 211c is 0, the discrimination bit position 231c of the node 211c is 2, and in the coupled node indicator is stored the array element number 221c of an array element in which is stored the primary node 210d of the node pair 201d.

The node type 260d of the node 210d is 0, the discrimination bit position 230d is 5, and in the coupled node indicator is stored the array element number 220d of an array element in which is stored the primary node 210e of the node 201e. The node type 261d of the node 211d that is paired with the node 210d is 1, and "011010" is stored in the index key 251d.

The node types 260e and 261e of the nodes 210e and 211e of the node pair 201e are both 1, indicating that both are leaf nodes. In the index keys 250e and 251e of each are stored "010010" and "010011" respectively as index keys.

The discrimination bit position 231b of the node 211b, which is the other node of the node pair 201b, has 2 stored therein, and the array element number 221b of the array element in which is stored the primary node 210f of the node pair 201f is stored in the coupled node indicator of the link target.

The node types 260f and 261f of the nodes 210f and 211f of the node pair 201f are both 0, indicating that both are branch nodes. In the discrimination bit positions 230f and 231f of each are stored 5 and 3, respectively. The array element number 220f of the array element in which is stored the primary node 210g of the node pair 201g is stored in the coupled node indicator of the node 210f, and the array element number 221f of an array element in which is stored the node [0] 210h, which is the primary node of the node pair 201h, is stored in the coupled node indicator of the node 211f.

The node types 260g and 261g of the nodes 210g and 211g of the node pair 201g are both 1, indicating that both are leaf nodes, and "100010" and "100011" are stored in the index keys 250g and 251g thereof, respectively.

In the same manner, the node types 260h and 261h of the primary node [0] 210h of the node pair 201h, and the node [1] 211h, which is paired therewith, are both 1, indicating that both are leaf nodes, and "101011" and "101100" are stored in the index keys 250h and 251h thereof, respectively.

The processing flow in searching for the index key "100010" from the above-noted tree is briefly described below. The discrimination bit positions are numbered 0, 1, 2, . . . and so on from the left.

First, processing is started from the root node 201a using the bit string "100010" as the search key. Because the discrimination bit position 230a of the root node 210a is 0, examining the bit value of the discrimination bit position 0 reveals 1. This being the case, 1 is added to the array element number 220a stored in the coupled node indicator and linking is done to the node 211b stored in the resulting array element number. Because 2 is stored in the discrimination bit position 231b of the node 211b, examination of the bit value of the discrimination bit position 2 reveals 0, resulting in linking to the node 210f stored in the array element having the array element number 221b stored in the coupled node indicator.

Because 5 is stored in the discrimination bit position 230f of the node 210f, and because examination of the bit value of the discrimination bit position 5 of the search key "100010" reveals 0, linking is done to the node 210g stored in the array element having the array element number 220f stored in the coupled node indicator.

Because the node type 260g of the node 210g is 1, indicating a leaf node, the index key 250g is read out and a comparison is performed with the search key, thereby revealing equality between the two, both of which are "100010". Searching is performed in this manner using the coupled node tree.

Next, the significance of the configuration of the coupled node tree will be described, with reference made to FIG. 2B.

The configuration of the coupled node tree is prescribed by a set of index keys. In the example of FIG. 2B, the discrimination bit position of the root node 210a is 0 because there is an index key having a 0 at the 0th bit and an index key having a 1 at the 0th bit in the index keys described in the embodiment example of FIG. 2B. The group of index keys having 0 at the 0th bit is classified under the node 210b, and the group of index keys having 1 at the 0th bit is classified under the node 211b.

That the discrimination bit position of the node 211b is 2 reflects a property of the index keys, this being that the 1st bits of all the nodes 211h, 210h, 211g, and 210g are the same value 0, a difference therebetween first occurring at the 2nd bit.

Similar to the case of the 0th bit, the cases of the 2nd bit being 1 are classified on the node 211f side, and the cases of the 2nd bit being 0 are classified on the node 210f side.

Then because index keys having a 2nd bit that is 1 differ with regard to the 3rd bit, 3 is stored in the discrimination bit position of the node 211f, and because the 3rd and 4th bits of index keys having 0 as the 2nd bit are the same and differ at the 5th bit, 5 is stored in the discrimination bit position of the node 210f.

At the link target of the node 211f, because there is only one having a 3rd bit of 1 and one having a 3rd bit of 0, nodes 210h and 211h are leaf nodes, with "101011" and "101100" stored in the index keys 250h and 251h, respectively.

Even in the event that the index key set includes "101101" or "101110" in place of "101100", because there is equality with "101100" up until the 3rd bit, only the index key stored in the node 211h would change, there being no change in the structure of the tree itself. However, if "101101" is included in addition to "101100", the node 211h would become a branch node, the discrimination bit position thereof being 5. If the index key to be added is "101110", the discrimination bit position would be 4.

As described above, the coupled node tree structure is determined by the bit values of each bit position of the index keys included in the set of index keys.

To add to the above, because there is branching for each bit position having different bit values, meaning between a node that has a bit value of 1 and a node that has a bit value of 0, if the leaf nodes are traversed giving priority to the node [1] side and the tree depth direction, the index keys stored therewithin will be "101100" for the index key 251h of the node 211h, "101011" for the index key 250h of the node 210h, . . . , and "000111" for the index key 250c of the node 210c, these being sorted in descending order.

That is, in a coupled node tree the index keys are disposed in the tree in a sorted sequence.

When searching using a search key, the index key is followed over a path disposed on a coupled node tree, and in the case, for example, of a search key "101100" it is possible to reach the node 211h. As can be imagined from the above-noted description, even if the search key is made "101101" or "101110", the node 211h will be reached, and a comparison with the index key 251h will result in the search failing.

Also, even in the case in which searching is done with "100100", in the link path of nodes 210a, 211b, and 210f, because the 3rd and 4th bits of the search key are not used and the 5th bit is 0, the node 210g will be reached, similar to the case searching with "100010". In this manner, the discrimination bit positions are used in accordance with bit makeup of the index keys stored in the coupled node tree to perform branching.

Figure 3:
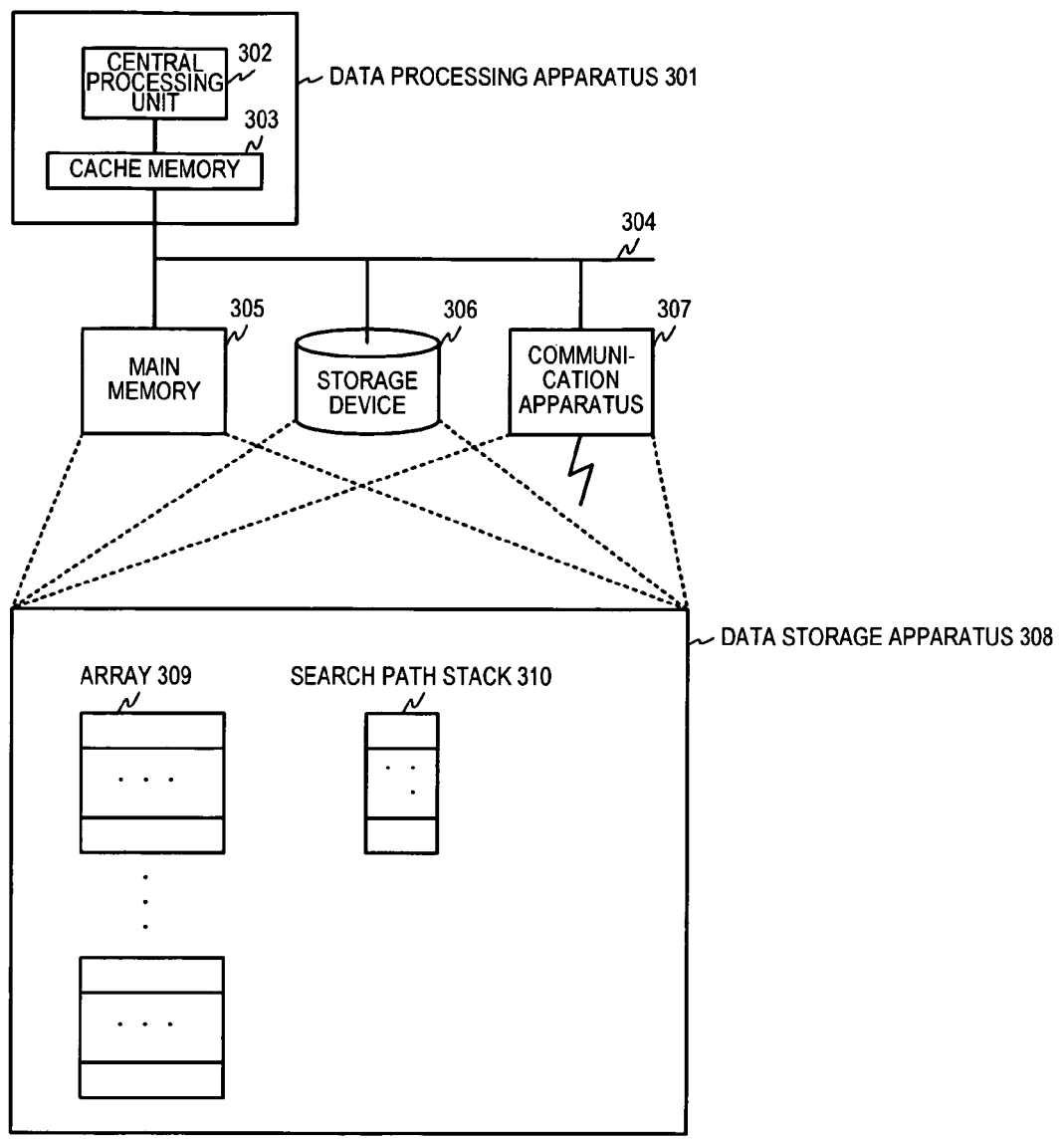
FIG. 3 is a drawing describing an exemplary hardware configuration for embodying the present invention.

FIG. 3 is a drawing describing an example of a hardware configuration for embodying the present invention.

Search processing and data maintenance are implemented with the searching apparatus of the present invention by a data processing apparatus 301 having at least a central processing unit 302 and a cache memory 303, and a data storage apparatus 308. The data storage apparatus 308, which has an array 309 into which is disposed a coupled node tree, and a search path stack 310, into which are stored array element numbers of nodes which are traversed during the search, can be implemented by a main memory 305 or a storage device 306, or alternatively, by using a remotely disposed apparatus connected via a communication apparatus 307.

In the example described in FIG. 3, although the main memory 305, the storage device 306, and the communication apparatus 307 are connected to the data processing apparatus 301 by a single bus 304, there is no restriction to this connection method. The main memory 305 can be disposed within the data processing apparatus 301, and the search path stack 310 can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary storage devices can of course be used to enable various values obtained during processing to be used in subsequent processing.

Hereinafter, the various searches for index keys stored in the above coupled node tree related to the preferred embodiment of this invention, the generation of such a tree and it's splitting and conjoining are described.

Figure 4A:
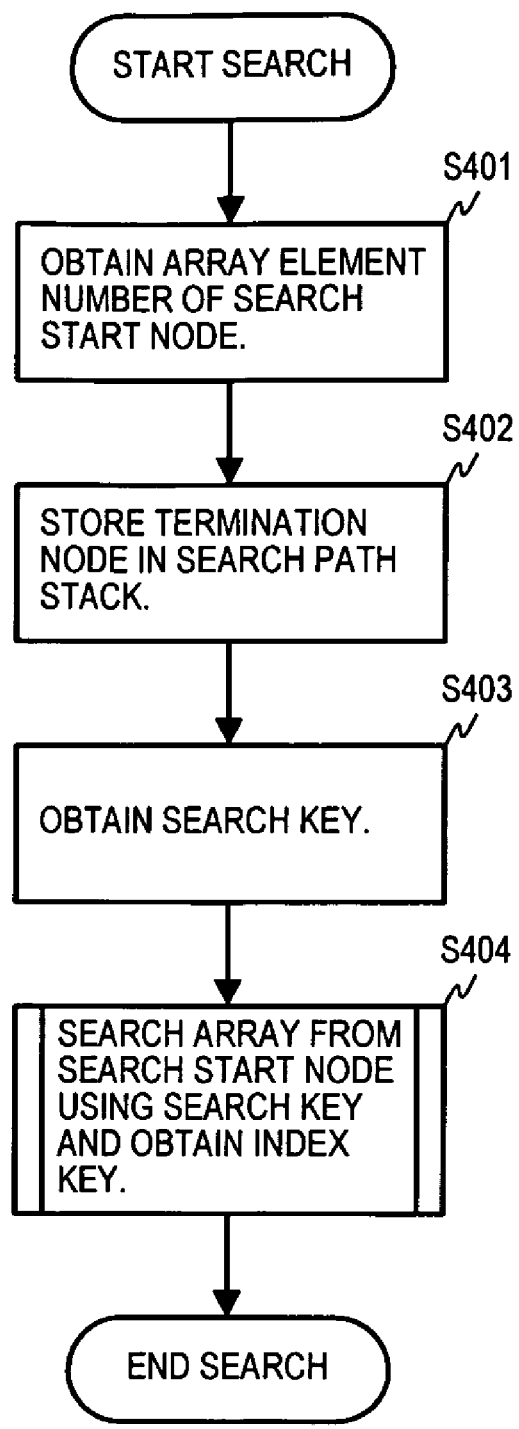
FIG. 4A is a drawing describing in general a basic search related to an embodiment of the present invention.
Figure 4B:
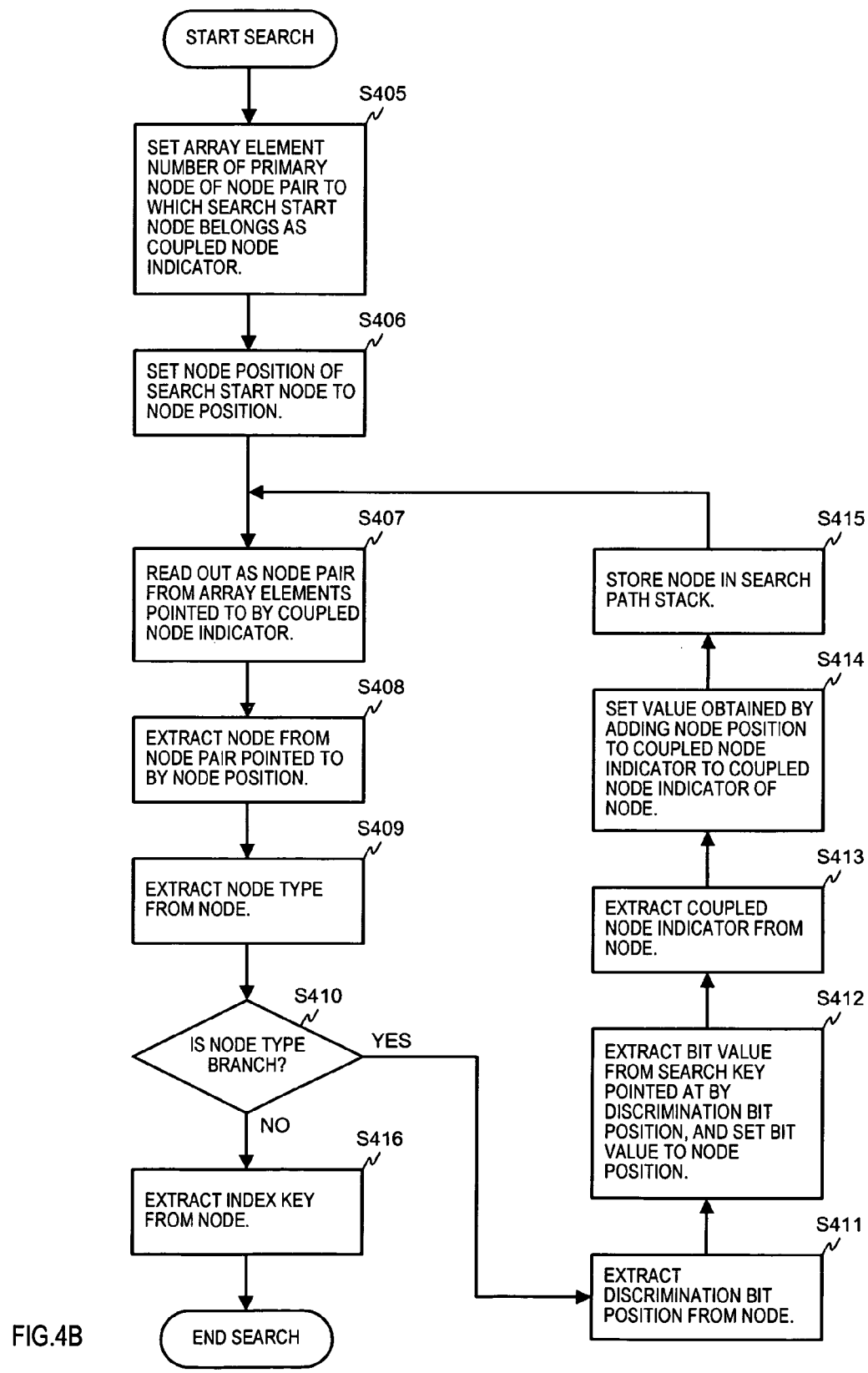
FIG. 4B is a drawing describing the process flow of a basic search.
Figure 4C:
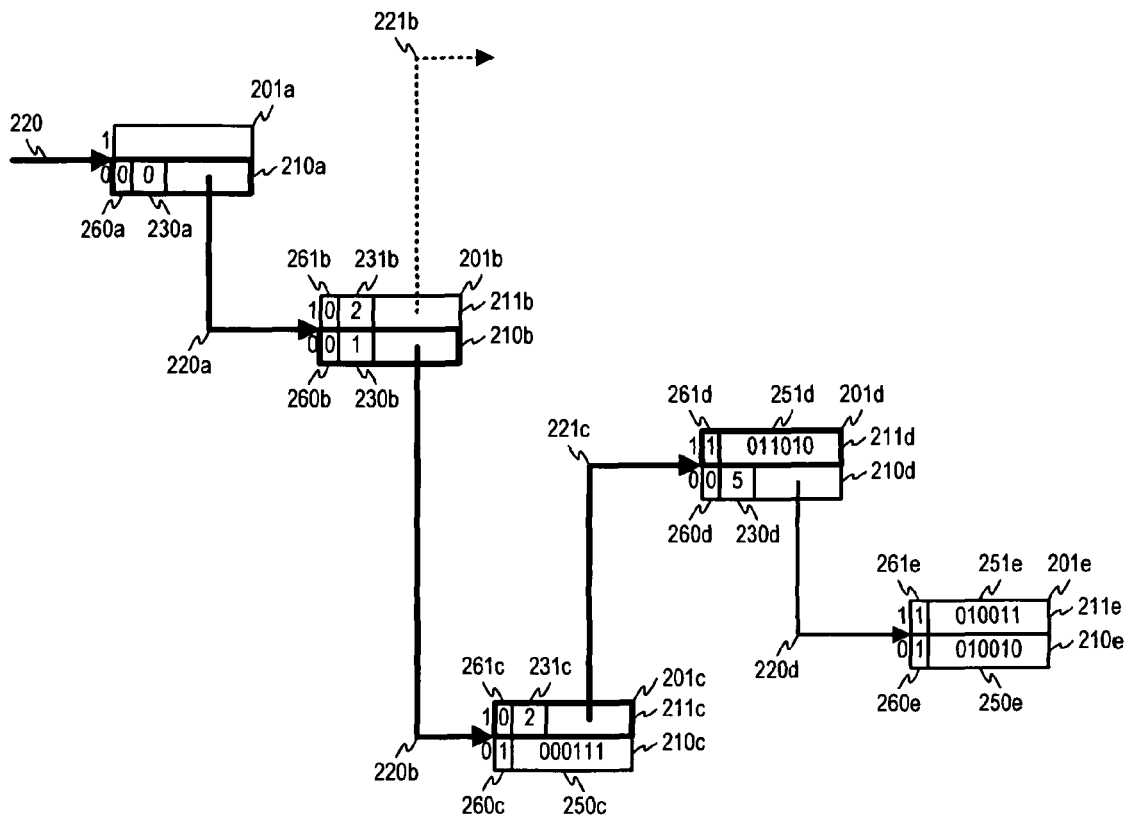
FIG. 4C is a drawing describing an example of a basic search using a coupled node tree.
Figure 4C:
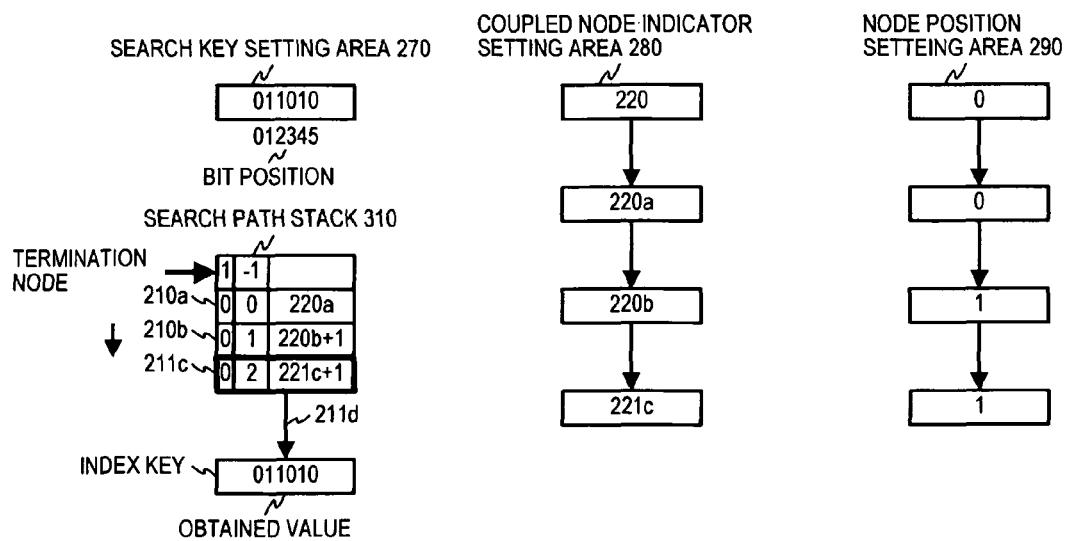

First, basic search processing is described in general, referencing FIG. 4A, FIG. 4B, and FIG. 4C.

FIG. 4A is a drawing describing in general a basic search related to an embodiment of the present invention. FIG. 4B is a drawing describing the process flow of a basic search. FIG. 4C is a drawing describing an example of a basic search using a coupled node tree, and shows the parts of the coupled node tree illustrated in FIG. 2B related to this search example, the search path stack, and the various work areas.

As shown in FIG. 4A, in step S401, the search start node is set. The search start node is set by specifying or acquiring the array element number of the search start node and setting that array element number or the node for that array element number in an unillustrated search start node setting area. The above search start node setting area is one of "the temporary storage devices used to enable various values during processing to be used in subsequent processing" as noted above. In the description below, expressions like "setting in an unillustrated search start node setting area" may be changed to expressions like "set as the search start node" or "set in the search start node".

In the above step S401, although the root node is set as the search start node if index keys are to be searched in the complete coupled node tree, there are cases where, in the various search applications described below, a certain node in the coupled node tree is specified as the search start node and that specified search start node is taken as the root node of a subtree in which index keys are to be searched for.

Next in step S402, a termination node is stored in the search path stack. The termination node is a virtual branch node to indicate the bottom of the search path stack, and its node type is "1" to distinguish it from the other branch nodes. Its discrimination bit position is the value "−1" which is a value less than 0. The number of digits in the discrimination bit position is made sufficient to handle the number of digits in the index keys. In addition, since it can be distinguished as a termination node by its discrimination bit position being "−1", there is no indispensability for the node type to be "1".

The coupled node indicator of the termination node is all 0's for termination node [0] and all 1's for termination node [1]. However the value of the coupled node indicator has no significance, it can be simply expressed as a termination node. Thus, for example, if the primary node is presumed to be stored in the array element with an even array element number, the node position of termination node [0] is 0 and the node position of termination node [1] is 1. In addition, if the coupled node indicators of termination node [0] and termination node [1] can be distinguished as node position 0 and node position 1, there is no necessity for them to always be all 0's or all 1's.

Next in step S403 a search key is set, and processing proceeds to step S404, where the array is searched from the search start node set in step S401 using the search key set in step S403, and an index key is obtained. Details of the search processing that obtains this index key is described next referencing FIG. 4B.

As shown in FIG. 4B, in step S405, the array element number of the primary node of the node pair to which the search start node belongs is set in the coupled node indicator setting area.

As illustrated in FIG. 4C, the search start node is node 210a, which is the root node, and the array element number 220 of the primary node of node pair 201a, that is, node 210a is set in the coupled node indicator setting area 280. If the search start node were node 211c, the array element number 220b of the primary node 210c of node pair 201c would be set in the coupled node indicator setting area 280.

Next, in step S406, a node position expressing which of the elements in the node pair is the search start node is set in the node position setting area. As illustrated in FIG. 4C, the node position "0" of node 210a is set in the node position setting area 290 as the node position.

As the search path stack 310 in FIG. 4C shows, the node type of the termination node is "1" and since all the bits in its discrimination bit position are "1" it is "−1".

Next to the initialization of the above steps S405 and S406, processing moves to the loop processing of step S407 and following.

At step S407, the pair of array elements pointed to by the coupled node indicator set in the coupled node indicator setting area are read out from the array as a node pair. In the first processing of step S407, the node pair pointed to by the coupled node indicator initialized in step S405 is read out. As illustrated in FIG. 4C, since array element number 220 is set as the coupled node indicator, the node pair 201a is read out.

Next, in step S408, the node pointed to by the node position set in the node position setting area is extracted from the node pair that has been read out. In the first processing of step S408, the node pointed to by the node position initialized in step S406 is extracted. As illustrated in FIG. 4C, since node position "0" is set, of the 2 nodes of node pair 201a, node 210a is read out.

Next in step S409, the node type indicates extracted from the node extracted in step S408, and processing proceeds to step S410.

At step S410, a determination is made whether the node type extracted in step S409 is a branch node.

If the node type is not branch node, the node extracted in step S408 is a leaf node and processing proceeds to step S416, where an index key is extracted from the node as the search result and processing is terminated.

If the determination result at step S410 is positive and thus the node type extracted in step S409 indicates a branch node, after the processing of steps S411 to S415 wherein the coupled node indicator setting area and node position setting area are updated and the node is stored in the search path stack, processing returns to step S407, and this loop processing is repeated until the determination processing in step S410 confirms that a leaf node has been extracted.

At step S411, a discrimination bit position is extracted from the node extracted in step S408.

Next in step S412, the bit value in the search key pointed to by the discrimination bit position extracted in step S411 is set as the node position. As illustrated in FIG. 4C, since the value set in the search key setting area 270 is "011010", in the first loop processing the discrimination bit position "0" is extracted, and the "0" that is in 0th bit of the search key "011010" is set in the node position setting area 290.

Next in step S413, a coupled node indicator is extracted from the node and set in coupled node indicator setting area.

Next, proceeding to step S414, the node position value is added to the coupled node indicator set in the coupled node indicator setting area, and the result is stored in the coupled node indicator of the node extracted in step S408, and at step S415 that node is stored in the search path stack, and processing returns to step S407. As illustrated in FIG. 4C, the coupled node indicator 220a is extracted and set in the coupled node indicator setting area 280, and 220a+0=220a is stored in the coupled node indicator of node 210a, and that node is stacked in the search path stack 310.

When processing returns to step S407, as illustrated in FIG. 4C, the node pair 201b pointed to by the coupled node indicator 220a is read out and the node 210b pointed to by the "0" set in node position setting area 290 is extracted, and then the discrimination bit position "1" is extracted from it, and the bit value "1" at bit 1 of the search key "011010" is set in the node position setting area 290. Furthermore, the coupled node indicator 220b is extracted and set in the coupled node indicator setting area 280, and the node position "1" is added to that coupled node indicator 220b and the node 210b with the addition result as its coupled node indicator is stacked in the search path stack 310.

Continuing, processing returns to step S407, and the node pair 201c pointed to by the 220b set in the coupled node indicator setting area 280 is read out, and the node 211c pointed to by the "1" set in the node position setting area 290 is extracted and from that the discrimination bit position "2" is extracted, and the bit value "1" at bit 2 of the search key "011010" is set in the node position setting area 290. Furthermore, the coupled node indicator 221c is extracted and set in the coupled node indicator setting area 280, the node position "1" is added to that coupled node indicator 221c, and the node 211c storing the addition result as its coupled node indicator is stacked in the search path stack 310.

Returning once more to step S407, the node pair 201d pointed to by the 221c set in the coupled node indicator setting area 280 is read out, the node 211*d* pointed to by the "1" set in the node position setting area 290 is extracted, and its node type 261*d* is extracted. Then, since the node type 261*d* is "1", a determination is made that this node is a leaf node, and the index key "011010" is obtained.

Although the foregoing is a description of the basic search processing related to a preferred embodiment of this invention, if the purpose is only a basic search, there is no necessity to stack nodes in the search path stack. In the various processing operations described hereinafter, however, the nodes on the link path are described as being stored in a search path stack in order to leverage the history information of the link path in a basic search from the search start node to a leaf node.

Also, as illustrated in FIG. 4C the result of the search is that an index key identical to the search key is obtained, but even if an index key identical to the search key does not exist in the coupled node tree, the node position of the next link target is determined by the discrimination bit position of the branch node and by the bit value of the search key pointed to by that discrimination bit position, and since a leaf node is ultimately reached, an index key is obtained as the search result.

Then, it is clear from the above description that the bit values of both the search key and the index key obtained as a search result are identical at the discrimination bit positions of all the branch nodes in the link path.

Figure 5A:
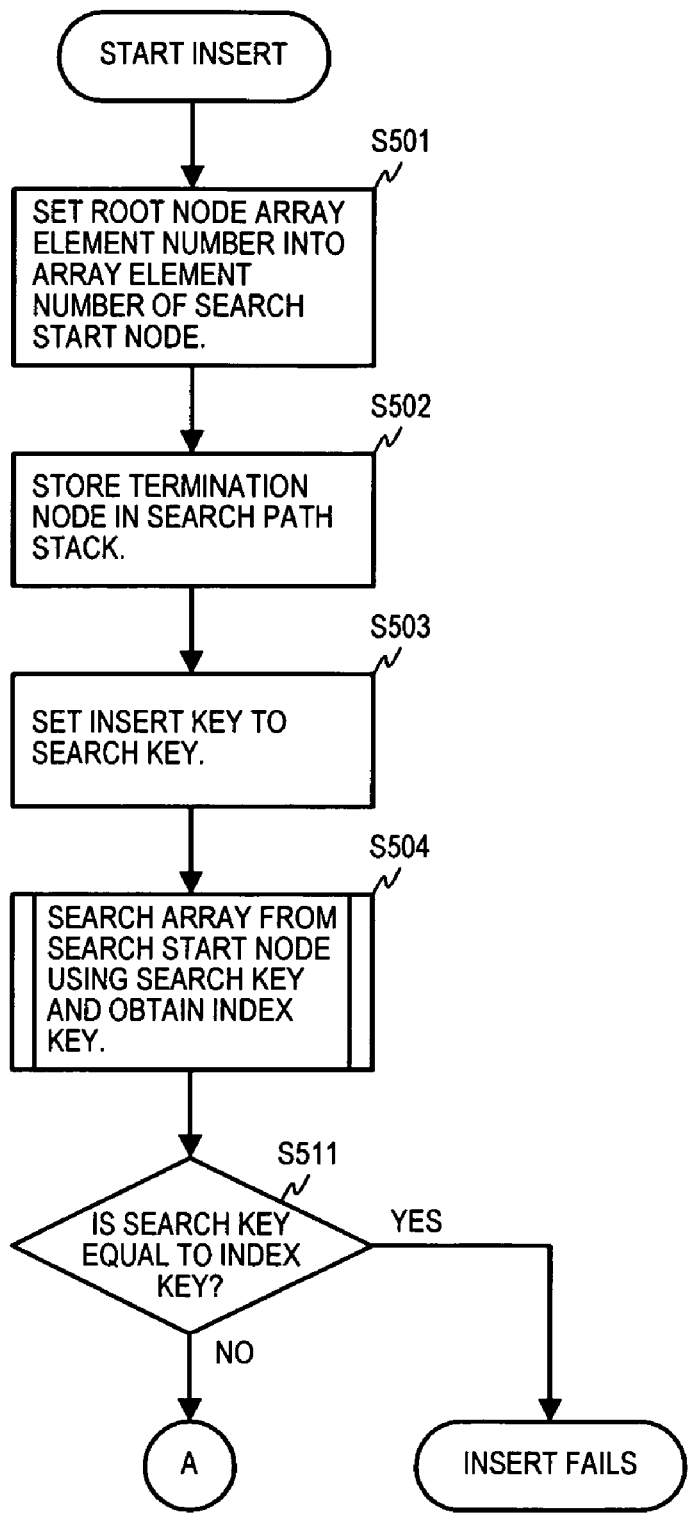
FIG. 5A is a drawing showing the processing flow for search processing, which is the beginning stage of insert processing.
Figure 5B:
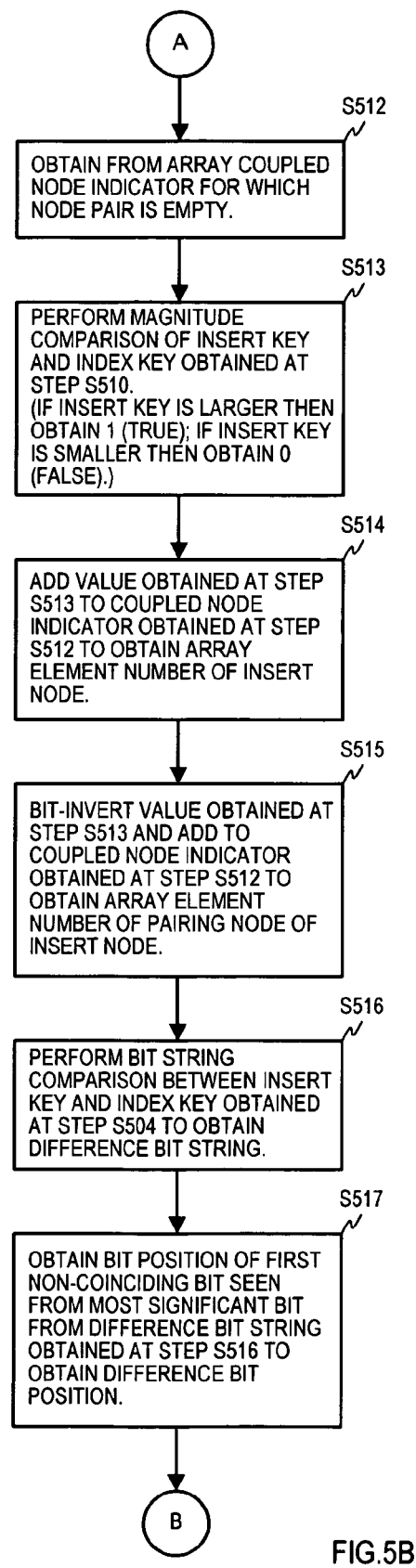
FIG. 5B is a flowchart describing the processing for preparing an array element for a node pair to be inserted.
Figure 5C:
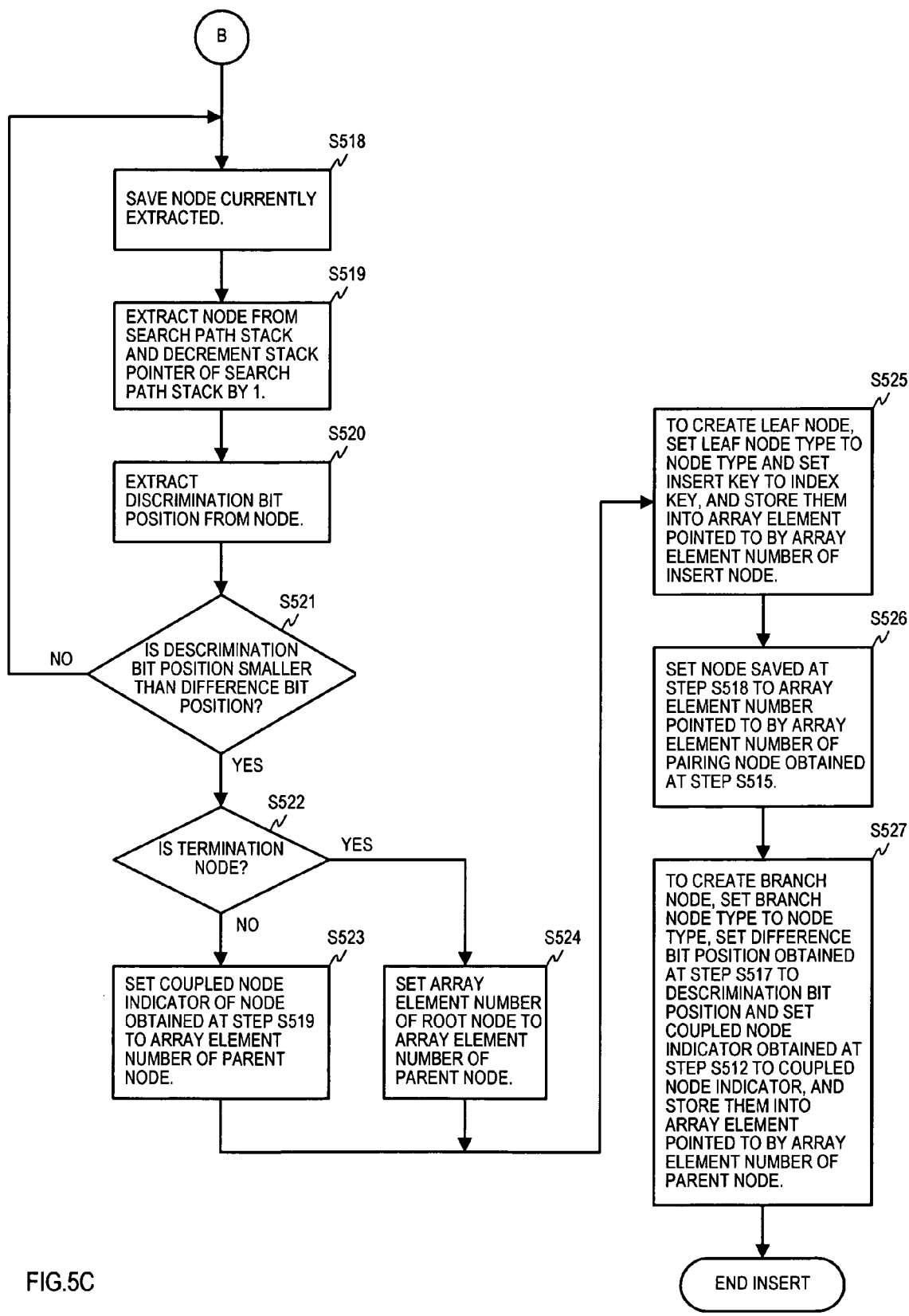
FIG. 5C is a flowchart describing the processing for determining the position for inserting a node pair, storing the contents of each node of the node pair, and completing the insert processing.

Next, the node insert processing in the coupled node tree related to this embodiment of the invention is described, referring to FIG. 5A to FIG. 5C, FIG. 6A and FIG. 6B. FIG. 5A to FIG. 5C describe the usual insert processing, and FIG. 6A and FIG. 6B describe the processing for insertion of a root node. Because, by root node insert processing and usual insert processing, a coupled node tree is generated, the description of the node insert processing is also a description of the processing to generate a coupled node tree.

FIG. 5A is a drawing showing the processing flow for search processing, which is the beginning stage of insert processing, this corresponding to the using of an insert key as a search key in the search processing shown in FIG. 4 with the root node as a search start node. That is to say, step S501 corresponds to step S401 in FIG. 4 using the root node as the search start node, and step S503 corresponds to step S403 in FIG. 4 using the insert key as the search key. Also, because the processing of step S502 and step S504 corresponds completely to step S402 and step S404 of FIG. 4, these steps will not be explained herein.

At step S511 in FIG. 5A, a comparison is performed between the insert key and the index key obtained as the result of the search and, because if there is equality the insert key already exists in the coupled node tree, the insert fails, and processing ends. If, however, there is no equality, processing proceeds to step S512 and thereafter in FIG. 5B.

FIG. 5B is a flowchart describing the processing to prepare array elements for a node pair to be inserted and its insert position.

At step S512, an empty node pair is obtained from the array, and the array element number of the array element to be made the primary node of the node pair is acquired and is set as the coupled node indicator.

Proceeding to step S513, a magnitude comparison is performed between the insert key and the index key acquired at step S504 and, in the case in which the insert key is larger, the Boolean value 1 is obtained, but if the insert key is smaller, the Boolean value 0 is obtained and is set in the node position.

Proceeding to step S514, the Boolean value obtained at step S513 is added to the coupled node indicator obtained at step S512 and that result is set as the array element number of the insert node.

Proceeding to step S515, the logical negation value of the Boolean value obtained at step S513 is added to the coupled node indicator obtained at step S512 and that result is set as the array element number of the pairing node.

The array element number obtained at step S514 is the array element number of the array element wherein a leaf node having the insert key as an index key is stored, and the array element number obtained at step S515 is the array element wherein a node that forms a pair with that leaf node is stored.

That is, by means of the magnitude relationship between the index key stored in the leaf node obtained in the beginning stage of search processing and the insert key, a determination is made of into which node of the node pair to be inserted the leaf node holding the insert key is to be stored.

At step S516, an exclusive-OR, for example, is obtained of the insert key and the index key obtained at step S504 so as to obtain a difference bit string.

Proceeding to step S517, the difference bit position is obtained from the difference bit string obtained at step S516, this being the first bit position at which there is a non-equality, starting from the most-significant 0th bit. This processing can be performed by, for example, a CPU having a priority encoder, the difference bit string being input thereto and the difference bit positions being obtained. It is alternatively possible to perform the equivalent processing using software, to obtain the first bit position at which there is non-equality.

For example, in the case in which "011011" is to be inserted into the coupled node tree of FIG. 2B, the index key resulting from the search is the "011010" that is stored in node 211*d*. A Boolean value is obtained by performing a magnitude comparison between the insert key "011011" and the index key "011010" stored in the node 211*d*, and, in this example, because the insert key is larger, the Boolean value 1 is obtained, so that the leaf node that holds the insert key is stored in an array element having an array element number obtained by adding 1 to the coupled node indicator of the node pair to be inserted. The index key "011010" is stored in an array element having an array element number obtained by adding the logical negation value of the Boolean value obtained by the magnitude comparison to the coupled node indicator.

When this is done, because the index key "011010" and the insert key "011011" differ at the 5th bit, the node 211*d* becomes a branch node, with a discrimination bit position of 5, whose coupled node indicator is the array element number of the primary node of the inserted node pair.

In the case also in which "011001" is to be inserted into the coupled node tree of FIG. 2B, the index key resulting from the search is "011010" that is stored in node 211*d*. In this case, because the insert key is smaller, the Boolean value 0 is obtained, so that the leaf node that holds the insert key is stored in an array element having an array element number obtained by adding 0 to the coupled node indicator of the node pair to be inserted. Then, because the index key "011010" and the insert key "011001" differ at the 4th bit, the node 211*d* becomes a branch node with a discrimination bit position of 4, whose coupled node indicator is the array element number of the primary node of the inserted node pair. Next, processing proceeds to the processing of step S916 and thereafter in FIG. 9C.

Next, processing proceeds to the processing of step S518 and thereafter in FIG. 5C.

FIG. 5C is a flowchart describing the processing of storing a node in the array prepared as shown in FIG. 5B, determining the insert position therein, and changing the contents of an existing node to complete to the insert processing.

The processing from step S518 to step S524 is processing to determine the position on the coupled node tree for insertion of a node pair, and the processing of step S525 and thereafter is processing for setting data in each node and completing the insert processing.

At step S518, the nodes currently extracted are saved. The node first to be saved is the leaf node extracted in step S504.

Next, at step S519, the node pointed to by the stack pointer is extracted from the search path stack and the stack pointer of is decremented by 1.

Proceeding to step S520, the discrimination bit position is extracted from the node read out at step S519.

Next, proceeding to step S521, a judgment is made as to whether the discrimination bit position extracted at step S520 is of higher order than the bit position obtained at step S517. In this case, the term higher order means more to the left in the bit string, that is, having a lower bit position value.

If the result of the judgment at step S521 is negative, return is made to step S518, and in step S518 the node extracted in step S519 is saved, and repetition is done until the judgment at step S521 is affirmative. When the judgment at step S521 becomes affirmative, processing proceeds to step S522.

At step S522 a determination is made whether the node extracted in step S519 is a termination node.

If it is not a termination node, processing moves to step S523, and a coupled node indicator is extracted from the node extracted in step S519 and is set as the array element number of the parent node, and processing proceeds to step S525. If the determination is that of a termination node, processing moves to step S524, and the array element number of the root node is set as the array element number of the parent node, and processing proceeds to step S525. In both of these cases, "parent node" means the node whose link target is a node pair obtained in step S512, and is the node that is at an immediately higher level to the node pair to be inserted.

In the above-described processing at step S518 to step S524, in order to determine the position of insertion of a node pair, a check is made of the relative positional relationship between that of the difference bit position of the index key that is to be inserted and index key obtained by searching and that of the discrimination bit positions of the branch nodes stored in the search path stack, and the branch node following the first branch node whose discrimination bit position is of a higher order becomes the parent node, and its link target is made the insert position of the node pair to be inserted.

For example, when inserting "111000" into the coupled node tree of FIG. 2B, since the third bit is "0", the index key resulting from the search is the "101011" stored in the node 210h. A bit string comparison between the insert key "111000" and the index key "101011" stored in the node 210h obtains the bit position 1 as the difference bit position. When the search path stack is successively traversed in reverse until the relative position relationship between the obtained bit position 1 and the discrimination bit positions of the branch nodes stored in the search path stack is such that the discrimination bit position is of a higher order, the root node 210a is reached. The coupled node indicator of the root node 210a stored in the search path stack 310 is the value that was set in step S414 shown in FIG. 4B, with node position added. Thus the coupled node indicator 220a+1 is extracted from the root node 210a and is set as the array element number of the parent node (Step S523). In other words, the array element number of the node 211b is obtained as the array element number of the parent node. The contents of node 211b are rewritten in step S527, and the insert key "111000" is inserted into the link target of the rewritten node 211b.

Traversing the search path stack in reverse until the termination node is reached means that, even though the root is reached, the discrimination bit position of the root node is not a higher level bit position than the bit position of highest level differing bit obtained in the above bit string comparison, and that all the upper level bits of the index keys in that coupled node tree with a level higher than the discrimination bit position of the root node coincide. Also, the index key to be inserted is the first case of a key having a differing bit value which is at a higher level bit position than the discrimination bit position of the root node. Thus the node pair to be inserted become the direct link target of the root node. And the discrimination bit position of the root node is changed to the highest level bit position of the insert key, which differs in value from the existing index key.

In addition, since the discrimination bit position of the termination node is, as described above, "−1", when the termination node is extracted from the search path stack, the determination in step S521 is "yes" and processing moves to the determination processing at step S522

Next, the processing of step S525 and thereafter, which is the processing to set data in each node and complete the insert processing, is described.

At step S525, 1 (leaf node) is stored in the node type of the array element pointed to by the array element number set at step S514 and the insert key is stored in the index key.

Proceeding to step S526, the node saved in step S518 is read out, and the contents read out are written into the array element with the array element number of the pairing node set in step S515.

Finally, at step S527, 0 (branch node) is stored in the node type of the array element pointed to by the array element number of the parent node, the difference bit position set at step S517 is stored in the discrimination bit position, the coupled node indicator set at step S512 is stored in the coupled node indicator, and processing is terminated.

In the above-described example of inserting "111000" into the coupled node tree of FIG. 2B, the contents of the saved node 211b are written into the node [0] of the empty node pair that has been obtained (step S526) and the node [1] thereof is made a leaf node that holds "111000" (step S525). The difference bit position 1, which is the highest order bit that has the bit value that differs in the bit string comparison, is stored in the discrimination bit position of the node 211b, and the array element number of the array element holding the primary node of the obtained node pair is stored into the coupled node indicator (step S527).

The insertion, into a coupled node tree, of a leaf node holding a new index key is completed by the above processing.

Figure 6A:
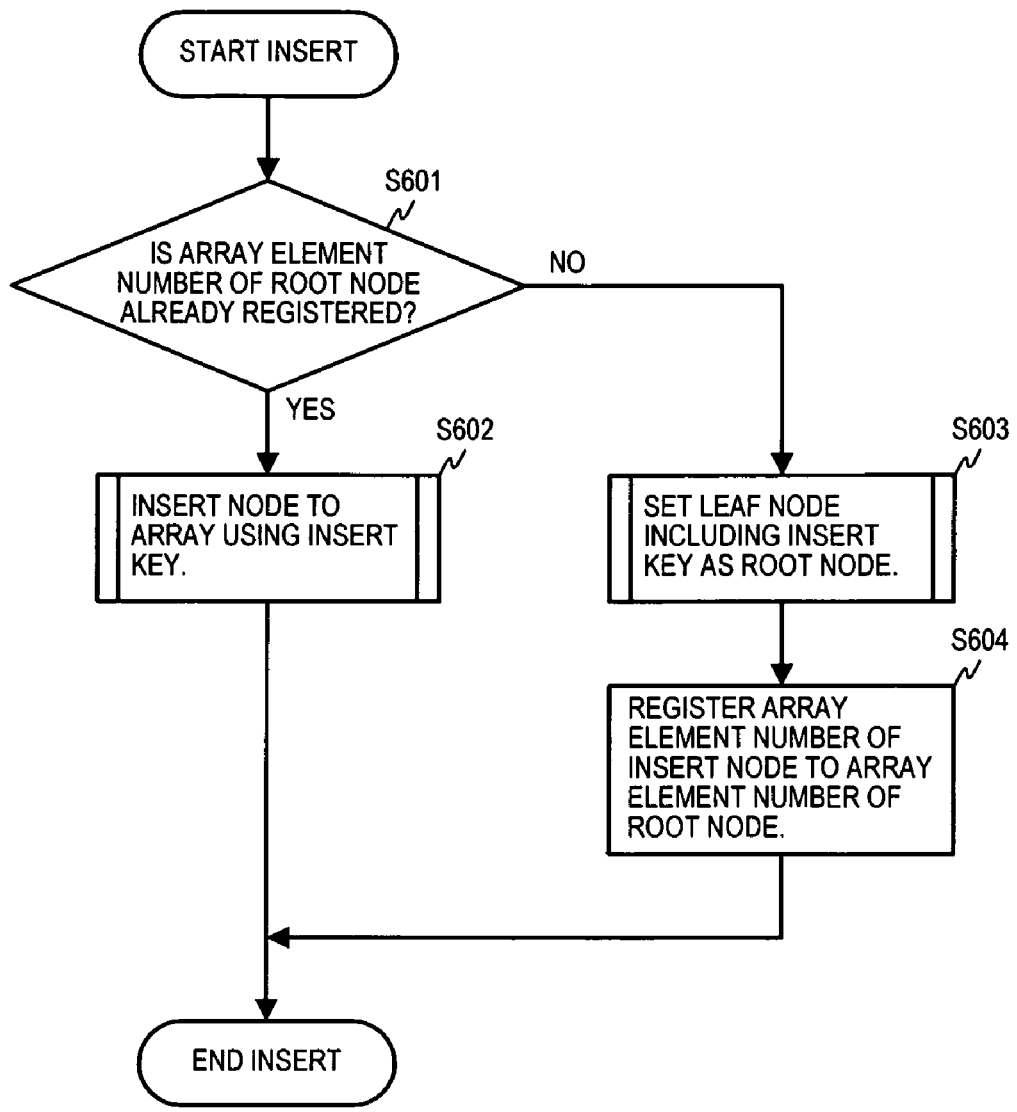
FIG. 6A is a flowchart describing the overall node insert processing in the case of adding an index key, including processing for inserting a root node.

FIG. 6A is a processing flowchart describing, in general, node insert processing related to an embodiment of this invention, when adding an index key, including the insert processing of a root node.

At step S601, a judgment is made as to whether the array element number of a root node of a coupled node tree that is to be obtained has already been registered. If it has already been registered, processing moves to step S602, and the usual insert processing described using FIG. 5A to FIG. 5C is performed.

At step S601, if the judgment is that the registration has not yet been done, processing moves to steps S603 and S604, and the registration and generation of a completely new coupled node tree begins.

At step S603, a leaf node including the insert key is set as the root node. Details of the processing in step S603 is described later referencing FIG. 6B.

Next, proceeding to step S604, the array element number of the inserted node is registered as the array element number of the root node and processing is terminated.

Figure 6B:
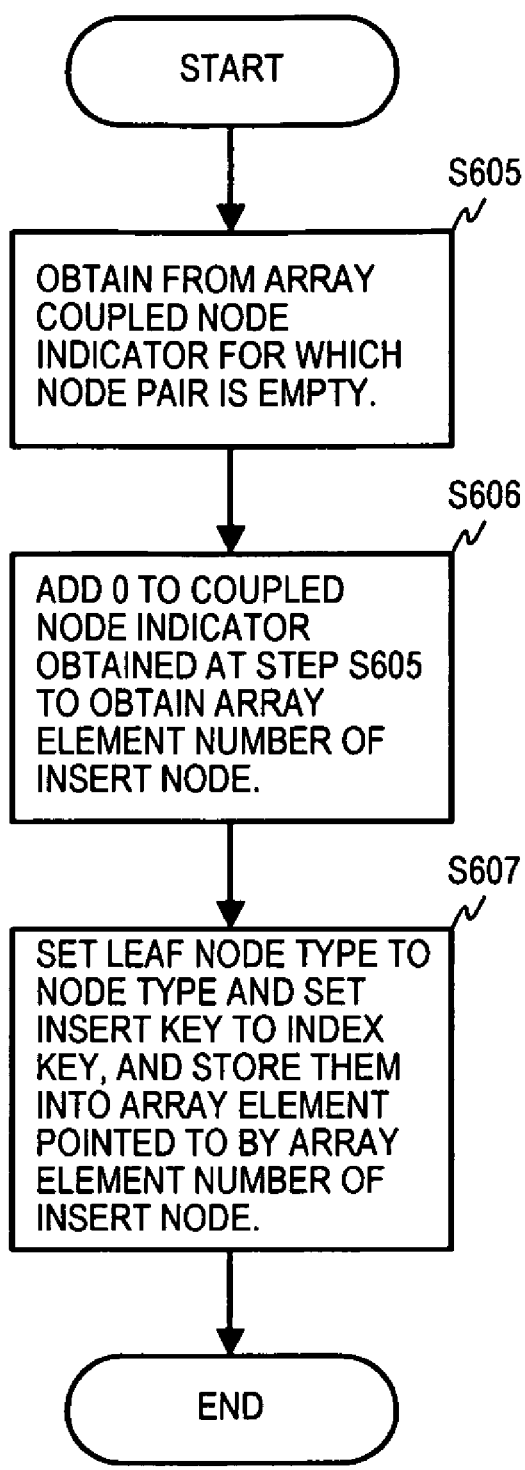
FIG. 6B is a drawing describing the processing flow for establishing a leaf node (including the root node) for storing an insert key.

FIG. 6B is a drawing describing the processing flow for setting a leaf node including the insert key as the root node.

First, at step S605, an empty node pair is requested from the array, and the array element number of the array element to be made the primary node of the node pair is acquired. Next at step S606, the array element number is determined by adding 0 to the array element number obtained at step S605. (In actuality, this is equal to the array element number obtained at step S605). Further, at step S607, 1 (leaf node) is stored in the node type of the array element pointed to by the array element number of the insert node set at step S606, and the insert key is stored in the index key, and the processing is completed.

As described above, it will be understood that when there is a set of index keys, the index keys are successively extracted therefrom, and the processing of FIG. 6A, FIG. 6B and FIG. 5A to FIG. 5C is repeated so as to enable the creation of a coupled node tree corresponding to the set of index keys according to the present invention.

Next, referring to FIG. 7A and FIG. 7B, the processing flow will be described for deleting a specific index key from a coupled node tree related to a preferred embodiment of this invention.

Figure 7A:
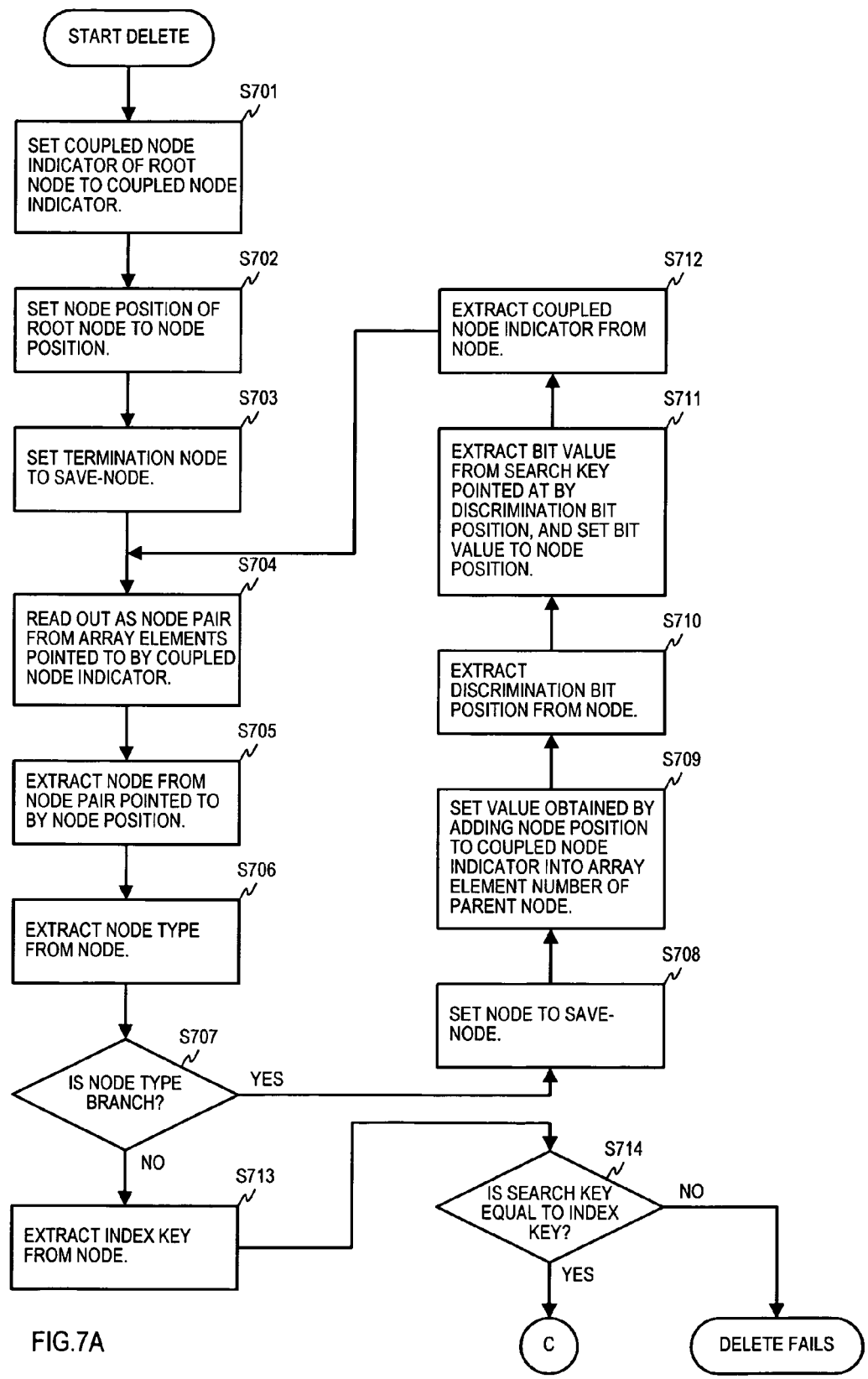
FIG. 7A is a drawing showing the search processing flow, which is the beginning stage of delete processing.

FIG. 7A is a drawing showing the processing flow for search processing, which is the beginning stage of delete processing, this corresponding to the using of a delete key as the search key in the search processing shown in FIG. 4A and FIG. 4B, and is similar to a search using the root node as the search start node. However, the delete processing of a preferred embodiment of this invention differs from the search processing described earlier in that it uses a save node which saves 1 node instead of using a search path stack.

As will be understood from the description below, since, in delete processing it is only necessary to back-trace one position on the search path, there is no need to use a stack and thus in replacement a node saving area to save a node and a parent node array element number saving area to save the array element number of that node can be used.

Hereinafter, the node set in the node saving area is called the saved node, and saving the node in the node saving area may be expressed as setting the node in the saved node. Also, the array element number saved in the parent node array element number saving area is called the array element number of the parent node and saving the array element number in the parent node array element number saving area may be expressed as setting the array element number in the parent node.

As shown in FIG. 7A, first, in step S701, the array element number of the root node is set as the coupled node indicator.

Next in step S702, the node position of the root node is set as the node position.

In addition, in step S703, a termination node is set in the saved node.

With this, initialization ends, and the loop process of steps S704 to S712, and step S713, which is the processing after the loop is exited by the determination result of step S707, and step S714 are executed.

Since in the above loop processing, the processing from step S704 to the node type determination processing of step S707 is identical to processing from step S407 to step S410 shown in FIG. 4B, that explanation is omitted.

If the determination result in step S707 is that the node type indicates a branch node, the loop processing of executing steps S708 to S712, and then returning to step S704, is performed.

The processing of step S708 and step S709 is processing that replaces the use of a search path stack, and in step S708, the node extracted in step S705 is set in the saved node.

In step S709, the node position set in the node position setting area is added to the coupled node indicator set in the coupled node indicator setting area and the array element number of resulting value is set in the parent node. Here, it is clear that the array element number set in the parent node is the array element number of the array element that holds the node saved in step S708.

Since the processing of the next steps S710 to S712 corresponds completely to the processing of steps S411 to S413 of FIG. 4B, that description is omitted. In addition, since the search path stack is not used, the steps corresponding to steps S414 and S415 shown in FIG. 4B do not exist in the delete processing of this preferred embodiment of this invention.

When a leaf node is reached as a result of linking by means of the above noted loop processing and thus the determination in step S707 is negative, a branch is made to step S713 and an index key is extracted from the leaf node.

In step S714, a comparison is performed between the delete key and the index key and, because if there is no equality the index key to be deleted does not exist in the coupled node tree, the delete fails, and processing ends. If, however, there is equality, processing proceeds to step S715 and thereafter in FIG. 7B.

Figure 7B:
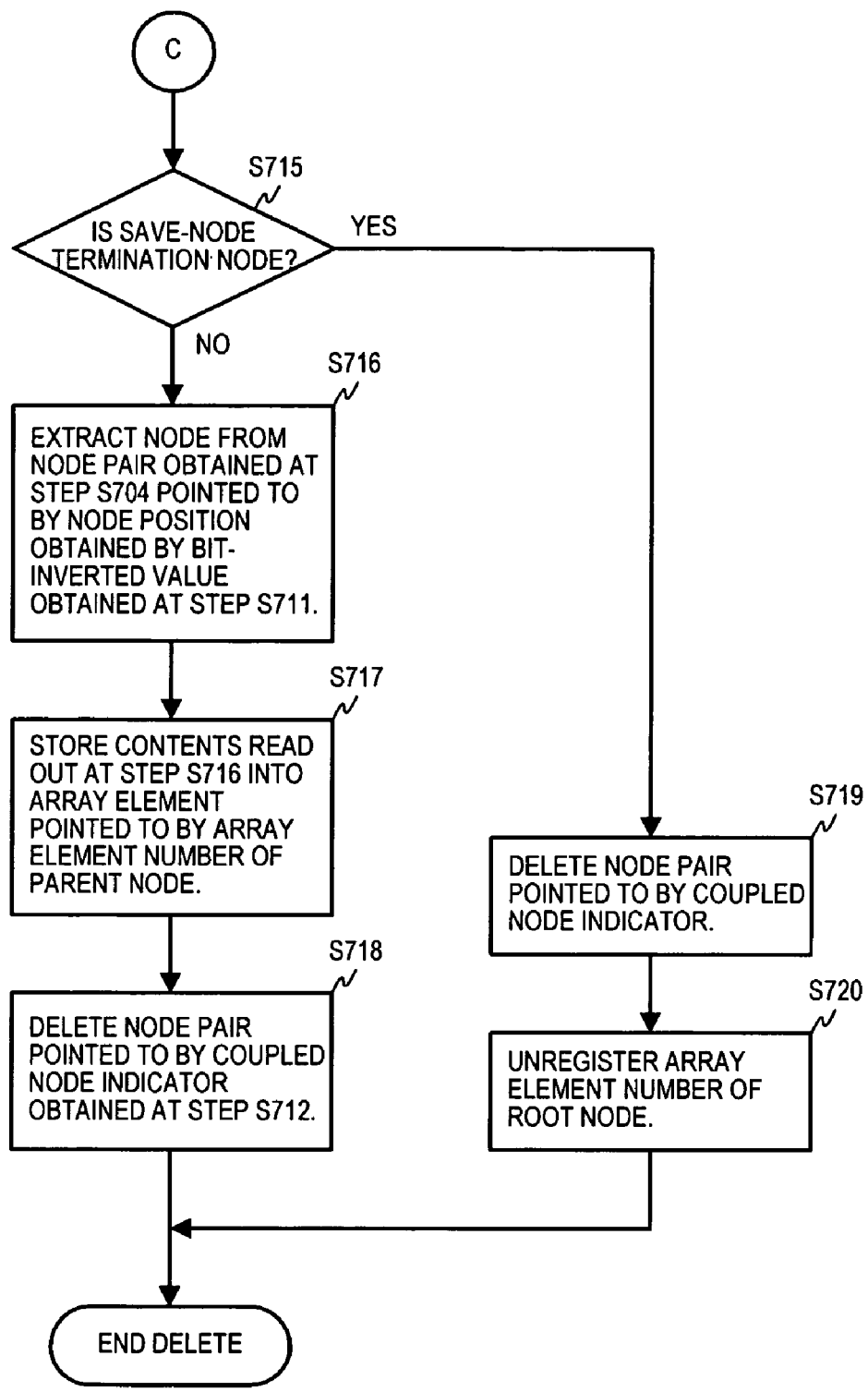
FIG. 7B is a drawing describing the processing flow that is the latter stage of the delete processing.

FIG. 7B is a drawing describing the processing flow of the latter stage of the delete processing.

First, at step S715, a judgment is made as to whether the node saved in the node save area is a termination node. If the saved node is the termination node, that means that the root node is a leaf node. In that case processing moves to step S719, and the node pair pointed to by the coupled node indicator set in step S701, that is, the array element number of the root node, is deleted. Next, proceeding to step S720, the array element number of the root node that had been registered is deleted, and processing is terminated.

If at step S715 the judgment is made that the node is not the termination node, processing proceeds to step S716, at which a node is extracted, whose node position within the node pair read out in step S704 is obtained by inverting the node position value set at step S711. This processing is performed to extract the node that forms a pair with a leaf node at which is stored the index key to be deleted.

Next, at step S717, the contents of the node extracted at step S716 are read out and are use to overwrite the contents of the array element having the array element number of the parent node set at step S709. This processing replaces the branch node (parent node) that is the link source to the leaf node in which the index key to be deleted with the above-noted node that forms a pair with the leaf node.

Finally, at step S718, the node pair pointed to by the coupled node indicator set in step S712 is deleted and processing is terminated.

Figure 8A:
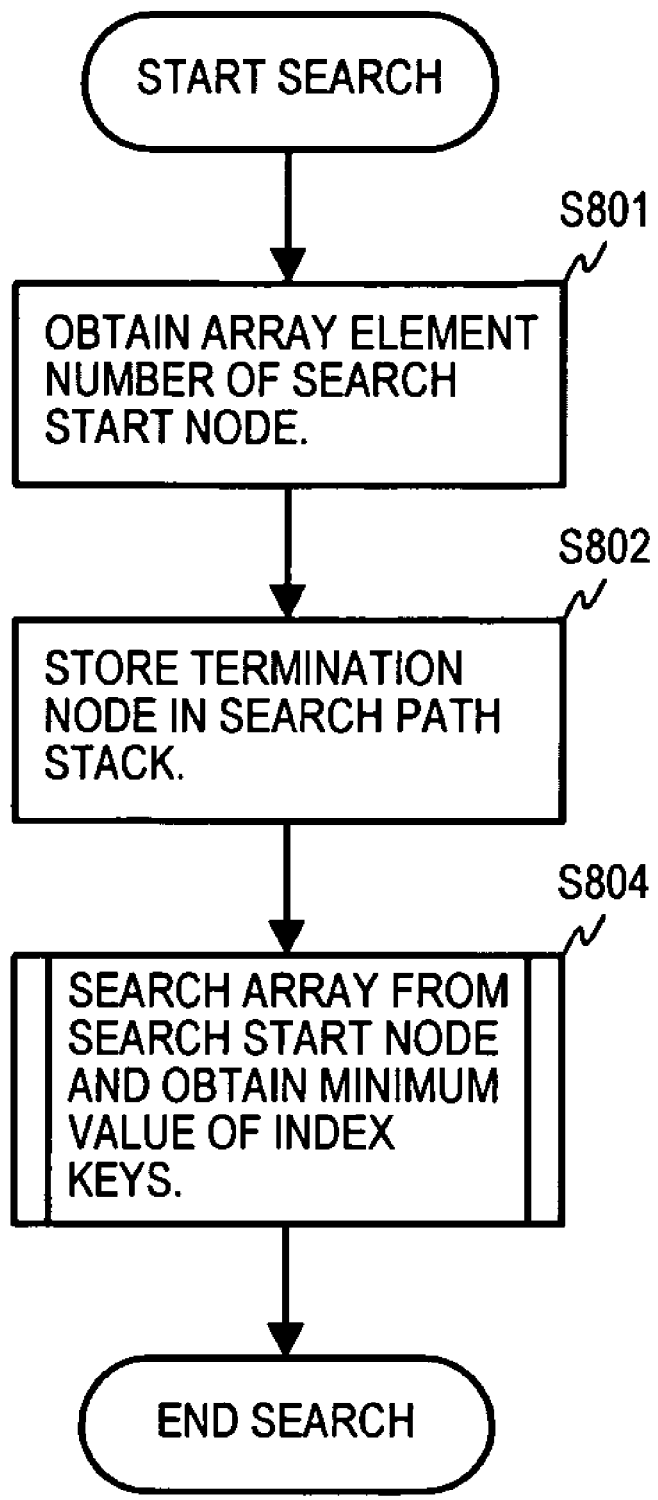
FIG. 8A is a drawing describing in general the processing flow to obtain a minimum value of the index keys stored in a coupled node tree.
Figure 8B:
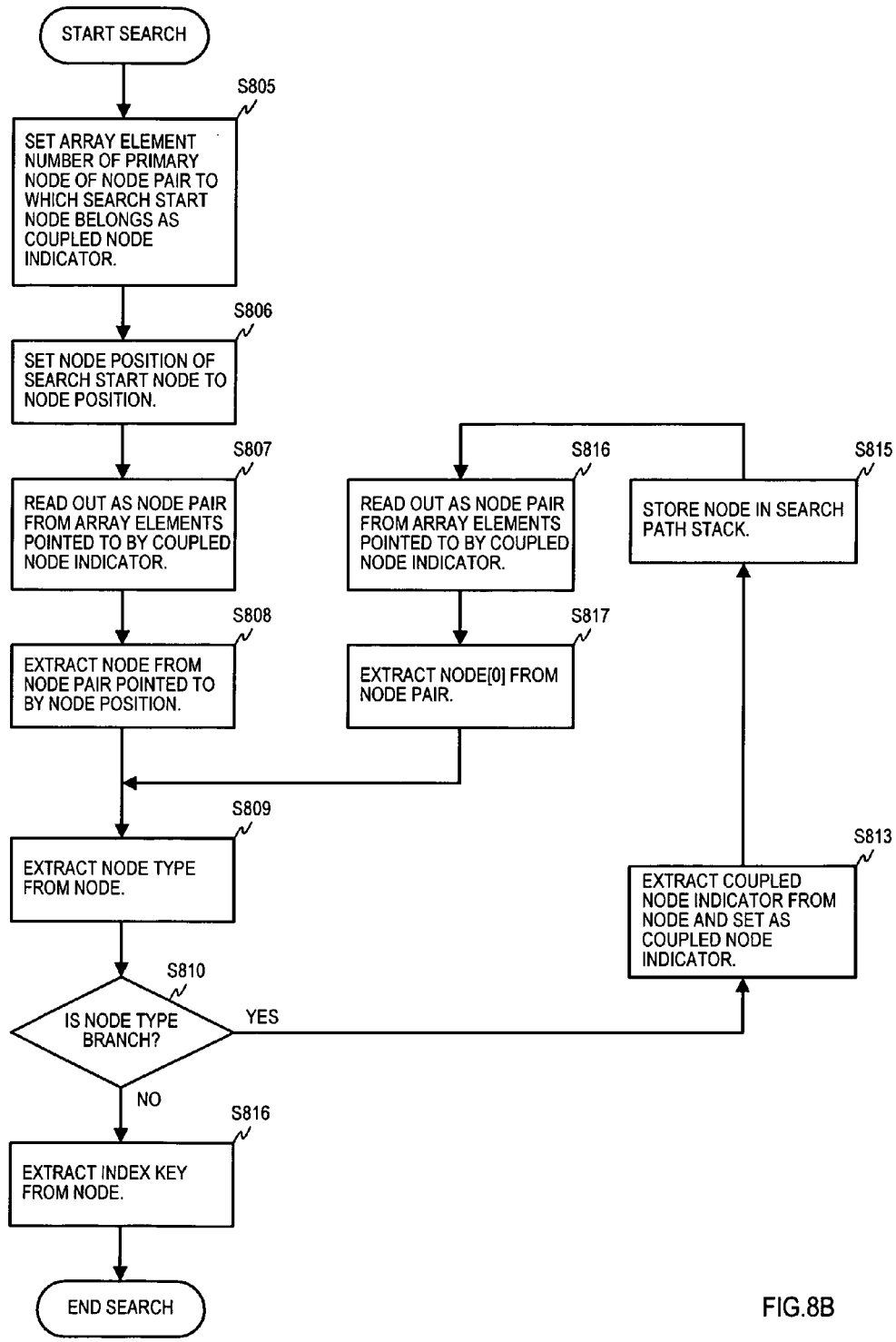
FIG. 8B is a flowchart describing the details of the search processing to obtain a minimum value of the index keys.
Figure 8C:
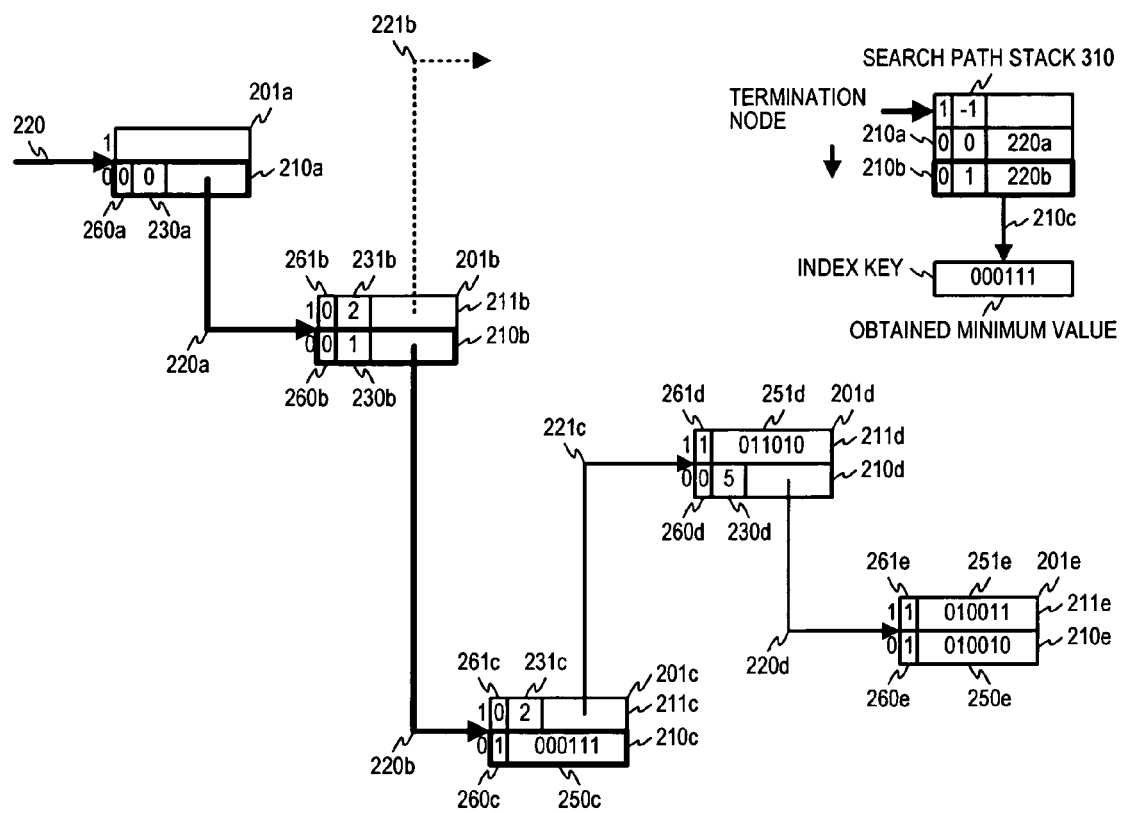
FIG. 8C is a drawing describing an example of the minimum value search processing for a coupled node tree.

Next, referencing FIG. 8A, FIG. 8B, and FIG. 8C, the minimum value search processing related to a preferred embodiment of this invention is described wherein the minimum value of the index keys stored in a coupled node tree (including a subtree) is obtained.

FIG. 8A is a drawing describing, in general, the processing for determining the minimum value of the index keys stored in a coupled node tree (including a subtree). Because of the disposition of index keys on the tree as described above, the processing to determine the minimum value of index key corresponds to traversing nodes [0] over the tree from the search start node until reaching a leaf node. The basic search shown in FIG. 4A and FIG. 4B corresponds to a search wherein the node position is always "0". In other words it corresponds to a search wherein the bit values of the search key are all "0".

Step S801 shown in FIG. 8A corresponds to step S401 shown in FIG. 4A and step S802 corresponds to step S402, and since, as described above, the node position can be fixed at "0" there is no necessity to set the search key and branch according to its bit values. Thus steps corresponding to step S403 can be omitted.

In the following step S804, the array is searched from the search start node set in step S801, and the minimum value of the index keys is obtained. The details of the search processing to obtain the minimum value of the index keys is described next, referencing FIG. 8B.

As shown in FIG. 8B, in step S805, the array element number of the primary node of the node pair to which the search start node belongs is set in the coupled node indicator setting area.

Next, in step S806, the node position, which shows in which position in the node pair the search start node is positioned, is set in the node position setting area.

Next, proceeding to step S807, the pair of array elements pointed to by the coupled node indicator set in the coupled node indicator setting area is read out from the array as a node pair.

Next, in step S808, the node pointed to by the node position set in the node position setting area in step S806 is extracted from the read-out node pair.

Next, in step S809, the node type is extracted from the node extracted in step S808 or in step S817 (described below), and processing proceeds to step S810.

At step S810, a determination is made whether the node type extracted in step S809 is that of a branch node.

If the node type is not that of a branch node, the node extracted in step S808 or step S817 is a leaf node, and processing proceeds to step S818, and an index key is extracted from the node as the search results, that is, as the minimum value, and processing is terminated.

If the determination in step S810 is positive, and thus the node type extracted in step S809 is that of a branch node, processing returns to step S809 after the processing of step S813 and steps S815 to S817, and this loop processing is repeated until the determination processing at step S810 confirms that a leaf node has been extracted.

At step S813, a coupled node indicator is extracted from the node and set in the coupled node indicator setting area. Next, at step S815, the node is stored in the search path stack.

Next, proceeding to step S816, the pair of array elements pointed to by the coupled node indicator set in the coupled node indicator setting area is read out from the array as a node pair.

Next, in step S817, the node that is a node [0] is extracted from the node pair read-out at step S816, and processing returns to step S809. Thus as described above, the processing of steps S809 to S817 is repeated until confirmation is made in the determination processing at step S810 that a leaf node has been extracted.

FIG. 8C is a drawing describing an example of a minimum value search using a coupled node tree, and it shows, of the coupled node tree illustrated in FIG. 2B, the root node 210a and the subtree levels from node 210b and below, related to the minimum value search.

In the initialization processing, root node 210a is set as the search start node, the array element number 220 is set as the coupled node indicator, and a termination node is stored in search path stack 310. In addition, the node position 0 of root node 210a is set as the node position.

Next, the node 210a pointed to by the initially set node position is extracted from the node pair 201a pointed to by the array element number 220 set as the coupled node indicator, and a determination is made of the node type 260a, and since it indicates a branch node, the coupled node indicator 220a is extracted and set in the coupled node indicator setting area while node 210a is stored in search path stack 310.

Next, the node 210b that is a node [0] is extracted from the node pair 201b pointed to by the coupled node indicator 220a, and a determination is made of the node type 260b, and since it indicates a branch node, the coupled node indicator 220b is extracted and set in the coupled node indicator setting area while node 210b is stored in search path stack 310.

In addition, the node 210c that is a node [0] is extracted from the node pair 201c pointed to by the coupled node indicator 220b, and a determination is made of the node type 260c, and since it indicates a leaf node, the index key "000111" is extracted as the minimum value.

In the example noted above, although the search start node is the root node whose node position is 0, if the search start node were made 211c, the coupled node indicator would be initialized with 220b and the node position would be initialized with 1, and node pair 201c would be read out wherefrom node 211c would be extracted.

Figure 9A:
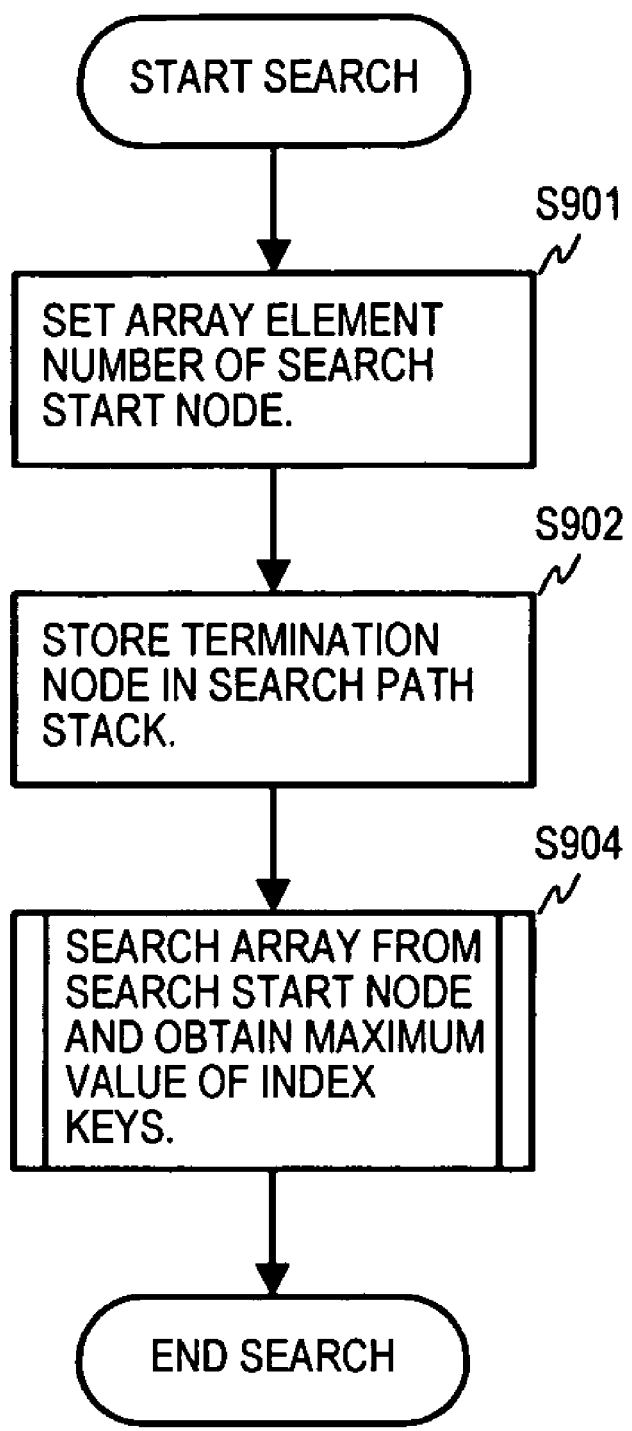
FIG. 9A is a drawing describing in general the processing to obtain a maximum value of the index keys stored in a coupled node tree.
Figure 9B:
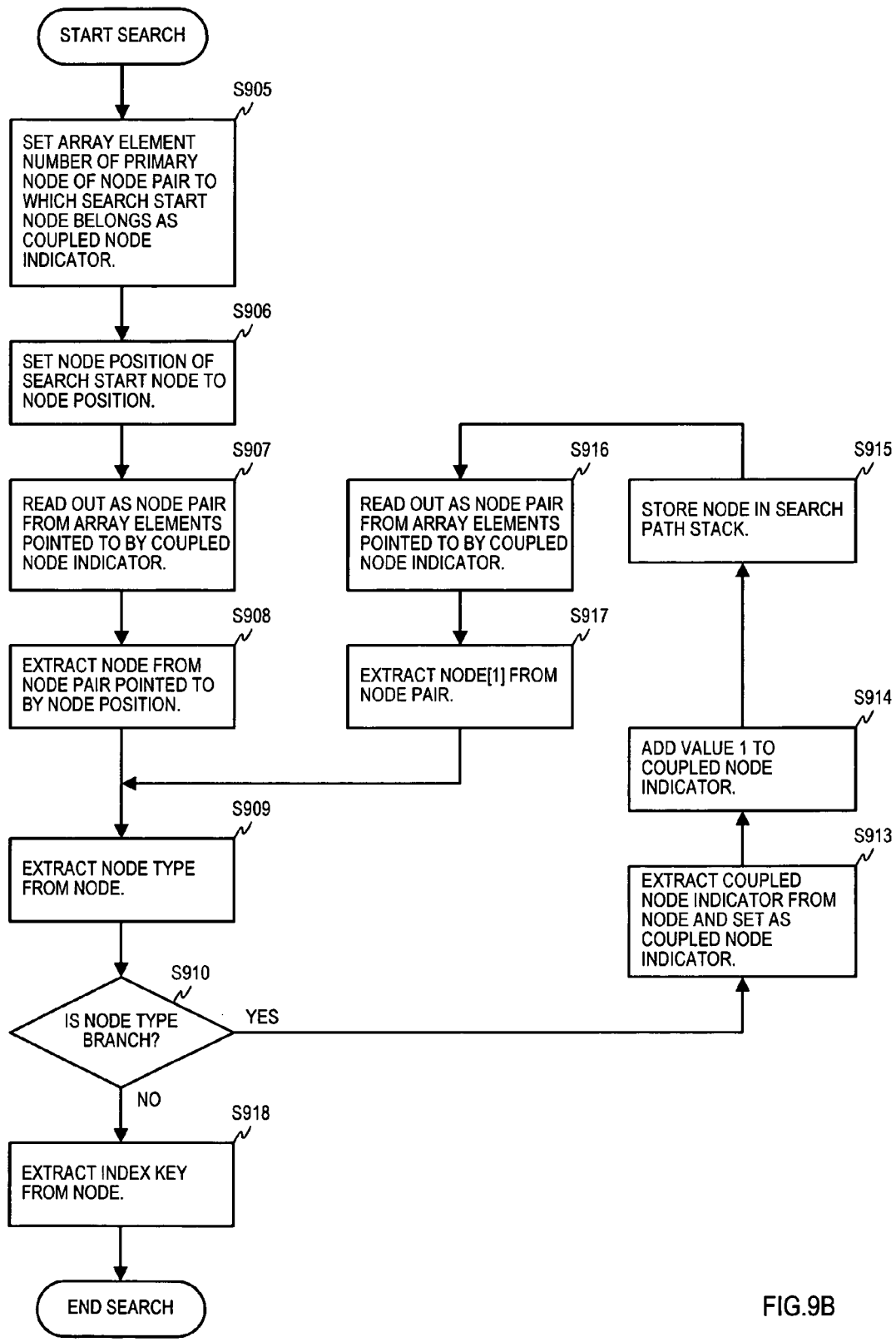
FIG. 9B is a flowchart describing the details of the processing to obtain a maximum value of the index keys.
Figure 9C:
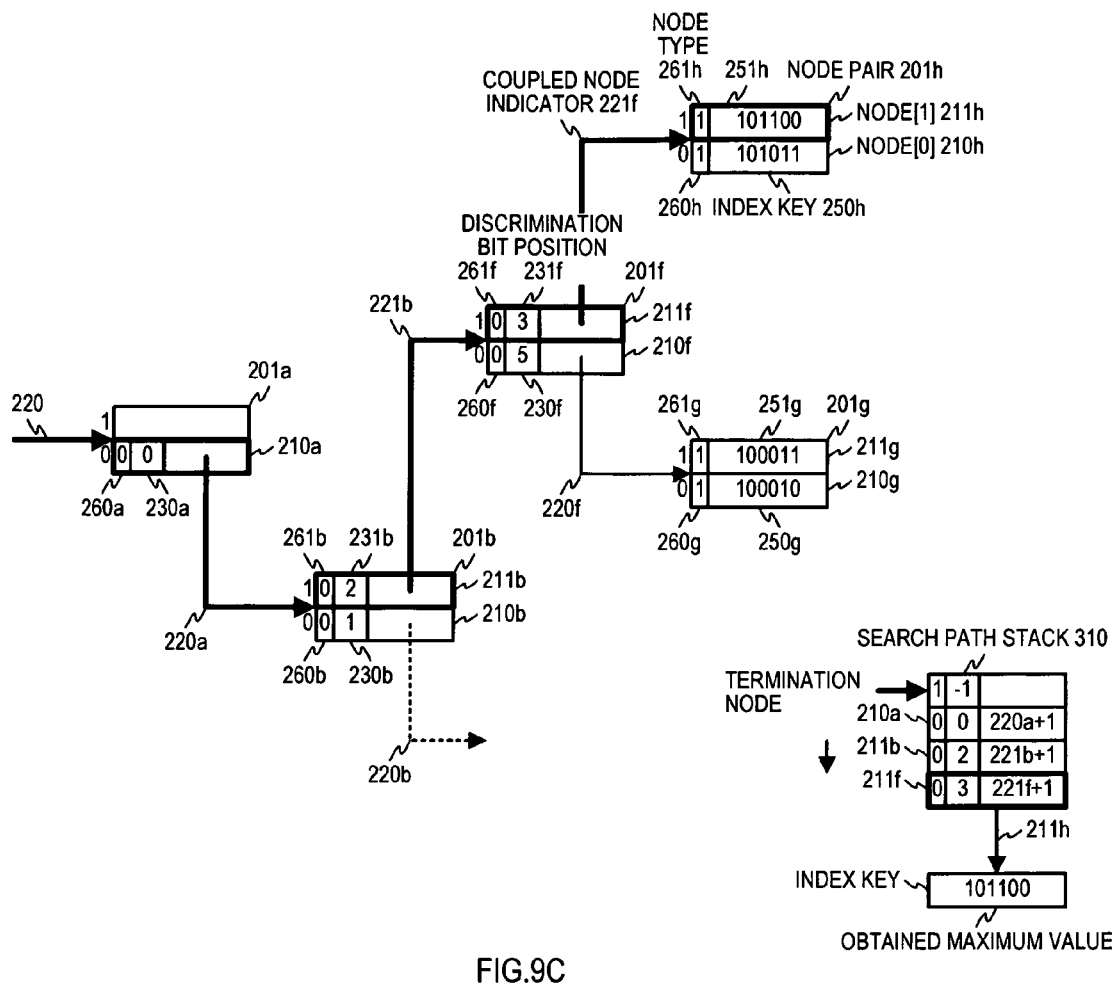
FIG. 9C is a drawing describing an example of the maximum value search processing for a coupled node tree.

Next, referencing FIG. 9A, FIG. 9B, and FIG. 9C, the maximum value search processing that obtains the maximum value of the index keys store in a coupled node tree (including a subtree) in accordance with a preferred embodiment of this invention is described.

This maximum value search processing is a processing that has a mirror relationship with the minimum value search processing described above and corresponds to a process wherein the value "0" used in the minimum value search is replaced with "1".

FIG. 9A is a drawing describing in general the processing flow to obtain the maximum value of the index keys stored in a coupled node tree (including a subtree). From the arrangement of the index keys in the tree as described above, the search processing to obtain the maximum value of the index keys corresponds to traversing the nodes [1] in the tree from the search start node until a leaf node is reached. Simply speaking, in the basic search shown in FIG. 4A and FIG. 4B, it corresponds to a search wherein the node position is always "1". Saying it differently, it corresponds to a search with a search key wherein all the bit positions are "1".

Step S901 and step S902 shown in FIG. 9A correspond to step S401 and step S402 shown in FIG. 4A, and as described above, since the node position can be fixed to be "1", it is unnecessary to set a search key and to branch depending on the bit values. Thus a step corresponding to step S403 can be omitted. In the next step, in step S904, a search of the array is performed from the search start node set in step S901, and the maximum value of the index keys is obtained. Details of this search processing to obtain the maximum value of the index keys is explained next, referencing FIG. 9B.

As shown in FIG. 9B, in step S905, the array element number of the primary node of the node pair to which the search start node belongs is set in the coupled node indicator setting area.

Next, in step S906, the node position, which shows in which of the node pair the search start node is positioned, is set in the node position setting area.

Next, proceeding to step S907, the pair of array elements pointed to by the coupled node indicator set in the coupled node indicator setting area is read out from the array as a node pair.

Next, in step S908, the node pointed to by the node position set in the node position setting area in step S906 is extracted from the read-out node pair.

Next, in step S909, the node type is extracted from the node extracted in step S908 or in step S917 (described below), and processing proceeds to step S910.

At step S910, a determination is made whether the node type extracted in step S909 is that of a branch node.

If the node type is not that of a branch node, the node extracted in step S908 or step S917 is a leaf node, and processing proceeds to step S918, and an index key is extracted from the node as the search results, that is, as the maximum value, and processing is terminated.

If the determination in step S910 is positive, and thus the node type extracted in step S909 is that of a branch node, processing returns to step S909 after the processing of steps S913 to S917, and this loop processing is repeated until the determination processing at step S910 confirms that a leaf node has been extracted.

At step S913, a coupled node indicator is extracted from the node and set in the coupled node indicator setting area.

Next, proceeding to step S914, the value "1" is added to the coupled node indicator set in the coupled node indicator setting area, and the result is stored in the coupled node indicator of the node and at step S915, that node is stored in the search path stack.

Next, proceeding to step S916, the pair of array elements pointed to by the coupled node indicator set in the coupled node indicator setting area is read out from the array as a node pair.

Next, in step S917, the node that is a node [1] is extracted from the node pair read-out at step S916, and processing returns to step S909. Thus as described above, the processing of steps S909 to S917 is repeated until confirmation is made in the determination processing at step S910 that a leaf node has been extracted.

FIG. 9C is a drawing describing an example of a maximum value search using a coupled node tree, and it shows, of the coupled node tree illustrated in FIG. 2B, the root node 210a and the subtree levels from node 210b and below, related to the maximum value search.

In the initialization processing, root node 210a is set as the search start node, the array element number 220 is set as the coupled node indicator, and a termination node is stored in search path stack 310. In addition, the node position 0 of root node 210a is set as the node position.

Next, the node 210a pointed to by the initially set node position is extracted from the node pair 201a pointed to by the array element number 220 set as the coupled node indicator, and a determination is made of the node type 260a, and since it indicates a branch node, the coupled node indicator 220a is extracted and set in the coupled node indicator setting area while node 210a whose coupled node indicator holds 210a+1 is stored in search path stack 310.

Next, the node 211b that is a node [1] is extracted from the node pair 201b pointed to by the coupled node indicator 220a, and a determination is made of the node type 261b, and since it indicates a branch node, the coupled node indicator 221b is extracted and set in the coupled node indicator setting area while node 211b whose coupled node indicator holds 221b+1 is stored in search path stack 310.

Next, the node 211f that is a node [1] is extracted from the node pair 201f pointed to by the coupled node indicator 221b, and a determination is made of the node type 261f, and since it indicates a branch node, the coupled node indicator 221f is extracted and set in the coupled node indicator setting area while node 211f whose coupled node indicator holds 221f+1 is stored in search path stack 310.

In addition, the node 211h that is a node [1] is extracted from the node pair 201h pointed to by the coupled node indicator 221f, and a determination is made of the node type 261h, and since it indicates a leaf node, the index key "101100" is extracted as the maximum value.

The above described the minimum/maximum value search processing related to a preferred embodiment of this invention, but if the purpose of the search is only to search for minimum/maximum values, just as in the case of the basic search, there is no need to stack nodes in the search path stack. However, in order to enable the various processing operations described hereinafter to utilize the history information of the link path from the search start node to the leaf node that is generated in minimum/maximum value searches, the description said that nodes on the link path are stored in the search path stack.

Figure 10A:
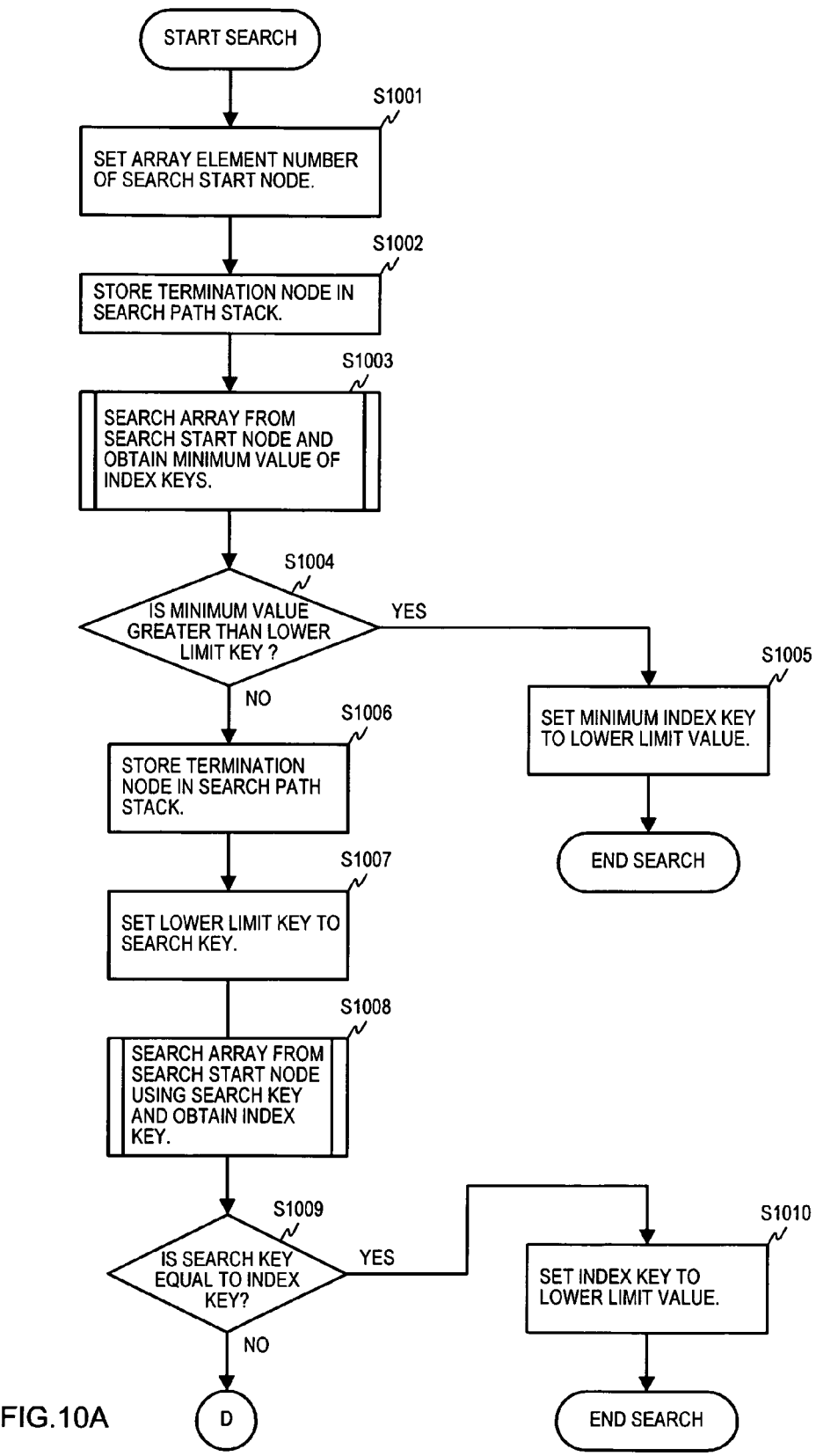
FIG. 10A is a drawing describing the beginning stage of processing for determining the lower limit value.
Figure 10B:
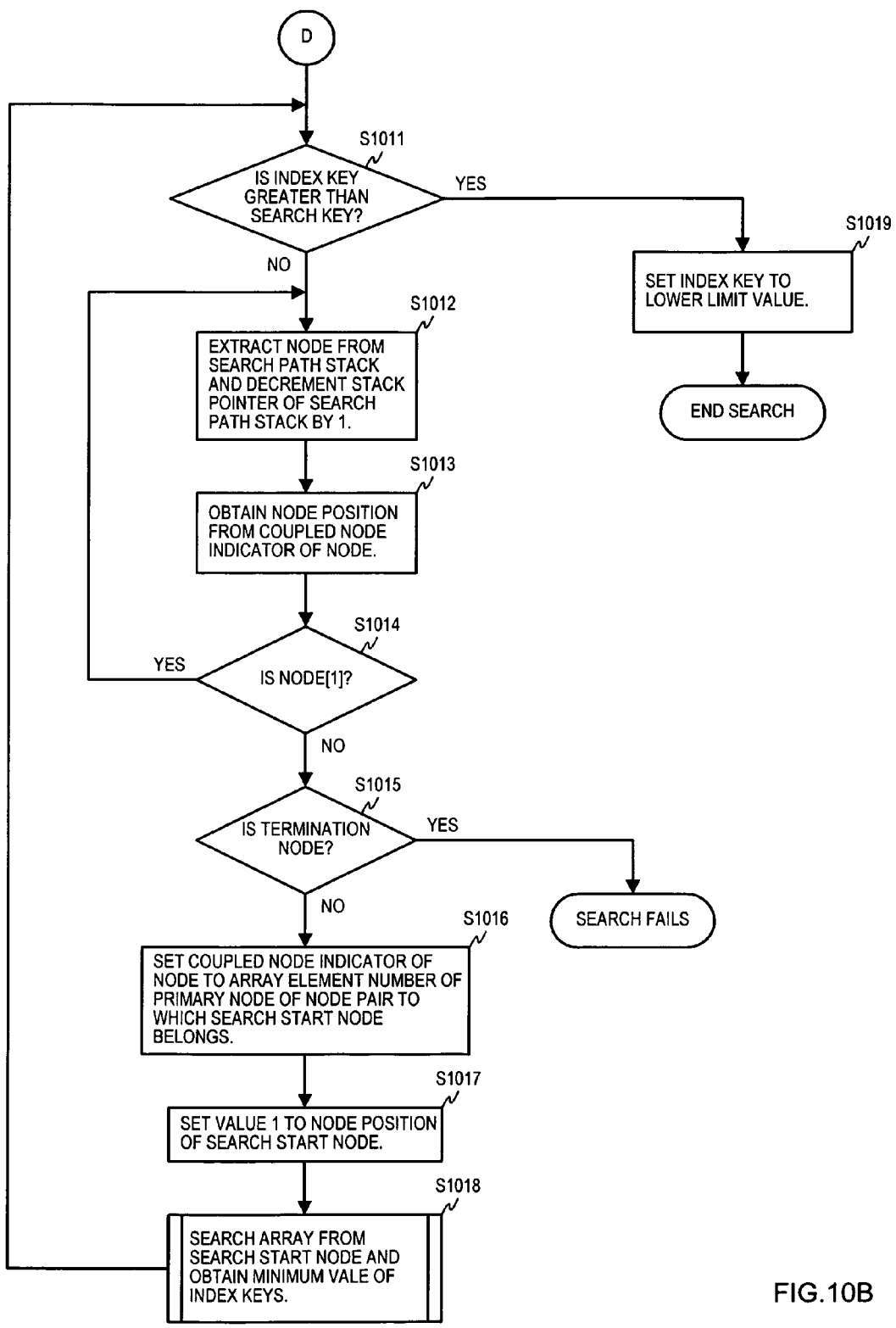
FIG. 10B is a drawing describing the latter stage of processing for determining the lower limit value.
Figure 10C:
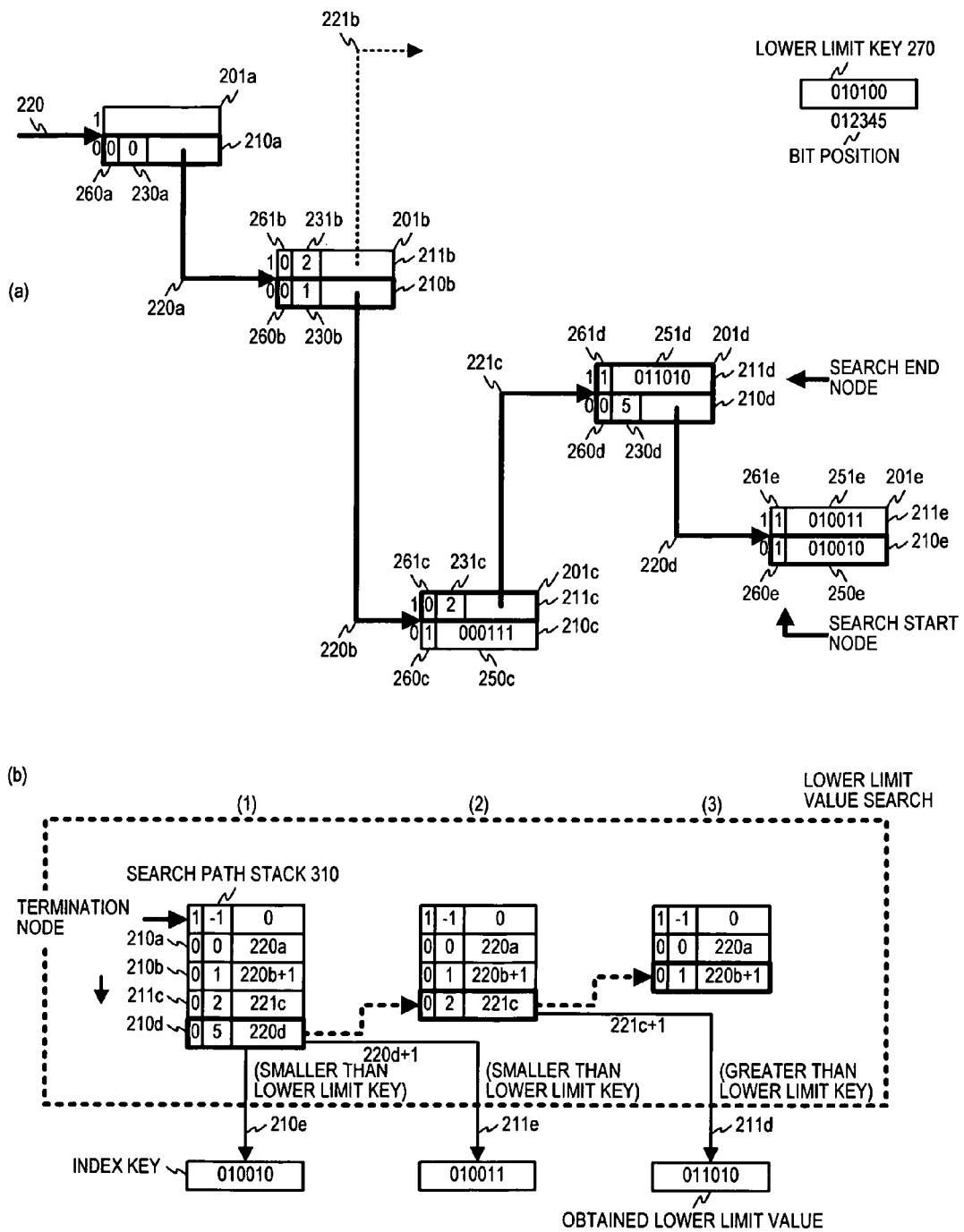
FIG. 10C is a drawing describing an example of lower limit searches for a coupled node tree.

Next, referencing FIG. 10A, FIG. 10B, and FIG. 10C, the lower limit search processing related to a preferred embodiment of this invention is described wherein the lower limit value of the index keys stored in a coupled node tree (including a subtree) is obtained. Here, lower limit value means the minimum value of the index keys equal to or greater than the specified lower limit key.

FIG. 10A and FIG. 10B are flowcharts showing the processing for determining the lower limit value of the index keys stored in the coupled node tree. In the processing for determining the lower limit value shown in FIG. 10A and FIG. 10B, when performing a search with regard to a search range specified by a user or the like, a range in which the index key cannot take on values is not searched, the actual search being performed only over a range of values within which the index key is included. In FIG. 10A and FIG. 10B, the processing for obtaining the specified lower limit key is omitted. Various subsequent applied searches are omitted in the same manner.

First, at step S1001, the search start node is set. Just as was stated hereinbefore in the description of the basic search shown in FIG. 4A, to set a search start node is to specify or acquire an array element number of a search start node and to set that array element number or the node of that array element number in a search start node setting area, which area is not shown. The above noted point equally applies to other applied searches that are described later.

Next, in step S1002, a termination node is stored in the search path stack.

At step S1003 the minimum value search processing shown in FIG. 8B is performed to obtain the minimum index key value. Then, at step S1004 a comparison is performed between the lower limit key and the minimum value obtained at step S1003 to determine whether the minimum value is equal to or larger than the lower limit key. If the minimum value is equal to or larger than the lower limit key, processing proceeds to step S1005, at which the minimum value determined at step S1003 is set as the lower limit value, and processing is terminated.

In step S1004, if the determination is that the minimum value obtained in step S1002 is smaller than the lower limit key, at step S1006 a termination node [0] is stored in the search path stack, and processing proceeds to step S1007.

At step S1007, the lower limit key is set as the search key. Next, at step S1008, using that search key, the array is searched by means of the bit string search method described previously referencing FIG. 4B, with the search start node set in step S1001 as the search start node, and an index key is obtained.

Then, at step S1009 a comparison is made between the search key and the index key obtained as a result of the search at step S1008 to determine whether or not the values coincide. If the determination is made that the search key and the index key coincide, processing proceeds to step S1010, at which the index key obtained by the search is set as the lower limit value, and processing is terminated.

If the determination is made that the search key and the index key are not equal, processing proceeds to step S1011 in FIG. 10B.

At step S1011, the relative magnitude relationship between the search key and the index key is determined. At this point, if the index key is smaller than the search key, that is, the lower limit key, that means that the index key is not included in the search range specified by the user or some other means.

However, if the index key is larger than the search key, that means that the index key is within the specified search range. That being the case, if the determination is made that the index key is larger than the search key, processing proceeds to step S1019, and the index key is set as the lower limit value, and the processing is terminated.

Conversely, if the determination in step S1011 is made that the index key is smaller than the search key, processing proceeds to step S1012. The processing of steps S1012 to S1018 is the processing to extract keys in ascending order based on ordering of the coupled node tree. As was noted above, when a coupled node tree is traversed to a leaf node prioritizing the node [1] side and the depth direction, the index keys stored there are sorted in a descending sequence.

Thus to extract index keys in ascending order, it is sufficient to traverse a coupled node tree successively to a leaf node prioritizing the node [0] side of a node pair and the depth direction, and to extract the index key from each leaf node.

By the processing from step S1012 to step S1018 the index keys stored in the coupled node tree are successively extracted, and when an index key having a value that is larger than the lower limit key is obtained, that index key is set as the lower limit value.

First, at step S1012, a node pointed to by the stack pointer is extracted from the search path stack, and the value of the stack pointer is decremented by 1. The status of the search path stack at the first execution of step S1012 is the status the same status as when the search processing of step S1008 has been executed.

Next, in step S1013, the node position of the extracted node is acquired from the coupled node indicator of the extracted node.

Next, proceeding to step S1014, a determination is made whether the node position acquired in step S1013 is that of the node [1] side. If it is node [1] side, processing returns to step S1012, and if it is node [0] side, processing proceeds to step S1015.

At step S1015, a determination is made whether the node extracted in step S1012 is a termination node. If that node is a termination node, a lower limit value does not exist and processing is terminated as a search failure. This case is an exceptional processing case, and it is the case wherein the coupled node tree that is the target for obtaining a lower limit value is only configured with leaf nodes that hold index keys smaller than the lower limit key.

If the determination at step S1015 is that "it is not a termination node", processing proceeds to step S1016, and the coupled node indicator of the node extracted in step S1012 is set as the array element number of the primary node of the node pair to which the search start node belongs.

In addition at step S1017, the value 1 is set as the node position of the search start node, and processing proceeds to step S1018, wherein the minimum value search shown in FIG. 8B is executed, the minimum value of the index keys is acquired, and the processing returns to a relative magnitude comparison in step S1011 between the lower limit key and the acquired index key.

The above noted processing of steps S1016 and S1017 corresponds to that of steps S805 and S806 shown in FIG. 8B. At step S1016, the coupled node indicator of the node extracted in step S1012 is set as the array element number of the primary node of the node pair to which the search start node belongs, and in step S805, that coupled node indicator of the node extracted in step S1012 is set in the coupled node indicator setting area. In the same way, at step S1017, the value 1 is set as the node position of the search start node, and in step S806, that value 1 is set in the node position setting area.

By the loop processing of steps S1011 to S1018 described above, the index keys are extracted in ascending order, and when a value greater than the search key (lower limit key) is acquired, processing branches to step S1019, and that value is set as the lower limit value.

FIG. 10C is a drawing describing exemplarily a lower limit value search in a coupled node tree; and FIG. 10C (a) shows the root node 210a, subtree levels from node 210b and below, the search key setting area 270 of the coupled node tree exemplified in FIG. 2B, and the lower limit key "010100" set in the search key setting area 270. FIG. 10C (b) shows the status changes (1), (2), and (3) in the search stack 310 after a lower limit value search using a lower limit key.

When a search is executed in the above-noted step S1008 with a lower limit key "010100" and the root node 210a as the search start node, as shown in thick-line box in FIG. 10C (a), the processing traverses node 210a, node 210b, node 211c, and node 210d, then reaches node 210e, which is a leaf node, and obtains the index key "010010".

When that search is executed, as shown in section (1) of FIG. 10C (b), the termination node [0] and the branch nodes on the search path of node 210a to node 210d are successively stored in search path stack 310, and the unillustrated stack pointer points to node 210d. Then, "1" is added to the coupled node indicator of node 210b, for which the node position of its target node is "1", and the result is 220b+1.

As shown in FIG. 10C (a), node 210e becomes the search start node of the lower limit value, and the relative magnitude comparison at step S1011 shown in FIG. 10B is executed between the index key "010010" stored in node 210e and the lower limit key "010100". Since the index key "010010" is smaller than the lower limit key "010100", node 210d is extracted from search path stack 310, and the node pointed to by the stack pointer changes from node 210d to node 211c, as shown in section (2) of FIG. 10C (b).

The node position "0" is detected from the coupled node indicator 220d of node 210d. Thus the coupled node indicator 220d is set as the coupled node indicator to be used in a minimum value search shown FIG. 8B and the value "1" is set in the node position, and a minimum value search is executed. As a result, as shown in section (2) of FIG. 10C (b), the index key "010011" is extracted from the leaf node 211e, whose array element number is 220d+1. Since this index key is also smaller than the lower limit key and the node position "0" is detected from the coupled node indicator 221c of node 211c, the coupled node indicator 221c is set in the coupled node indicator to be used in a minimum value search shown FIG. 8B and the value "1" is set in the node position, and a minimum value search is executed again. As a result, as shown in section (3) of FIG. 10C (b), the index key "010010" is extracted from the leaf node 211d, whose array element number is 221*c*+1. Then, from a relative magnitude comparison with the lower limit key, this index key is obtained as the lower limit value.

Figure 11A:
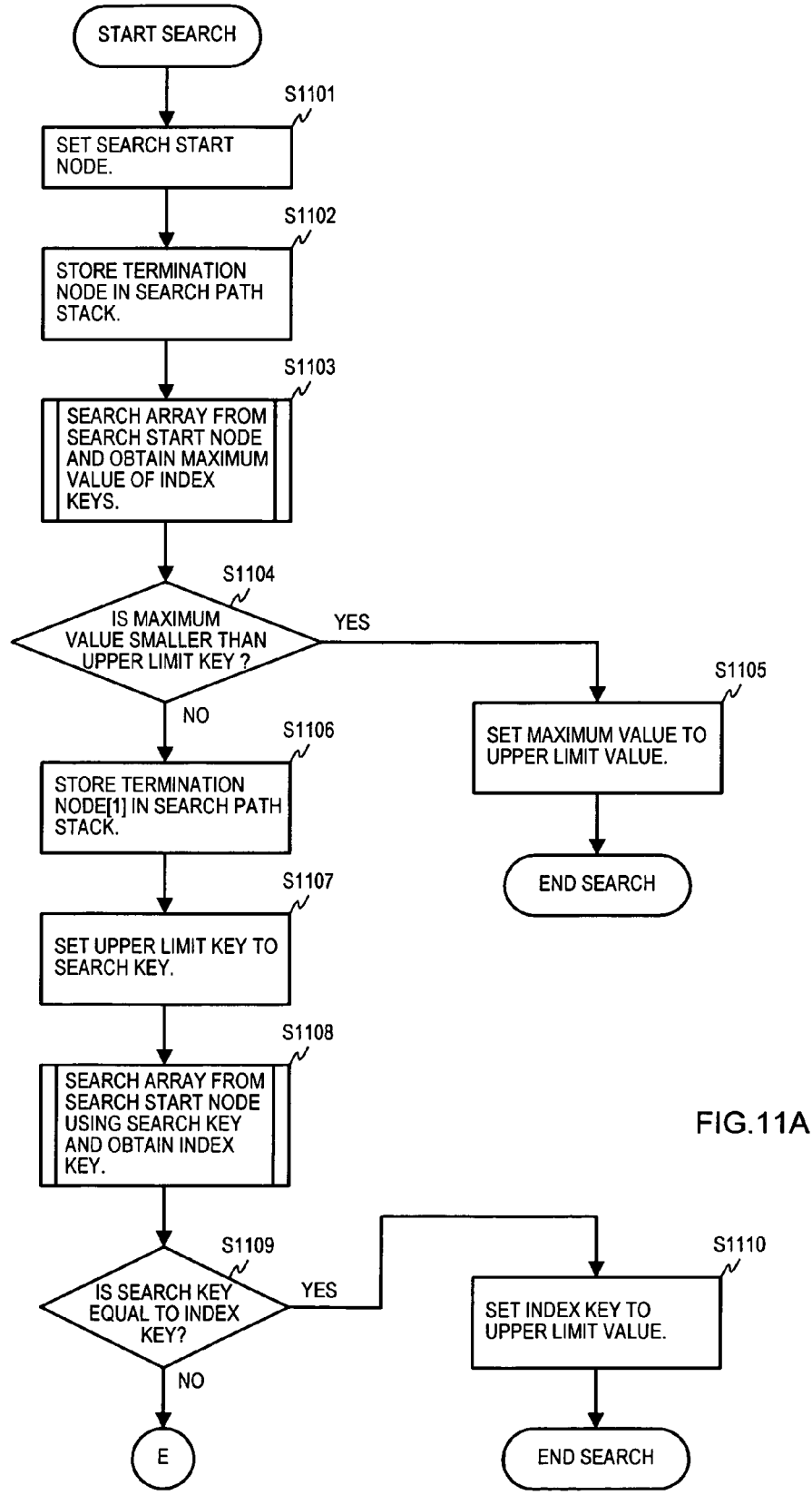
FIG. 11A is a drawing describing the beginning stage of processing for determining the upper limit value.
Figure 11B:
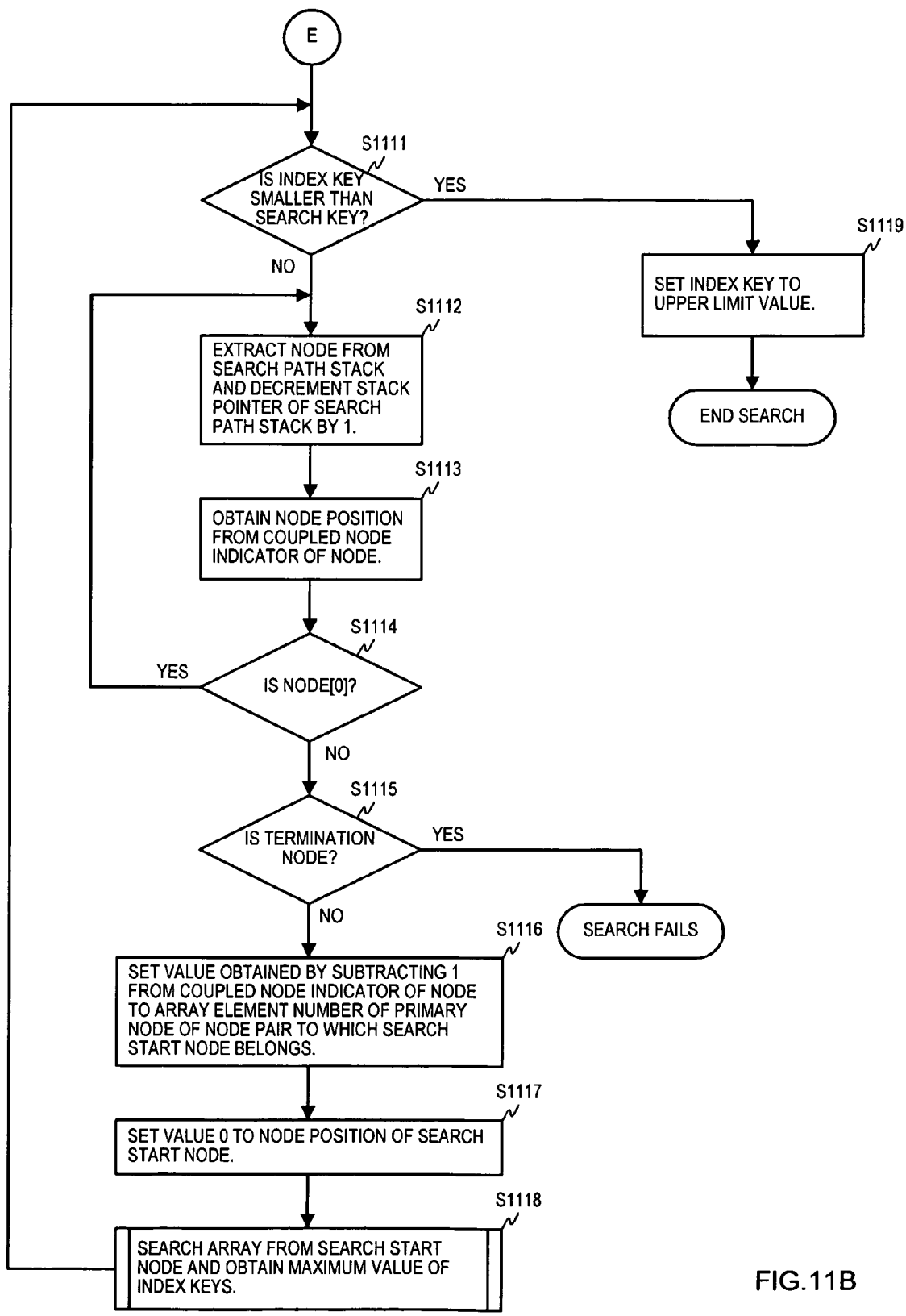
FIG. 11B is a drawing describing the latter stage of processing for determining the upper limit value.
Figure 11C:
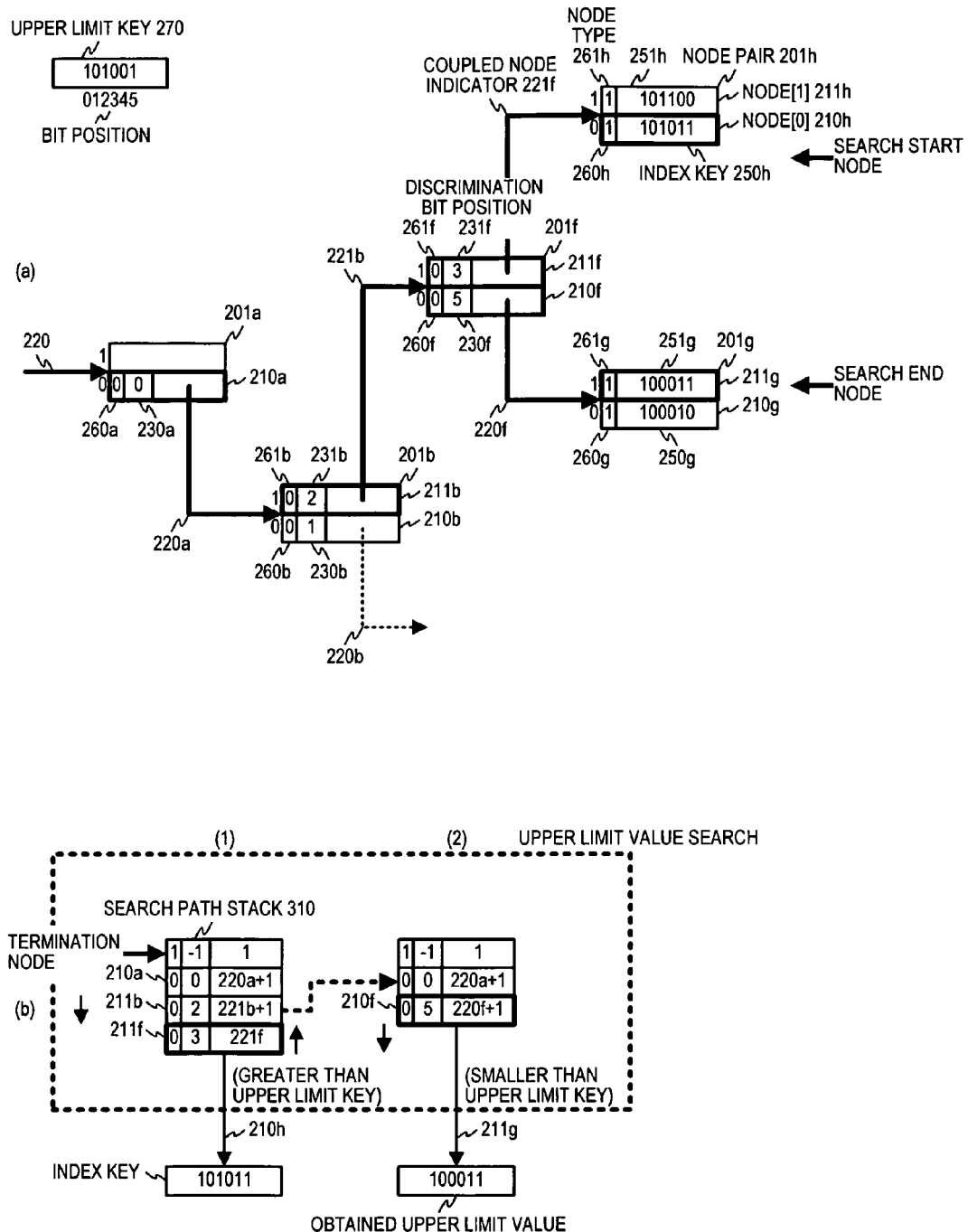
FIG. 11C is a drawing describing an example of upper limit searches for a coupled node tree.

Next, referencing FIG. 11A, 11B, and FIG. 11C, the processing for determining the upper limit value of the index keys stored in a coupled node tree (including subtrees) related to a preferred embodiment of this invention is described. The term upper limit value used herein is the maximum value of the index keys that is less than or equal to the specified upper limit key.

FIG. 11A and FIG. 11B are flowcharts showing the processing for determining the upper limit value of the index keys stored in the coupled node tree. Just as in the processing for determining the lower limit value described above, in the processing for determining the upper limit value shown in FIG. 11A and FIG. 11B, when performing a search with regard to a searching range specified by a user or the like, a range in which the index key cannot take on values is not searched, the actual search being performed only over a range of values within which the index key is included.

This upper limit search processing is a processing that has a mirror relationship with the lower limit value search processing described above and as becomes clear from the description hereinafter, it corresponds to a process wherein the node position "0" in the lower limit value search is inverted to a "1", the minimum value is replaced by the maximum value, and the relative magnitude comparison is reversed.

First, at step S1101, the search start node is set. Next, in step S1102, a termination node is set in the search path stack. At step S1103, the maximum value search processing shown in FIG. 9B is executed, and the maximum value of the index keys is obtained. Then, at step S1104, the upper limit key and the maximum value obtained in step S1103 are compared, and a determination is made whether the maximum value is equal to or lower than the upper limit key. If the maximum value is equal to or less than the value of the upper limit key, processing proceeds to step S1105 and the maximum value obtained at step S1103 is set as the upper limit value, and processing is terminated.

In step S1104, if the determination is that the maximum value obtained at step S1102 is larger than upper limit key, at step S1106, a termination node [1] is stored in the search path stack, and processing proceeds to step S1107.

At step S1107, the upper limit key is set as the search key. Next, at step S1108, using that search key, the search start node set at step S1101 is set as the search start node and the array is searched using the bit string search method described referencing FIG. 4B, and an index key is obtained.

Then, at step S1109, a determination is made as to whether the index key and the search key index key obtained at step S807 coincide. If the determination is made that these values coincide, processing proceeds to step S1110, at which the index key obtained in the search is set as the upper limit value, and processing is terminated.

If the determination is "do not coincide", processing proceeds to step S1111 of FIG. 11B. At step S1111 a determination is made of the relative magnitude relationship between the search key and the index key. If the index key is larger than the search key, that is, the upper limit key, that means that the index key is not included in the search range specified by a user or other such means.

If, however, the index key is smaller than the search key, this means that the index key is included within the range specified by the user or the like. This being the case, if the determination is made that the index key is smaller than the search key, processing proceeds to step S1119, wherein the index key is set as the lower limit value, and processing is terminated.

At step S1111, if the determination is made that the index key is larger than the search key, processing proceeds to step S1112. The processing from step S1112 to step S1118 is processing that extracts the index keys in descending order based on the ordering of a coupled node tree. As was noted above, when a coupled node tree is traversed to a leaf node prioritizing the node [1] side and the depth direction, the index keys stored there are sorted in descending sequence.

Thus, to extract the index keys in descending order, it is sufficient to prioritize the node [1] side and the depth direction when traversing to leaf nodes successively and to extract the index from each such leaf.

By the processing from step S1112 to step S1118, the index keys stored in the coupled node tree are extracted in sequence, and when an index key is obtained that has a value smaller than the search key (i.e., the upper limit key), that index key is set as the upper limit value.

First, at step S1112, a node pointed to by the stack pointer is extracted from search path stack, and the value of the stack pointer is decremented by 1. The status of search path stack at the first execution of step S1112 is the status when the search processing of step S1108 has just been executed.

Next, in step S1113, the node position of the extracted node is obtained from the coupled node indicator of the extracted node.

Next, proceeding to step S1114, a determination is made whether the node position obtained at step S1113 is a node [0] side. If it is a node [0] side, processing returns to step S1112, and if it is a node [1] side, processing proceeds to step S1115.

At step S1115, a determination is made whether the node extracted at step S1112 is a termination node. If that node is a termination node, it becomes clear that an upper limit value does not exist and processing terminates as an unsuccessful search. This case is an exceptional processing case, and it is the case wherein the coupled node tree that is the target for obtaining an upper limit value is only configured with leaf nodes that hold index keys larger than the upper limit key.

If the determination at step S1115 is that "it is not a termination node", processing proceeds to step S1116, and the coupled node indicator of the node extracted in step S1112 is set as the array element number of the primary node of the node pair to which the search start node belongs.

In addition, at step S1117, the value 0 is set as the node position of the search start node, and processing proceeds to step S1118, wherein the maximum value search shown in FIG. 9B is executed, the maximum value of the index keys is acquired, and the processing returns to a relative magnitude comparison between the upper limit key and the acquired index key in step S1111.

The above noted processing of steps S1116 and S1117 corresponds to that of steps S905 and S906 shown in FIG. 9B. At step S1116, the coupled node indicator of the node extracted in step S1112 is set as the array element number of the primary node of the node pair to which the search start node belongs, and in step S905, that coupled node indicator (of the node extracted in step S1112) is set in the coupled node indicator setting area. In the same way, at step S1117, the value 0 is set as the node position of the search start node, and in step S906, that value 0 is set in the node position setting area.

By the loop processing of steps S1111 to S1118 described above, the index keys are extracted in descending order, and when a value less than the search key (upper limit key) is acquired, processing branches to step S1119, and that value is set as the upper limit value.

FIG. 11C is a drawing describing exemplarily an upper limit value search in a coupled node tree; and FIG. 11C (a) shows the root node 210a, subtree levels from node 210b and below, the search key setting area 270 of the coupled node tree exemplified in FIG. 2B, and the lower limit key "101001" set in the search key setting area 270. FIG. 11C (b) shows the status changes (1) and (2) in the search stack 310 after a search by a upper limit value search using an upper limit key.

When a search is executed in the above-noted step S1108 with an upper limit key "101001" and the root node 210a as the search start node, as shown in thick-line box in FIG. 11C (a), the processing traverses node 210a, node 211b, and node 211f, then reaches node 210h, which is a leaf node, and obtains the index key "101011".

When that search is executed, as shown in section (1) of FIG. 11C (b), the termination node [1] and the branch nodes on the search path of node 210a to node 211f are successively stored in search path stack 310, and the unillustrated stack pointer points to node 211f. Then, "1" is added to the coupled node indicators of nodes 210a and 210b, for which the node positions of their target nodes are "1", and the result is 220a+1 and 220b+1 respectively.

As shown in FIG. 11C (a), node 210h becomes the search start node of the upper limit value, and the relative magnitude comparison at step S1111 shown in FIG. 11B is executed between the index key "101011" stored in node 210h and the upper limit key "101001". Since the index key "101011" is larger than the upper limit key "101001", node 211f is extracted from search path stack 310, and the node pointed to by the stack pointer changes from node 211f to node 211b, as the arrow shows in section (2) of FIG. 11C (b).

Since the node position "0" is detected from the coupled node indicator 221f of node 211f, the loop processing of steps S1114 to S1112 shown in FIG. 11B is executed. Then, at step S1112, node 211b is extracted, and the stack pointer, as shown by the arrows connected with a dotted line between section (1) and (2) of FIG. 11C (b), points to node 210a. The node position "1" is detected from the coupled node indicator 221b+1 of node 211b.

Thus the coupled node indicator 221b, after having "1" decremented from the coupled node indicator 221b+1 of node 211b stored in search path stack 310, is set as the coupled node indicator to be used in a maximum value search shown FIG. 9B and the value "0" is set in the node position, and a maximum value search is executed. As a result, as shown in section (2) of FIG. 11C (b), the index key "100011" is extracted from the leaf node 211g, whose array element number is 220f+1. Then, from a relative magnitude comparison with the upper limit key, this index key is obtained as the upper limit value.

Next, the methods of splitting and conjoining a coupled node tree related to a preferred embodiment of the present invention is described. Splitting of a coupled node tree means that when a split key formed by a given bit string is specified, the relative magnitude relationship between the index keys included in the coupled node tree and the split key is used to perform splitting into two groups, thereby generating two coupled node trees formed by index keys that belong to each of the groups.

With regard to splitting by magnitude relationship, although in the description that follows hereunder splitting is done into a group that is larger than the split key and a group that is smaller than or equal to the split key, even in the case in which splitting is done into a group that is larger than or equal to the split key and a group that is smaller than the split key, splitting/conjoining can be done in the same manner, as can be easily understood from the following description.

That is, the split key is a key used to establish where the coupled node tree is to be split.

The conjoining of coupled node trees is the generation of a coupled node tree corresponding to the union of two sets of index keys from two coupled node trees corresponding to the two index key sets. In the present invention, it is assumed that the product set of the two sets of index keys is an empty set.

Below three embodiments of the present invention are described for the split/conjoin processing of a coupled node tree, but, in that description, a coupled node tree is sometimes referred to simply as a tree.

The first embodiment of the present invention is one in which the minimum index key value in the processing source tree (herein sometimes referred to simply as the processing source) that is to be split is extracted, the extracted minimum index key value is inserted into the processing target tree (sometimes referred to simply as the processing target) generated by splitting the processing source and processing to delete the minimum index key value from the processing source tree is performed repeatedly as long as the minimum value is equal to or less than the split key, to split the processing target from the processing source tree that is to be split.

Figure 12A:
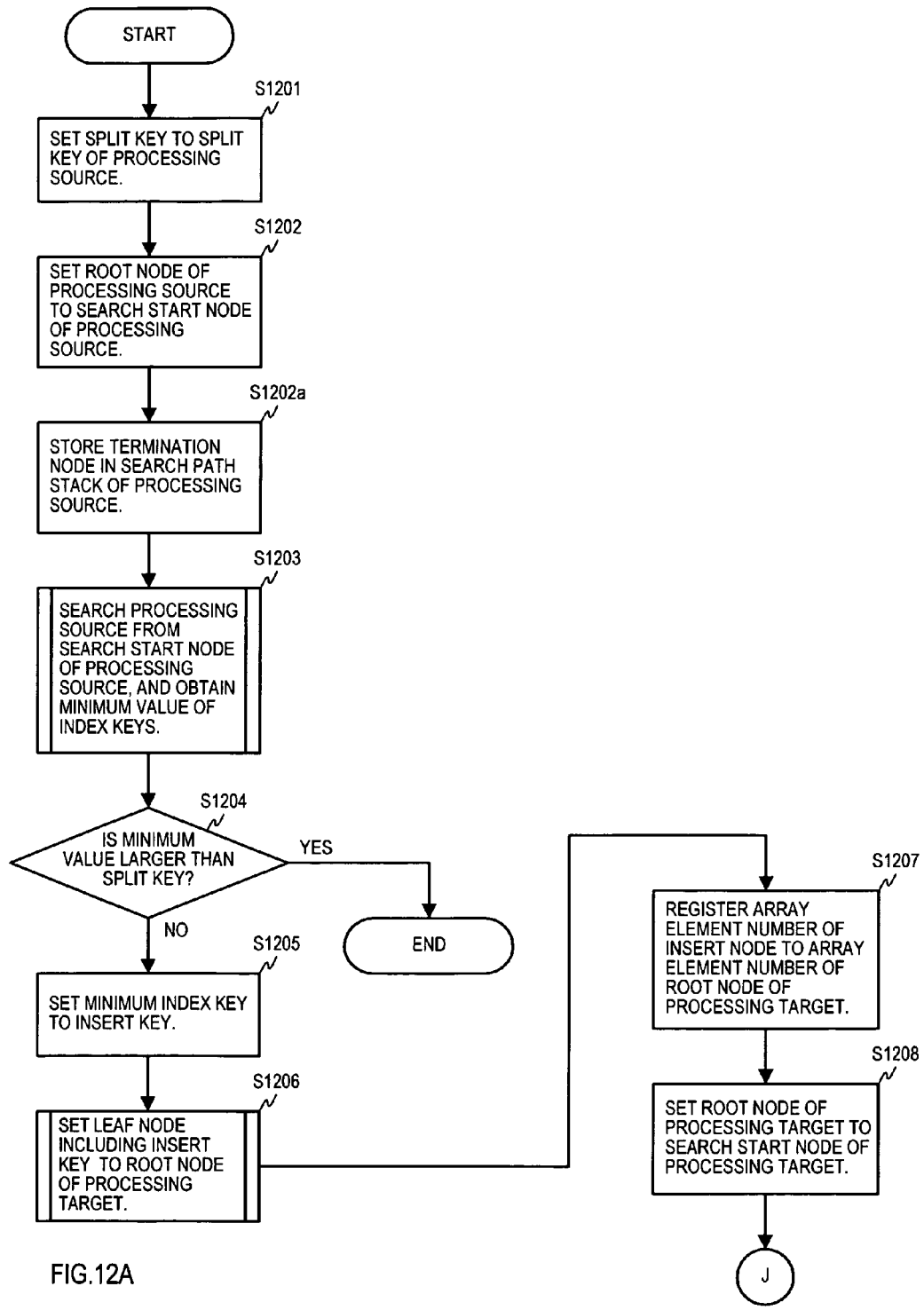
FIG. 12A is a flowchart describing the beginning stage processing related to the initializing of the processing target and so forth in a first exemplary embodiment of the splitting process of a coupled node tree related to a preferred embodiment of this invention.
Figure 12B:
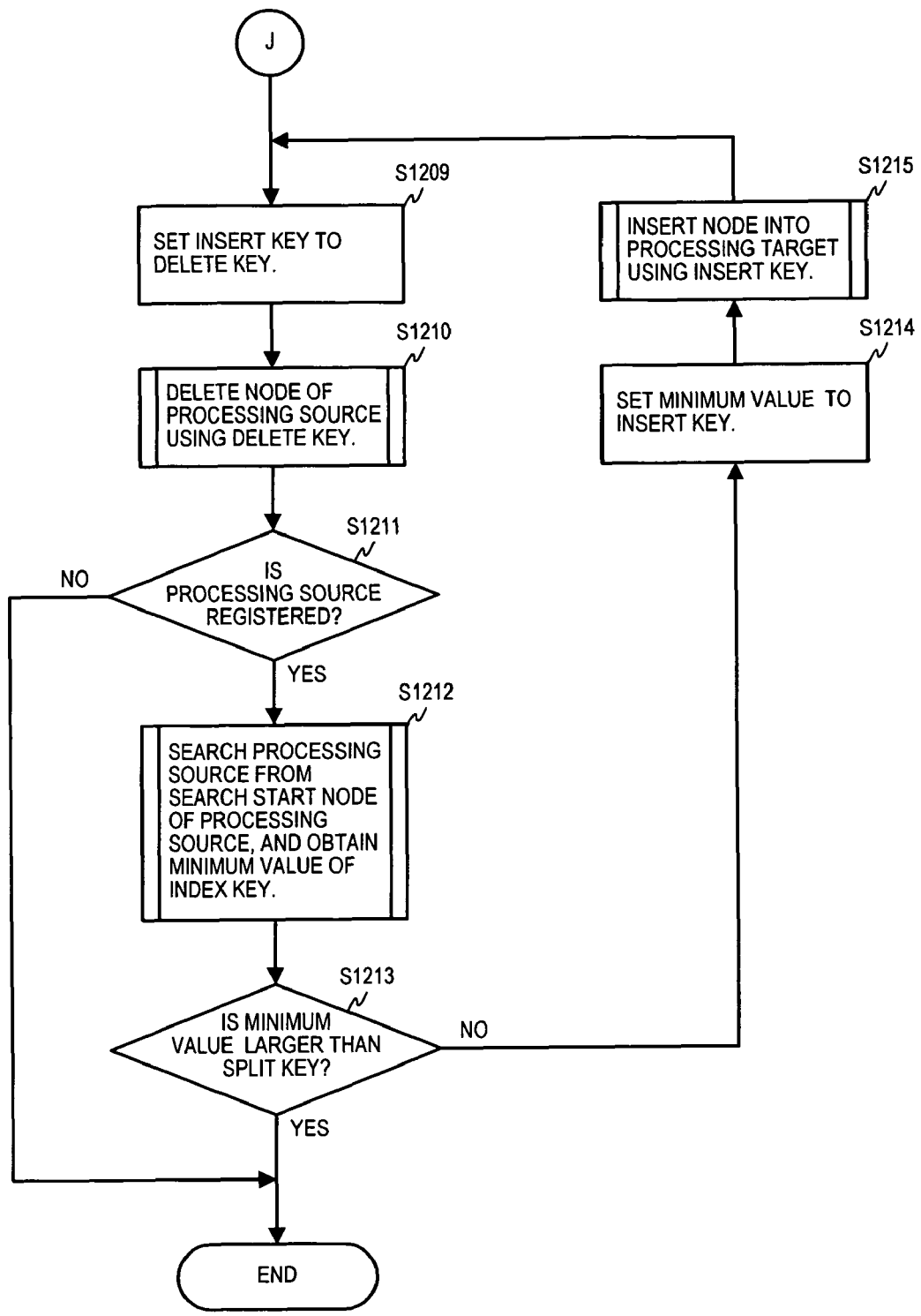
FIG. 12B is a flowchart describing the latter stage processing of the splitting process in the first exemplary embodiment.

Referencing FIG. 12A and FIG. 12B, the split processing flow of a coupled node tree in the first embodiment of the present invention is described.

FIG. 12A is a drawing describing the processing related to the initialization and so forth of the processing target, which processing is the beginning stage of the split processing in the first embodiment of the present invention.

At the first step, step S1201, the specified split key is set as the split key for the processing source. The specification of the split key can be made by external input by an operator, and can also be made as a result of processing by a computer program, or by a remotely issued command. The specified split key is set into an area in memory for holding the split key in the processing source.

Next, at step S1202 the root node of the processing source is set as the search start node in the processing source, and in step S1202a, a termination node is set in the search path stack of the processing source, and processing proceeds to step S1203.

At step S1203, the minimum value search shown in FIG. 8B is performed from the search start node of the processing source, that is to say, from the root node set in the search start node at step S1202, and the minimum value is acquired.

Next, in step S1204, a determination is made whether that minimum value is larger than the split key. If the minimum value of the processing source is larger than the split key from the very beginning, from the fact that index keys lower than the split key are not included in the processing source, processing terminates. The above initial processing is the same for the split processing in the second and third preferred embodiments.

If the minimum value acquired in the minimum value search of step S1203 is smaller than the split key, processing proceeds to step S1205, and that minimum value is set as the insert key for the insert processing of the processing target.

Next, in step S1206, the processing to set the leaf node holding the insert key (insert node) into the root node shown in FIG. 6B is executed. Then, proceeding to step S1207, the array element number of the insert node is registered as the array element number of the root node of the processing target, and, at step S1208, by setting the root node of the processing target as the search start node of the processing target, the initialization of the processing target is completed, and continuing, processing moves to step S1209 shown in FIG. 12B.

FIG. 12B is a drawing describing the processing of the latter stage of the split processing in accordance with the first preferred embodiment of this invention.

As shown in FIG. 12B, in step S1209, the insert key from step S1205 or from the step S1214 described later is set in the delete key for the delete processing of the processing source, and in step S1210, the leaf node holding the delete key is deleted from the tree of the processing source by the delete processing shown in FIG. 7A and FIG. 7B.

At the next step, S1211, a determination is made as to whether or not the processing source tree is registered. If the result of the determination is that the processing source tree is not registered, this means that the entire processing source tree has been deleted. So, this is an exceptional case in which the split key is equal to or larger than the maximum index key value in the processing source tree, in which case processing is terminated.

If the processing source tree is registered, processing proceeds to step S1212, at which the processing shown in FIG. 8A is executed from the root node that has been set as the search start node at step S1202 to obtain the minimum value of the index keys.

Next, proceeding to step S1213, a determination is made as to whether or not the minimum value obtained at step S1204 is larger than the split key. If the minimum value is larger than the split key, because the tree splitting has been completed, the processing is ended. If it is not equal or smaller, processing moves to step S1214.

At step S1214, the minimum value obtained at step S1212 is set as the insert key of the processing target.

Next, at step 1215, a node is inserted in the processing target tree by executing the insert processing shown in FIG. 5A and FIG. 5B, using the insert key, and processing returns to steps S1209 and S1210, which are the processing to delete a node from the processing source tree.

By repeating the above loop processing of steps S1209 to S1215 until the determination in step S1213 is that the minimum value acquired at step S1212 is larger than the split key, the splitting of a tree is enabled.

Although, in the above description of splitting processing, deletion is done successively from the minimum index key of the processing source, it will be clearly understood by a person skilled in the art that it is possible to perform successive deletion from the maximum value of the index key in the same manner. In this case, steps S1203 and S1212 are processing for determining the maximum value of the index key, steps S1204 and S1213 are processing to determine the magnitude relationship between the maximum value and the split key, and at step S1214 the maximum value is set as the insert key of the processing target.

Although the foregoing is a description of split processing, it is possible to execute conjoining processing as well by the processing flow shown in FIG. 12A and FIG. 12B.

Taking one of two trees to be conjoined as the processing source tree, if the split key is taken as equal to or larger than the maximum index key value in the processing source tree, conjoining processing corresponds to the exceptional processing described above, in which the processing source tree is deleted and conjoined to the processing target tree. In the case in which the maximum index key value in the processing source tree is unknown, the split key is determined beforehand by the maximum value search processing shown in FIG. 9A.

Then, since the processing target is already registered, steps S1205 to S1207 can be omitted, and because the split key is taken to be equal to or larger than the maximum index key value in the processing source tree, the split key is always larger than the minimum value in the magnitude relationship comparisons of steps S1204 and S1213 and thus branches are always made to either step S1205 or S1214, so steps S1204 and S1213 can be omitted. If that is the case, because there is no meaning to setting the split key, the result is that step S1201 is also unnecessary, and it is possible to perform conjoining processing by simply repeating the search for the minimum value and the insert and delete processing.

As noted with regard to split processing, it is clear that conjoin processing can be performed in the same manner by repeating the search for the maximum value and the insert and delete processing. Although the logic of the processing in the first embodiment is simple, because there is repetition of searching for the minimum value by setting the root node of the processing source as the search start node, and because insertion and deletion are performed for each index key, the number of runtime steps becomes large.

Next, a second exemplary embodiment of the split/conjoin processing related to a preferred embodiment of this invention is described.

Although this embodiment of the present invention is similar to the first embodiment in that insertion and deletion are done in index key units, a search path stack is used in searching for an index key to be inserted/deleted, so as to reduce the number of runtime processing steps when executing insert processing and delete processing.

Figure 13A:
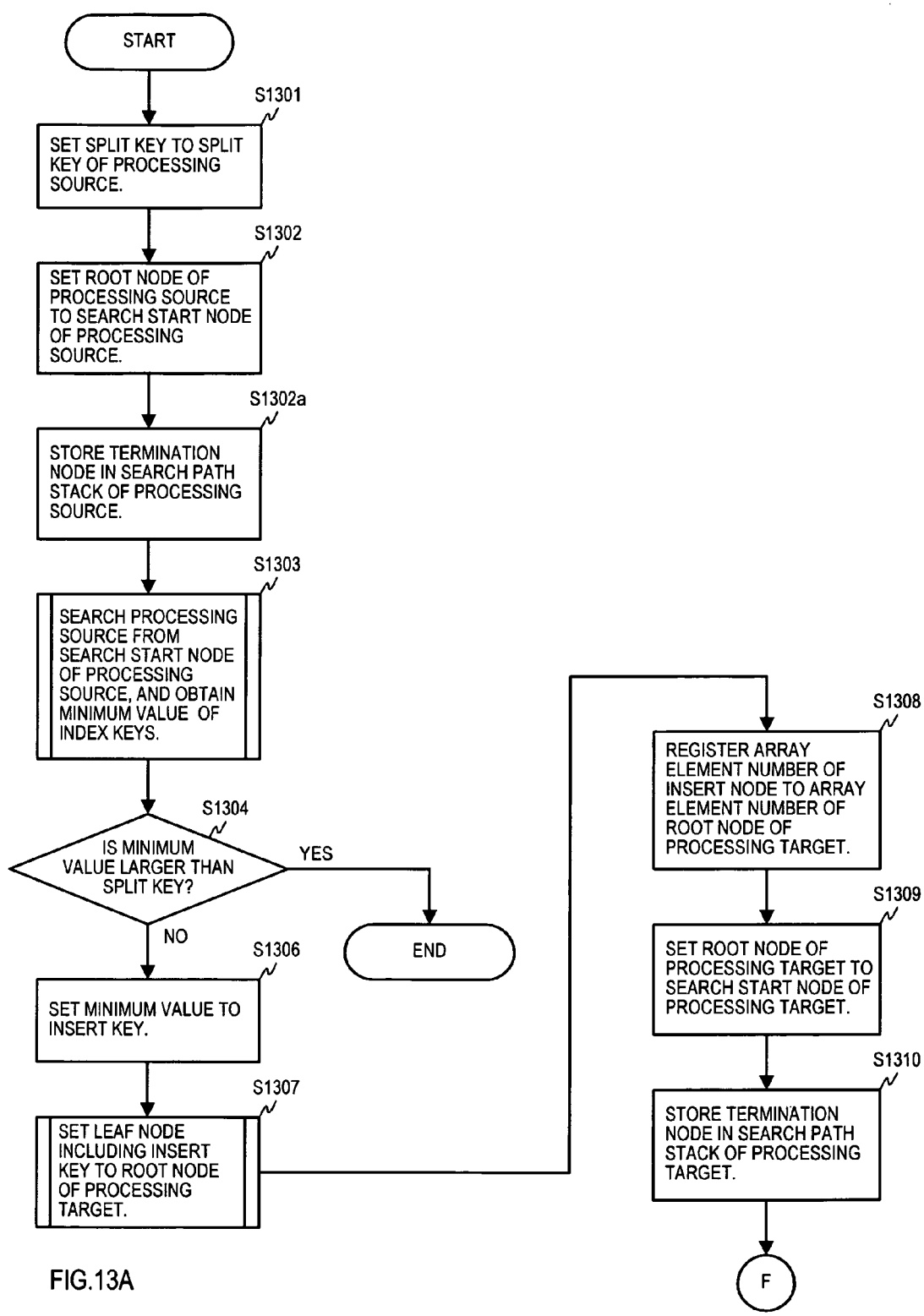
FIG. 13A is a flowchart describing the beginning stage processing of the splitting process in a second exemplary embodiment.
Figure 13B:
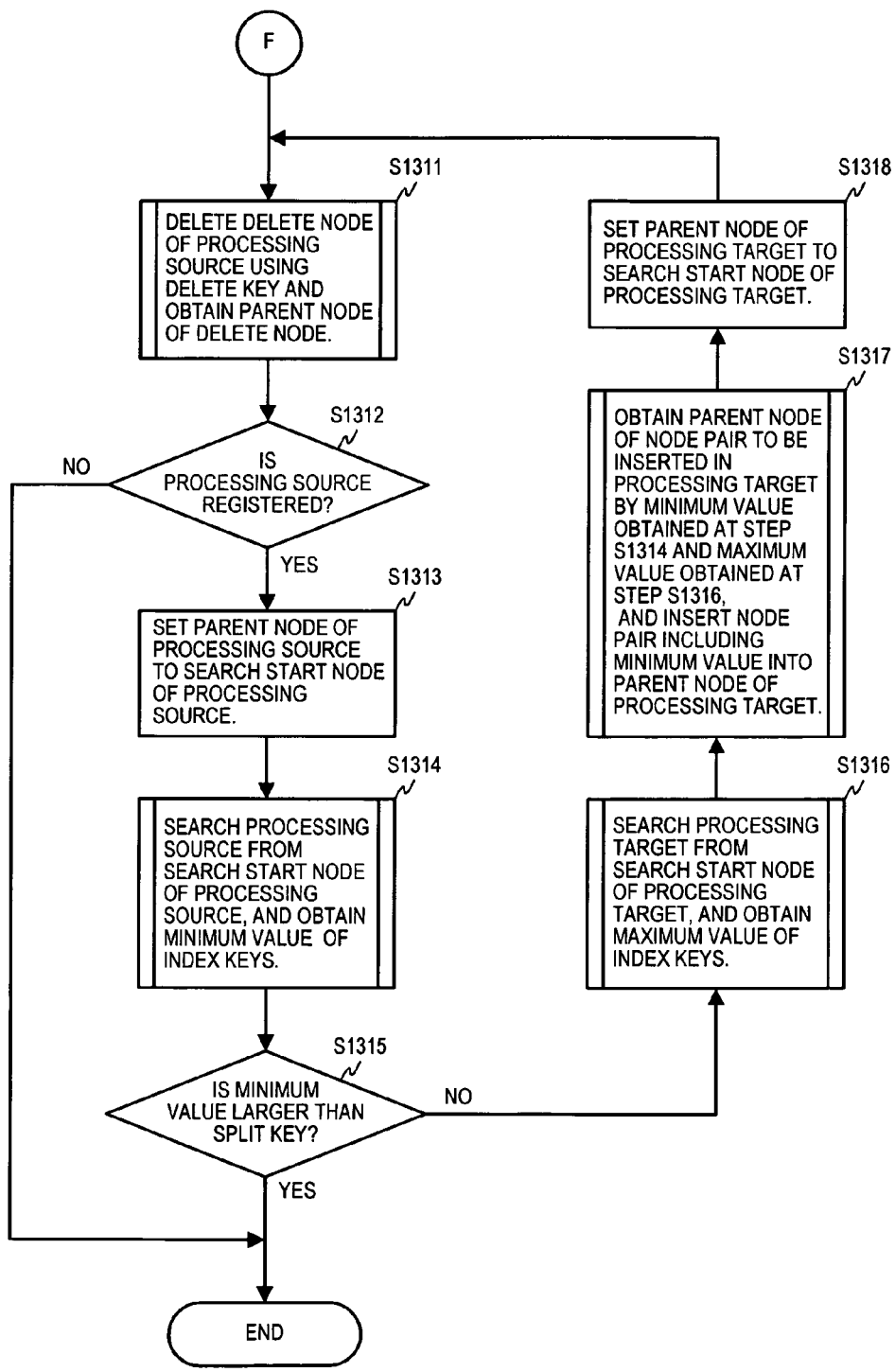
FIG. 13B is a flowchart describing the latter stage processing of the splitting process in the second exemplary embodiment.

FIG. 13A and FIG. 13B describe the processing flow for splitting of a coupled node tree in the second embodiment of the present invention.

FIG. 13A is a drawing describing the processing related the initialization that is the beginning stage of the split processing in the second embodiment of the present invention.

The split key specified in the first execution of step S1301 is set as the split key of the processing source. As was noted for the first preferred embodiment of this invention, there can be cases when the specification of the split key is acquired by external input from an operator, and cases when it is the processing result of some computer program, and cases where it is acquired by a command from a remote source and other such cases. The split key that is specified is set in an area in memory for holding the split key of the processing source.

Next, at step S1302, the root node of the processing source is set in the search start node of the processing source, and proceeding to step S1302a, a termination node is stored in the search path stack of the processing source.

Next, at step S1303, the minimum value search shown in FIG. 8B is performed from the search start node of the processing source, that is, from the root node set in the search start node at step S1302, and a minimum value is obtained.

Next, in step S1304, a determination is made whether that minimum value is larger than the split key. If the minimum value of the processing source is larger than the split key from the very beginning, from the fact that index keys lower than the split key are not included in the processing source, processing terminates here.

If the minimum value acquired in the minimum value search of step S1303 is equal to or less than the split key, processing proceeds to the processing target initialization processing of steps S1306 to S1310.

In step S1306, the minimum value acquired in step S1303 is set as the insert key. Next, in step S1307, the processing shown in FIG. 6B setting the leaf node (insert node) that holds the insert key into the root node is executed. Then, proceeding to step S1308, the array element number of the insert node is registered as the array element number of the root node of the processing target, and at step S1309, the root node of the processing target is set as the search start node of the processing target. Furthermore, in step S1310, a termination node is stored in the search path stack of the processing target, and the initialization processing of the processing target is completed, and processing moves to the processing of the latter stage of steps S1311 and below shown in FIG. 13B.

FIG. 13B is a drawing describing the latter stage of the split processing of a coupled node tree in the second embodiment of the present invention.

In step S1311, the delete node is deleted from the processing source, and the parent node (parent node of the processing source) of that node is obtained, whereinto the contents of the node paired with the deleted node are to be copied afterwards. Details regarding the processing of step S1311 and the delete node and its parent node in the processing source are described later referencing FIG. 15.

Next, in step S1312, a determination is made whether the processing source has been registered. Just as for the implementation example 1, since if the processing source is not registered, that means that the whole tree of the processing source has been deleted, this is an exception wherein the split key is equal to or greater than the maximum value of the index keys in the processing source tree, and in this case processing is terminated.

If the processing source has been registered, processing proceeds to step S1313, and the parent node of the processing source acquired in step S1311 is set in the search start node of the processing source, and proceeding to step S1314, the minimum value search shown in FIG. 8B is executed and a minimum value is acquired.

As will be described below, the parent node of the processing source is a branch node that is positioned at the immediately next higher level position from the delete node. The delete node includes the minimum value of the index key of the processing source, and from the above-noted sequence of the index keys, the next minimum value to be searched for is lower in order than the parent node of the processing source. Thus, by using the parent node of the processing source in place of the root node as the search start node for the minimum value search on second and subsequent times of step S1314, it is possible to reduce the number of processing steps.

Next, in step S1315, a determination is made whether the minimum value acquired in step S1314 is larger than the split key. If the minimum value is larger than the split key, processing terminates because the splitting of the tree is complete, and if it is equal to or smaller, processing proceeds to step S1316.

In step S1316, the maximum value search shown in FIG. 9B is executed from the search start node of the processing target, and a maximum value is acquired. The search start node of the processing target is the root node of the processing target set in step S1309 in the first time processing, and after that search start nodes are set in step S1318 described below.

Next, proceeding to step S1317, the parent node of the node pair to be inserted in the processing target is obtained by means of the minimum value acquired in step 1303 or in step S1314 described below and the maximum value acquired in step S1316, and the node pair holding that minimum value is inserted in that parent node of the processing target. This processing is characteristic of this second embodiment and differs from the insert processing of step S1215 shown in FIG. 12B, and details of the processing of step S1317 and the parent node of the processing target are described below referencing FIG. 14.

Next, in step S1318, the parent node of the processing target is set in the search start node of the processing target, and processing returns to step S1311.

By repeating the above loop processing of steps S1311 to S1318 until the determination in step S1315 is that the minimum value acquired at step S1314 is larger than the split key, the splitting of a tree is enabled.

Figure 14:
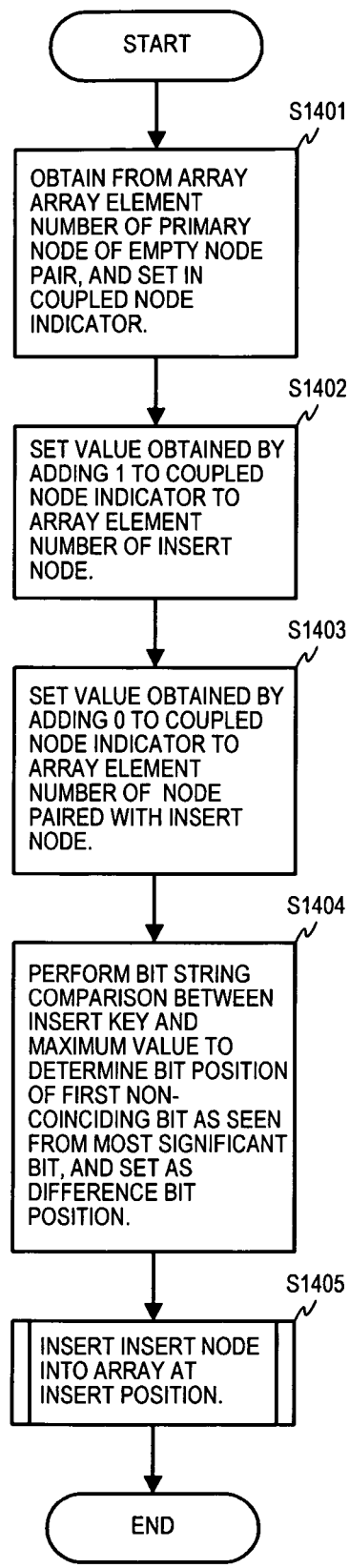
FIG. 14 is a flowchart describing the processing for insertion of a node in the second embodiment.

FIG. 14 is a drawing describing the processing flow for inserting a node pair into the node of the processing target, corresponding to step S1317 of FIG. 13B.

As shown in FIG. 14, an array element number of the primary node of an empty node pair is obtained from the array in step S1401, and that number is set as the coupled node indicator.

Next, at step S1402, the array element number obtained by adding "1" to the coupled node indicator set at step S1401 is set as the array element number of the insert node. At step S1403, the array element number obtained by adding "0" to the coupled node indicator obtained at step S1401 is set as the array element number of the pairing node that is a pair to the insert node.

Next, at step S1404, the insert key, which is the minimum value obtained in step S1314 shown in FIG. 13B, and the maximum value, which has been obtained in step S1316, are compared as bit strings and the position of the first non-coinciding bit as seen from the most significant, 0th, bit, is determined, that position is set in the difference bit position storage area.

Next, proceeding to step S1405, the processing consisting of steps S518 and below shown in FIG. 5C completes the insert processing, by executing the processing which obtains the insert position of the node pair and writes contents into each node of the node pair, and processing is terminated.

The processing of steps S1401 to S1404 noted above corresponds to the processing for preparing an array element for a node pair to be inserted the processing which consist of the steps S512 to S517 shown in FIG. 5B. Also the maximum value search in the processing target of step S1316 shown in FIG. 13B corresponds to the search processing in the processing target that is the beginning stage of the insert processing shown in FIG. 5A. In the case of this second embodiment, since the minimum value of the processing source is always larger than the maximum value of the processing target, and because the Boolean value to be set in step S513 is 1, the setting of the array element number of the insert node in step S1402 is that of adding the value 1 to the coupled node indicator set in step S1401.

After the above processing for preparing an array element for the node pair to be inserted, insert processing completes with the processing of step S1405.

Figure 15:
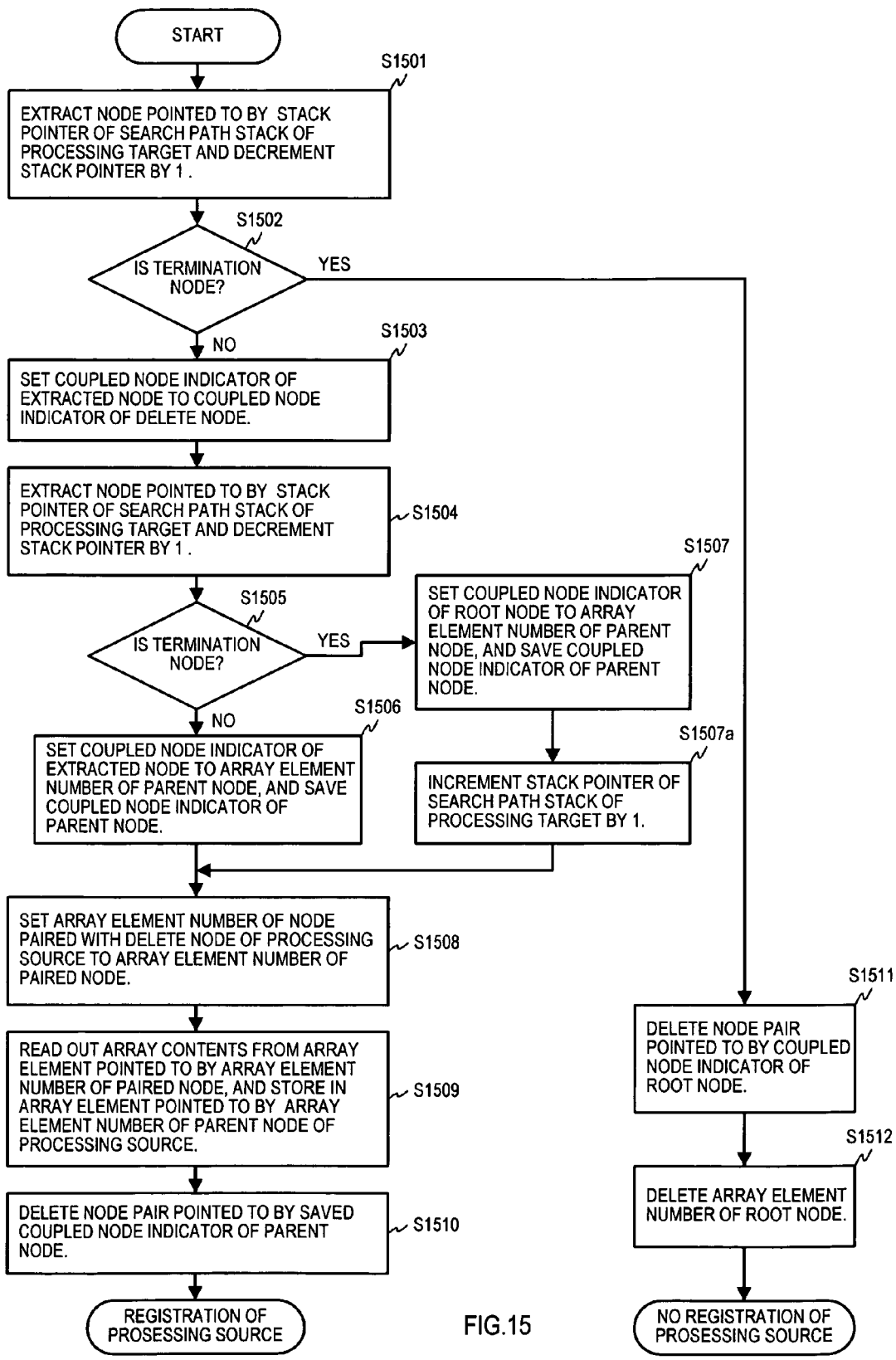
FIG. 15 is a drawing describing the delete processing for the processing source in the second embodiment.

FIG. 15 is a drawing describing the processing source delete processing corresponding to step S1311 shown in FIG. 13B.

In the first execution of step S1501, the node pointed to by the stack pointer is extracted from the search path stack of the processing source, and the stack pointer is decremented by 1. Nodes have been stored in the search path stack of the processing source here by the minimum value searches executed in step S1303 shown in FIG. 13A or step S1314 shown in FIG. 13B, and the stack pointer points to the branch node immediately above the leaf node in which is stored a minimum value or to the termination node (if the root node is a leaf node).

At the next step, step S1502, a determination is made whether the node extracted in step S1501 is a termination node. If that node is a termination node, processing moves to step S1511, and the node pair pointed to by the array element number of the root node is deleted and in step S1512, the array element number of the root node is deregistered, and "no registration of the processing source" is returned.

If the node extracted in step S1501 is not a termination node, processing proceeds to step S1503, wherein the coupled node indicator of the node extracted in step S1501 is set as the array element number of the delete node. In other words the delete node is the leaf node in which is stored the minimum value.

Next, proceeding to step S1504, the node pointed to by the stack pointer is extracted from the search path stack of the processing source, and the stack pointer is decremented by 1. At this point, the stack pointer of the search path stack of the processing source points either to the branch node two levels directly higher than the leaf node that holds the minimum value or to a termination node (only when the branch node is the root node).

Next, in step S1505, a determination is made whether that node is a termination node.

If the node extracted at step S1504 is not a termination node, processing proceeds to step S1506, extracts the coupled node indicator from that node, and sets it in the area for holding the array element number of the parent node of the processing source while saving the coupled node indicator of that parent node, and then processing proceeds to step S1508.

If the node extracted at step S1504 is a termination node, processing branches to step S1507, and the array element number of the root node is set in the area for holding the array element number of the parent node of the processing source while saving the coupled node indicator of that parent node, and processing proceeds to step S1507a. At step S1507a, to eliminate underflow of the stack pointer, the stack pointer of the search path stack of the processing source is incremented by 1, and processing proceeds to step S1508.

As described above, the node extracted in step S1504 is the branch node positioned 2 levels directly above the delete node. Thus, the coupled node indicator extracted from this branch node is the array element number pointing to the array element that holds the branch node immediately above the delete node. In other words, the parent node of the processing source is the branch node immediately above the delete node. Also, the saved coupled node indicator of the parent node is the array element number of the array element in which is positioned the delete node.

In step S1508, the array element number of the node that is a pair to the delete node is set in its storage area. Next, at step S1509, the contents of the array element pointed to by the array element number of the paired node set at step S1508 are read out and stored in the array element pointed to by the array element number of the parent node of the processing source set at step S1507.

Next, in step S1510, the node pair pointed to by the saved coupled node indicator of the parent node is deleted and "processing source is registered" is returned. By the processing described above, the node pair comprising the delete node and its paired node are deleted, and the contents of the node paired with the delete node is stored in the parent node, which is the branch node immediately above the delete node, while the array element number of that parent node is set in the area for holding the array element number of the parent node of the processing source, and at step S1313 shown in FIG. 13B that array element number is used for setting the search start node in the next minimum value search.

While the above is a description of tree splitting processing in the second embodiment, in this embodiment as well, similar to the first embodiment, it is possible to perform successive deletion from the maximum index key value. Also, similar to the case of the first embodiment, it is possible to use the processing flow of splitting for the conjoining of trees. By setting one of the two trees to be conjoined as the processing source tree and performing delete processing of the processing source tree with the split key either equal to or larger than the maximum value or equal to or less than the minimum value of the index key of the processing source tree, the deleted nodes can be inserted into the processing target tree.

Next, a third exemplary embodiment of the split/conjoin processing related to a preferred embodiment of this invention is described. The split/conjoin processing in the above-described first embodiment and second embodiment is performed by insertion and deletion in units of index keys. The third embodiment focuses on the sequential nature of the coupled node tree, and insertion and deletion are performed in even larger units of subtrees of a coupled node tree, which subtrees satisfy a prescribed condition.

Figure 16A:
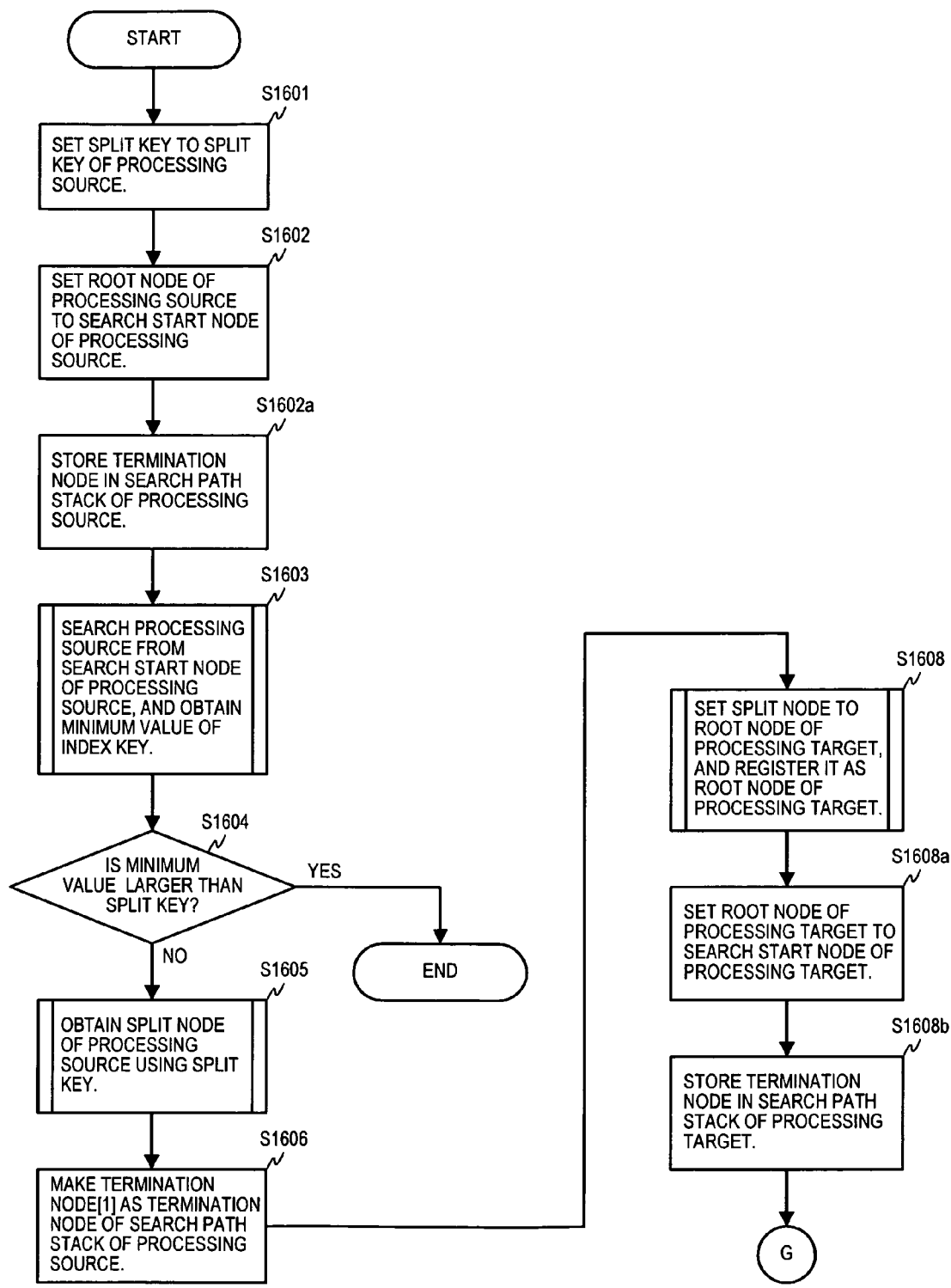
FIG. 16A is a flowchart describing the beginning stage processing of the splitting process in a third exemplary embodiment.
Figure 16B:
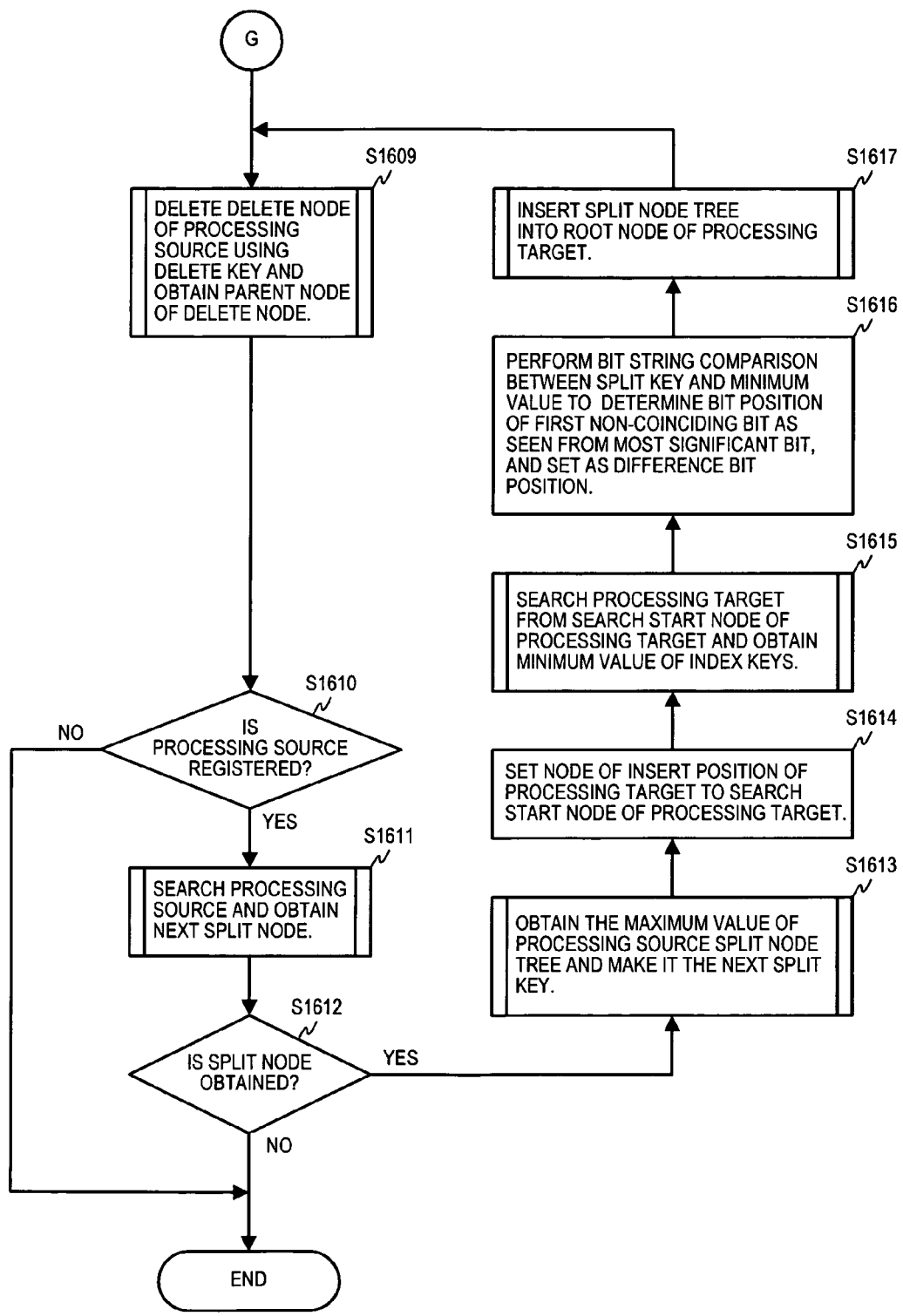
FIG. 16B is a flowchart describing the latter stage processing of the splitting process in the third exemplary embodiment.
Figure 22A:
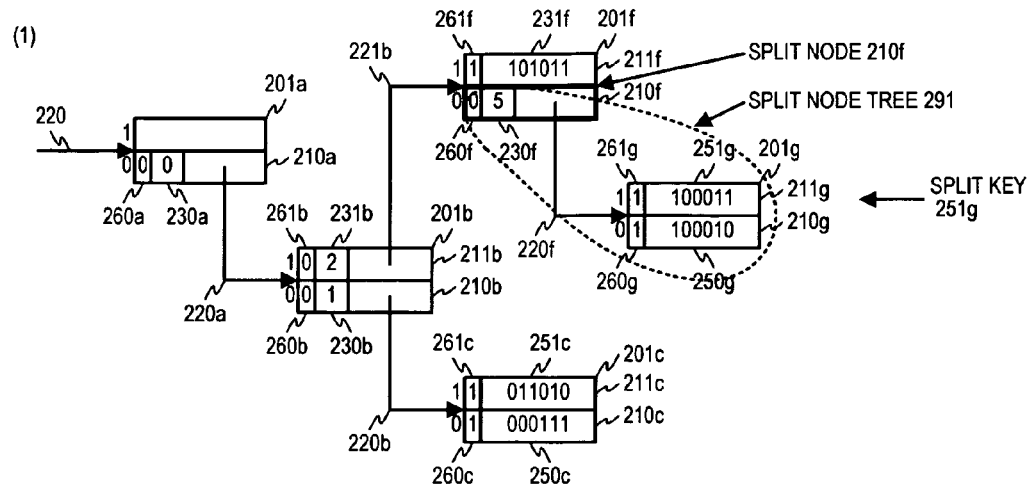
FIG. 22A is a drawing describing an example of a tree configuration before splitting.
Figure 22A:
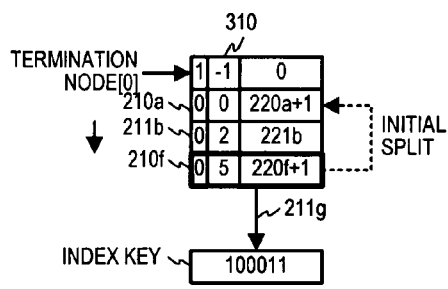
Figure 22A:
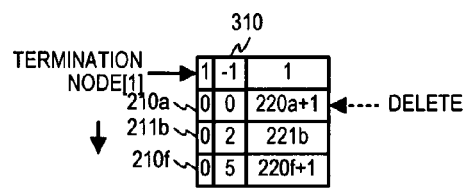
Figure 22B:
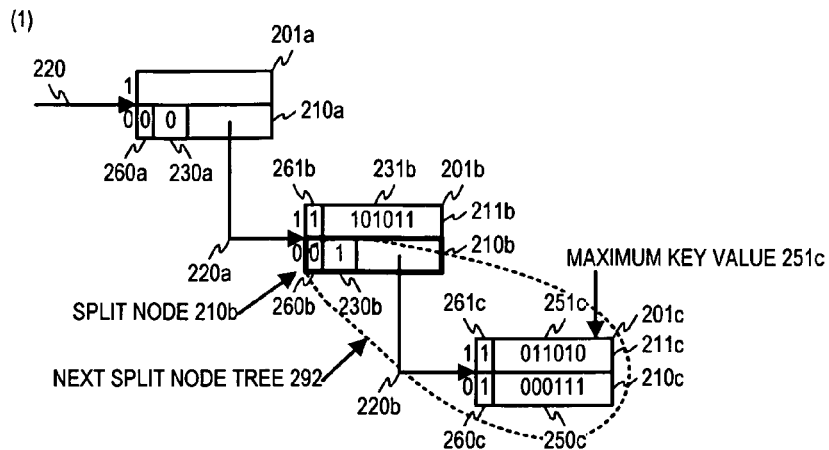
FIG. 22B is a drawing describing an example of a tree configuration after the first splitting.
Figure 22B:
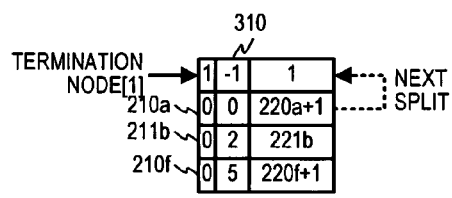
Figure 22B:
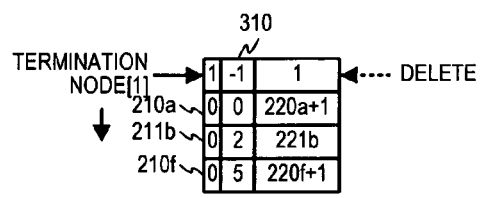
Figure 22B:
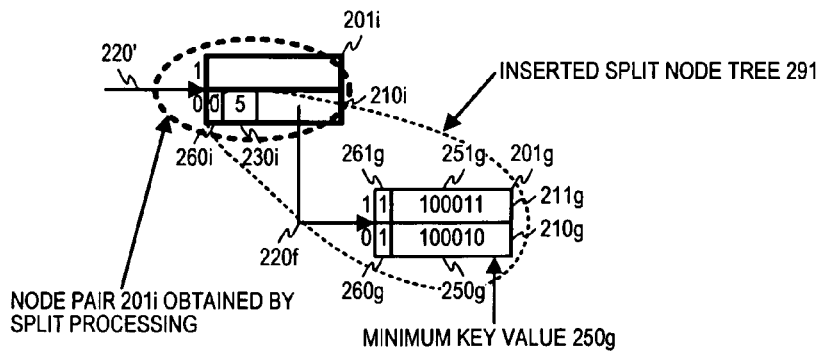
Figure 22C:
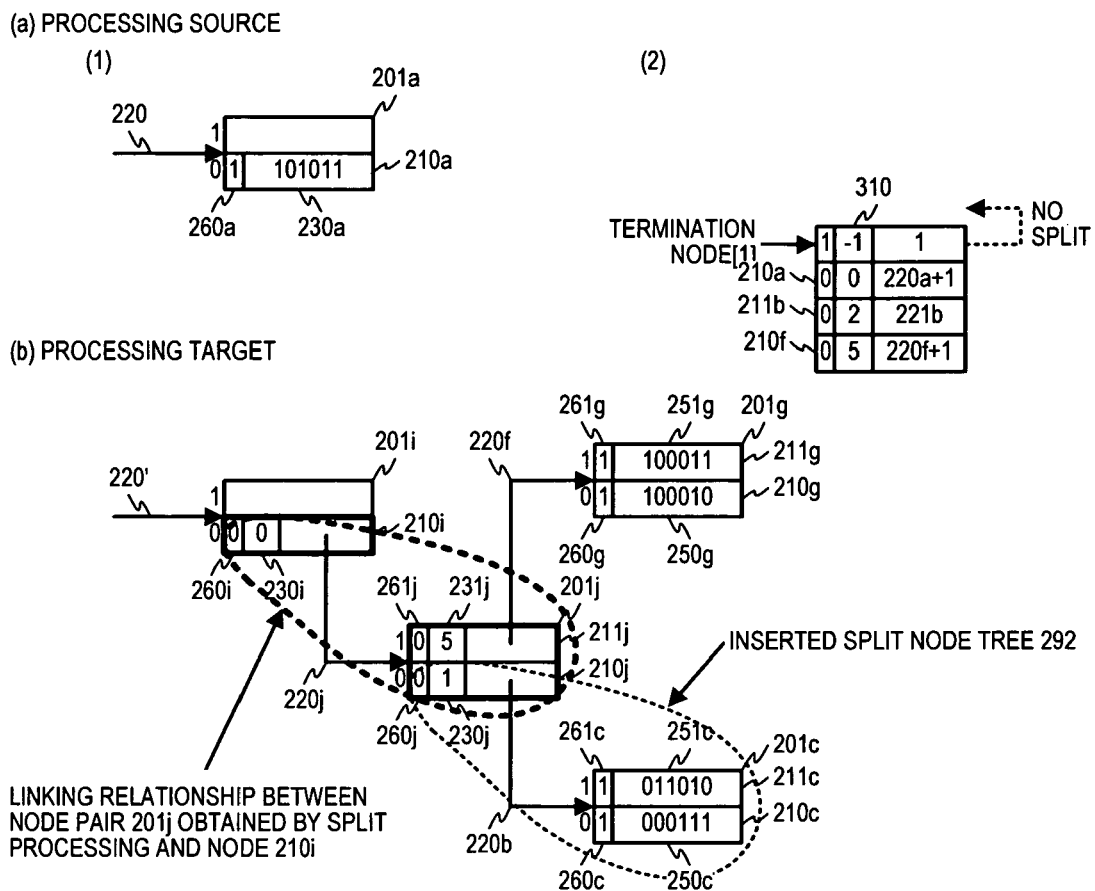
FIG. 22C is a drawing describing an example of a tree configuration after the next splitting.

FIG. 16A and FIG. 16B are drawings describing the splitting processing flow for a coupled node tree in the third embodiment. FIG. 22A to FIG. 22C are drawings describing the above-noted splitting processing, providing an example of a tree that is similar to the coupled node tree shown by example in FIG. 2B. FIG. 22A shows an example of the structure of the tree before splitting, FIG. 22B shows an example of the tree after the first splitting, and FIG. 22C shows an example of the structure of the tree after the next splitting. FIG. 22A to FIG. 22C also describe a search path stack in the processing source and the nodes pointed to by the pointer of that stack.

First, referencing FIG. 16A, the initialization that is the beginning stage of the split processing in this embodiment of this invention is described.

In the first step, S1601, the specified split key is set as the split key for the processing source. As was described for the first and second embodiments of this invention, there can be cases when the specification of the split key is acquired by external input from an operator, and cases when it is the processing result of some computer program, and cases where it is acquired by a command from a remote source and other such cases. The split key that is specified is set in an area in memory for holding the split key of the processing source.

In the example shown in FIG. 22A, the split key coincides with the "100011" of the index key 251g of the node 211g. As noted above, although it is not necessary that the obtained split key be included in the processing source, as will be described below, it is necessary in this embodiment that the upper limit value or lower limit value in the processing source be determined by the obtained split key, and that the index key included in the processing source be taken as the new split key. In the description to follow, therefore, the assumption is that the split key is included in the processing source.

Next, at step S1602, the root node of the processing source is set in the search start node of the processing source, and proceeding to step S1602a, a termination node is stored in the search path stack of the processing source.

Next, at step S1603, the minimum value search shown in FIG. 8B is performed from the search start node of the processing source, that is, from the root node set in the search start node at step S1602, and a minimum value is obtained.

Next, in step S1604, a determination is made whether that minimum value is larger than the split key. If the minimum value of the processing source is larger than the split key from the very beginning, from the fact that index keys lower than the split key are not included in the processing source, processing terminates here.

If the minimum value acquired in the minimum value search of step S1603 is equal to or less than the split key, processing proceeds to the processing source initialization processing of steps S1605 to S1606 and to the processing target initialization processing of steps S1608 to S1608b.

In step S1605, a split node is obtained from the processing source by means of the split key. The split node is the root node of the largest of the subtrees that include the split key as a maximum value (called the split node tree). In the exemplary illustration of FIG. 22A, as shown in section (1) of part (a) of FIG. 22A, node 210f is the split node, and the subtree enclosed in a dotted line is the split node tree 291. Details on the processing that obtains a split node in step S1605 is described below, referencing FIG. 17A and FIG. 17B.

Next, proceeding to step S1606, the termination node stored in the search path stack of the processing source is made into a termination node [1]. At the stages preceding step S1606, the termination node stored in the search path stack of the processing source has been termination node [0] as described later, but for the processing that obtains the next split node in a processing source, described later referencing FIG. 19, it is replaced with termination node [1].

Next, proceeding to step S1608, the split node obtained in step S1605 is set as the root node of the processing target, and is registered as the root node of the processing target. Next, proceeding to step S1608a, the root node of the processing target is set in the search start node of the processing target. And, proceeding to step S1608b, a termination node is stored in the search path stack of the processing target, and completing the initialization processing related to the processing target, the beginning stage of processing is completed, and processing proceeds to the processing of step S1609 and below shown in FIG. 16B. Also, a detailed description of the processing of S1608 is provided later referencing FIG. 18A.

In the example shown in FIG. 22A, the splitting processing has just begun and, as shown at (b) of FIG. 22A, because the processing target does not exist and has not been registered, the contents of the split node 210f are stored into the primary node 210i of the node pair 201i newly obtained, and is set as the root node of the processing target, and is registered as the root node of the processing target. As a result, as shown in FIG. 22B (b), a tree of the processing target formed by the inserted split node tree 291 is generated.

Section (1) of FIG. 22B (a) shows the tree structure with the split node tree 291 deleted when the node 210f of the processing source is taken as the split node, and the next split node tree 292 in which the split node 210b is taken as the root node is shown enclosed in dotted lines.

Next is described, referencing FIG. 16B, the deletion of the split node tree from the processing source and its insertion in the processing target that is the latter stage of the split processing in accordance with a preferred embodiment of this invention. At step S1609, the split node tree is deleted from the processing source and the parent node of that node is acquired.

In the example shown in FIG. 22C (b), the tree structure shown is one in which the next split node tree 292 is inserted via the newly obtained node pair 201j into the processing target with the root node 210i as the insert position. The section (1) of FIG. 22C (a) shows the structure in which the next split node tree 292 has been deleted from the tree structure shown in the section (1) of FIG. 22B (a). Details of the delete processing in step S1609 is described later referencing FIG. 21.

Next, proceeding to step S1610, a judgment is made whether the processing source is registered, and if it is not registered, processing is terminated. Since if the judgment result is that it is not registered, that means that the tree of the processing source has been completely deleted, thus this is an exceptional case wherein the split key is equal to or larger than the maximum value of the index keys in the processing source.

If the determination result in step S1610 is that it is registered, processing proceeds to step S1611, wherein the processing source is searched and the next split node is obtained. Details of the processing to obtain the next split node in step S1611 is described later referencing FIG. 19.

Following step S1611, in step S1612, a determination is made whether a split node has been obtained in step S1611. If a split node has not been obtained, split processing is terminated.

If a split node has been obtained, in step S1613, the maximum value of the split node tree, which is the subtree for which that split node is the root node, is obtained and made the next split key. Also, details on the processing in step S1613 of obtaining the maximum value for the split node tree and making it the next split key is described later, referencing FIG. 20.

Next, in step S1614, the node at the insert position in the processing target is set in the search start node of the processing target. Since it is clear that the minimum value of the processing target is included in the split node tree inserted immediately before step S1614 into the processing target, by setting as the search start node the split node inserted immediately before step S1614, for example, in the processing target illustrated in FIG. 22C (b), the node 210j with the array element number 220j (insert position), the minimum value search processing can be reduced in comparison with using the root node as the search start node.

After step S1614, processing proceeds to step S1615. At step S1615, the minimum value of the index keys is acquired from the array by the minimum value search shown in FIG. 8B using the search start node of the processing target.

Next, in step S1616, the split node that is the maximum value of the next split node tree set at step S1613 and the minimum value of the processing target obtained in step S1516 are compared as bit strings, and the position of the first non-coincident bit seen from the highest level bit 0 is determined and set as the difference bit position. In the example shown in FIG. 22B, because the maximum value of the next split node tree 292 is the index key 251c "011010", and the minimum value of the processing target is the index key 250g "100010", the difference bit position is "0".

Next, proceeding to step S1617, the split node tree is inserted in the processing target with the root node of the processing target as the insert position, and processing returns to step S1609. Details of the split node tree insert processing in step S1617 are explained hereinafter referencing FIG. 18B.

The above loop processing of step S1609 to step S1617 repeats the processing of insertion/deletion in a split node tree and obtaining the next split node until a new split node cannot be obtained.

In this embodiment, because the delete and insert processing is performed in units of split node trees as described above, the number of processing steps is reduced. Next, referring to FIG. 17A and FIG. 17B, the processing to determine the split node (the first split node) in step S1605 shown in FIG. 16A is described in detail.

Figure 17A:
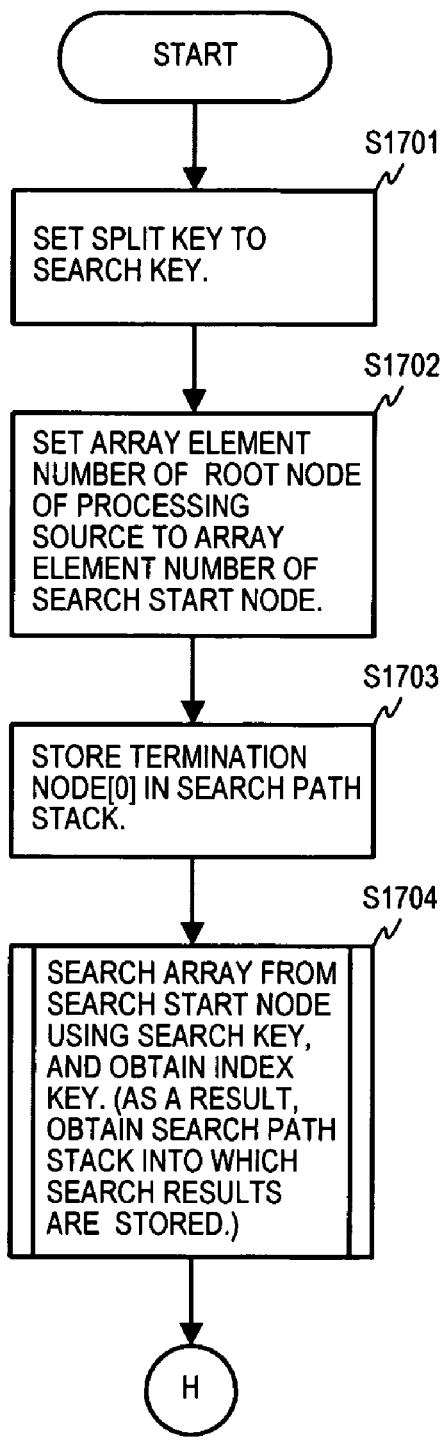
FIG. 17A is a flowchart describing the beginning stage of the processing for determining the first split node.

FIG. 17A is a flowchart describing the beginning stage of the processing for determining the first split node.

As shown in FIG. 17A, at step S1701 the split key is set as the search key, and, at step S1702, the root node of the processing source is set as the search start node. Next, proceeding to step S1703, the termination node [0] is stored in the search path stack of the processing source.

Figure 17B:
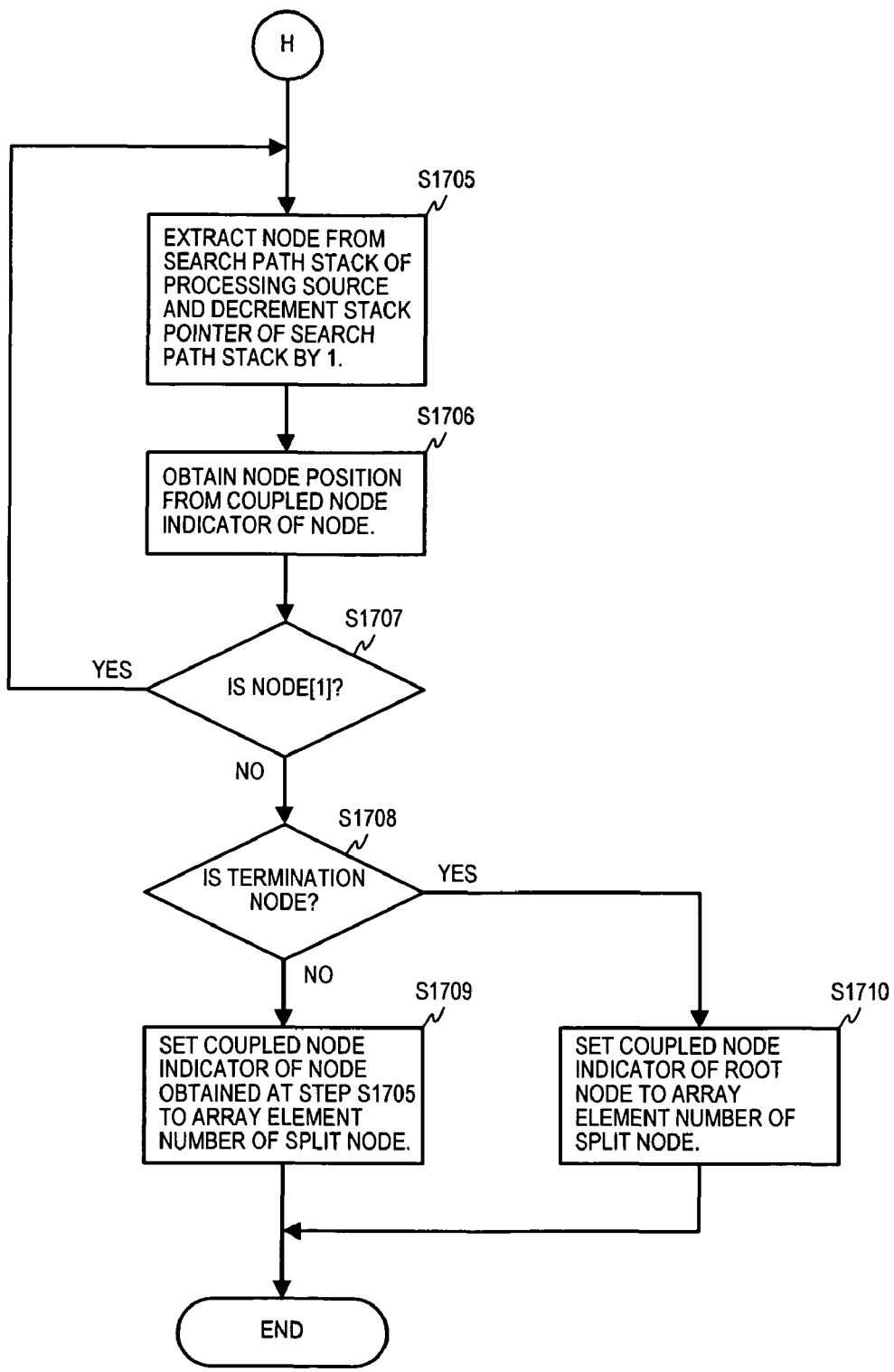
FIG. 17B is a flowchart describing the latter stage of the processing for determining the first split node.

Next, proceeding to step S1704, the search processing shown in FIG. 4B is executed, and an index key identical to the split key is obtained as the search results; thus the beginning stage of processing is finished and processing proceeds to the latter stage of processing shown in FIG. 17B.

The latter stage of processing referencing FIG. 17B is explained below, but before that, once again referencing FIG. 22A, the necessity placed on the fact that the split key is an index key included in the processing source in this exemplary embodiment of this invention is explained.

Now, assume that the processing source shown in section (1) of FIG. 22A (a) is to be split at the split key "100001". If the search processing of step S1704 is executed with this split key, the resulting index key that is obtained is the index key 251g, "100011". This is because the index key that should be used as the splitting point is either the upper limit value "011010" stored in the leaf node 211c by the upper limit key "100001", or the lower limit value "100010" stored in the leaf node 210g by the lower limit key "100001", and in either case there is non-equality with the results obtained by searching with the split key "100001".

Therefore, before obtaining the split node, it is necessary to obtain either a lower limit value or an upper limit value by the processing shown in FIG. 10A and FIG. 10B or in FIG. 11A and FIG. 11B and to determine the split key as an index key that is included in the processing source, in accordance with the definition thereof.

Next, the later stage of the processing flow that determines the first split node is described.

FIG. 17B is a drawing describing the latter stage of processing flow for determining the first split node. In this latter stage of processing, the search path stack of the processing source is back-traced to determine the array element number of the first node [0], which is set as the array element number of the split node. Saying this in a different way, the search path stack of the processing source is back-traced, and the first node [0] is made the split node.

As shown in FIG. 17B, at step S1705, a node is extracted from the search path stack, and the stack pointer is decremented by 1. Here, excluding the exceptional case in which the processing source is configured of only a root node, the first node extracted is the branch node immediately above the leaf node holding the index key that is the search result of a search using the split key.

Next, proceeding to step S1706, the node position of the node arranged in the array element pointed to by the coupled node indicator in the extracted node is acquired. Next, in step S1707, a determination is made whether the node position acquired in step S1706 is the node [1] side. If the determination result is that it is a node [1] side, processing returns to step S1705, and if the determination result is that it is a node [0] side, processing proceeds to step S1708.

In step S1708, a determination is made whether the node extracted in step S1705 is a termination node. If the determination result is that it is a termination node, processing proceeds to step S1710 wherein the coupled node indicator of the root node is set as the array element number of the split node, and processing is terminated.

If the result of the determination in step S1708 is not that of a termination node, processing proceeds to step S1709 and the coupled node indicator of the node obtained in step S1705 is set as the array element number of the split node, and processing is terminated.

In the example shown in FIG. 22A, when the root node 210a is used as the search start node and searching processing is executed by the split key "100011", the index key 251g is obtained as a result of the search, and the termination node and nodes 210a, 211b, and 210f are successively stacked onto the search path stack 310 shown in section (2) of FIG. 22A (a). (The coupled node indicators of nodes 210a and 210f each have had "1" added to their position.)

Therefore, when the first processing of step S1705 shown in FIG. 17B is performed, the stack pointer of the search path stack points to the array element number 220f+1, and in step S1706 the node position 1 is obtained from the coupled node indicator 220f+1. Therefore, by the result of the step S1707, processing returns to step S1705, and next time at step S1707 the node position 0 is determined from the node position of node 211b of the once back-traced array element number 221b, after which processing moves to step S1709 via the determination of step S1708, at which the coupled node indicator 221b of the node 210f, i.e., the array element number 221b of node 210f, extracted in step S1705, is set as the array element number of the split node. At this time, the stack pointer of the search path stack 310 of the processing source points to node 210a as shown by the arrow in section (2) of FIG. 22A (a).

In addition, the case wherein the determination in step S1708 is a termination node can be exemplified by the case wherein a tree whose root node is the node 210f shown in FIG. 22A is the processing source and the split key is "100011". In this case, at the second execution of step S1707, a determination is made of a node position 0 from the coupled node indicator of the termination node [0] that is one step back-traced from the root node 210f, and at step S1708 a determination of a termination node is made and processing proceeds to step S1710, wherein the coupled node indicator 220f of the root node 210f, i.e., array element number 220f of the node 210g, is set as the array element number of the split node.

At this point, before entering into a further description of the splitting processing, it will be noted that the split key is the maximum value in the split node tree, and that the split node tree is the largest subtree of the subtrees of the processing source having the split key as the maximum value or, stated differently, the subtree whose root node has a discrimination bit position of the highest order.

As is clear from the foregoing description, the split node is the first node [0] that is found in back-tracing up from the split key on the search path made by executing the search using the split key.

If a leaf node that includes the split key as its index key is a node [0], that leaf node is the split node itself, and the split node tree is formed by only one leaf node. The index keys of the leaf nodes existing at the node [1] side that forms a pair with that leaf node, by virtue of the sequential nature of the coupled node tree, will always be larger than the split key. Therefore, in the current case, because the split key cannot be the maximum value in a subtree in which a branch node having an order that is higher than the split key is taken as the root node, the split key is the maximum value of the split node tree, and the subtree is the largest subtree of the processing source having the split key as its maximum index key value.

If the leaf node that includes the split key as its index key is a node [1], as long as back-tracing is done along the nodes [1] of the tree, by virtue of the sequential nature of the coupled node tree, in any subtree having a node [1] as the root node, the split key is the maximum value of these subtrees. When back-tracing is done up until a node [0], beneath any higher-order node there exists a node or more of lower order than the node [1] forming a pair with the above-noted node [0], and in these nodes there exists a leaf node including an index key that is larger than the above-noted split key.

Therefore, a subtree having the above-noted node [0], that is, the split node as the root node, is the largest subtree including the split key as the maximum value. The description of the splitting processing is continued below, with reference made to FIG. 18A and thereafter.

Figure 18A:
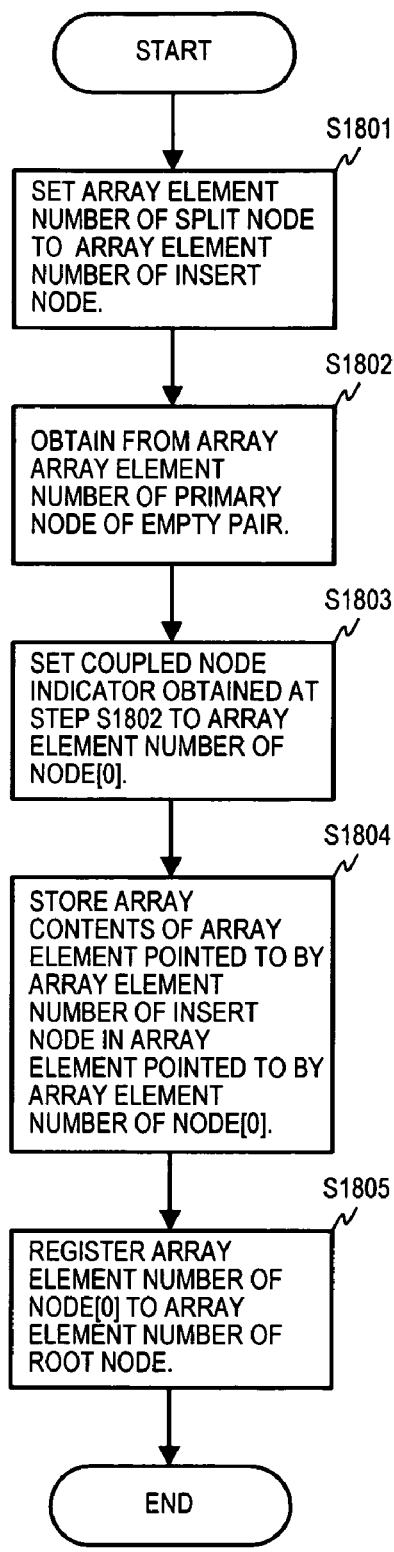
FIG. 18A is a flowchart describing the processing for insertion of a root node in the processing target.

FIG. 18A is a flowchart describing the processing flow for inserting the root node of the processing target at step S1608 shown in FIG. 16B.

At step S1801, the array element number of the array element into which is stored the split node obtained at step S1605 of the processing flow shown in FIG. 16A, that is to say, at step S1709 or step S1710 in the processing flow shown in FIG. 17B, is set as the array element number of the insert node.

Next, at step S1802, an array element number of a primary node of an empty node pair is acquired from the array. Next, at step S1803, the array element number obtained at step S1802 is set as the array element number of the node [0].

Next, at step S1804, the contents of the array element pointed to by the array element number of the insert node set at step S1801 are read out and stored in the array element pointed to by the array element number of the node [0] set at step S1803.

Finally, at step S1805, the array element number of the node [0] is registered as the array element number of the root node of the processing target, and the root node insert processing is terminated.

In the example shown in FIG. 22A and FIG. 22B, the array element number $221b$ of the array element into which is stored the split node $210f$ is set as the array element number of the insert node, and the array element number $220'$ of the primary node of the obtained empty node pair $201i$ is set as the array element number of node [0].

Then, the contents of the array element pointed to by the array element number $221b$, that is, the contents of the split node $210f$, are stored in the array element pointed to by the array element number $220'$, that is, into node $210i$, and the array element number $220'$ is registered as the array element number of the root node of the processing target.

Figure 18B:
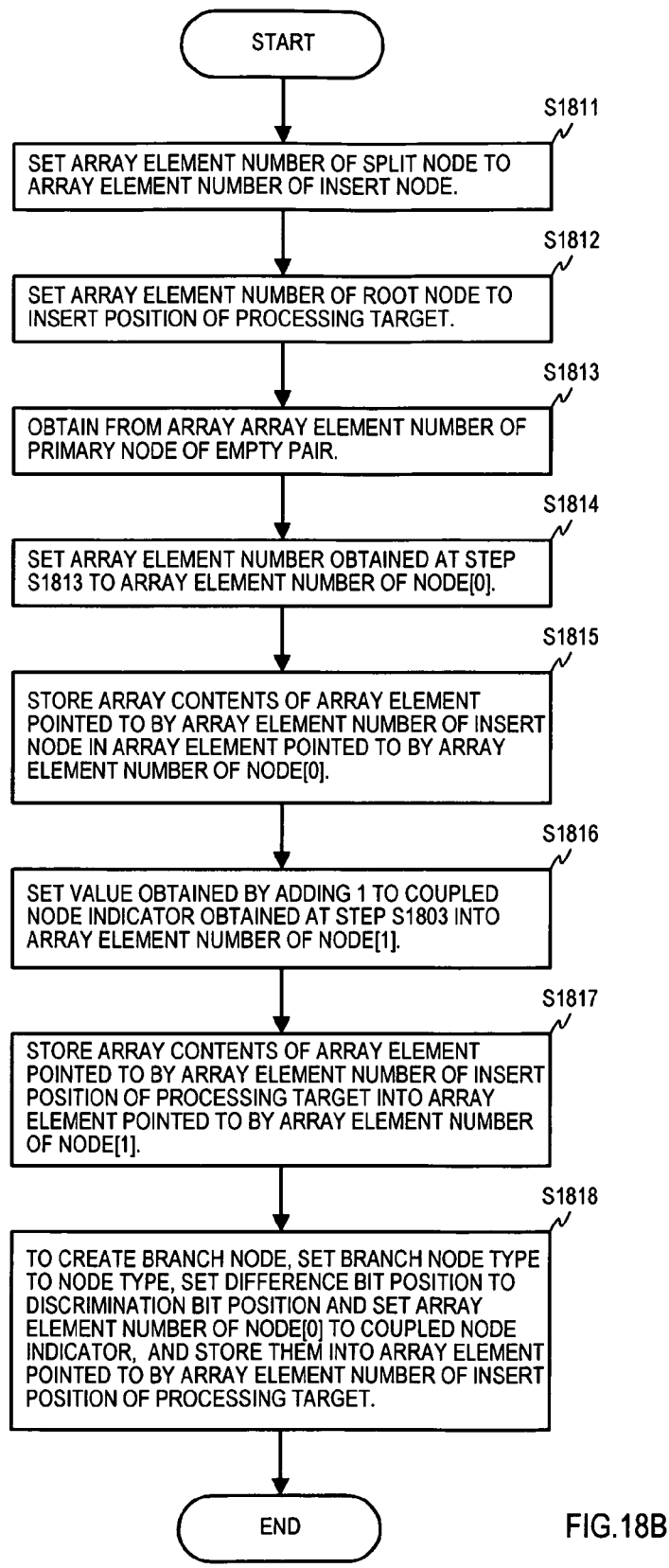
FIG. 18B is a flowchart describing the processing for insert processing other than for the root node.

FIG. 18B is a flowchart describing the processing flow for insertion into a processing target of other than a root node in step S1617 of FIG. 16B.

First, at step S1811, the array element number of the array element in which is stored the split node determined at step S1611 of the processing flow shown in FIG. 16B is set as the array element number of the insert node. This step S1811 differs from step S1801 shown in FIG. 18A in that the processing step for obtaining the split node is step S1611, not step S1605.

Next, at step S1812, the root node array element number of the processing target is set as the insert position of the processing target.

The next steps S1813 to S1815 are similar to the steps S1802 to S1804 for processing to insert a root node as shown in FIG. 18A.

At step S1813, the primary node array element number of an empty node pair is obtained from the array, and at the next step S1814, the array element number obtained at step S1813 is set as the array element number of the node [0], and then at step S1815 the contents of the array element pointed to by the array element number of the insert node set at step S1811 are stored in the array element pointed to by the array element number of the node [0] set at step S1814.

Next, proceeding to step S1816, the value obtained by adding 1 to the array element number obtained at step S1803 is set as the array element number of the node [1].

Next, at step S1817, the contents of the array element pointed to by the array element number of the insert position of the processing target set at step S1812 are read out and stored into the array element pointed to by the array element number of the node [1] set at step S1816.

Finally, at step S1818, the node type is set to that of branch, the difference bit position determined at step S1616 shown in FIG. 16B is set as the discrimination bit position, and the array element number of the node [0] set at step S1814 is set as the coupled node indicator, thereby forming a branch node, and that branch node is stored into the array element pointed to by the array element number of the insert position of the processing target set at step S1812, and the processing is ended.

In the example shown in FIG. 22B and FIG. 22C (b), the array element number $220a$ of the array element in which the split node $210b$ is stored is set as the array element number of the insert node, and the array element number $220'$ of the root node $210i$ is set as the insert position of the processing target. The array element number $220j$ of the primary node of the obtained empty node pair $201j$ is set as the array element number of the node [0].

Then, the contents of the array element pointed to by the array element number $220a$ of the insert node, that is, the contents of the split node $210b$ are stored into the array element pointed to by the array element number of the node [0], that is, into the node $210j$.

The contents of the array element pointed to by the array element number $220'$ of the insert position of the processing target, that is, the contents of the root node $210i$ shown in FIG. 22B (b) are stored into the array element pointed to by the array element number $220j+1$ obtained by adding 1 to the array element number $220j$, that is into the node $211j$.

The difference bit position "0" between the index key $251c$, "011010", which is the maximum value of the split node tree 292 as described earlier by example with reference to S1616 of FIG. 16B, and the index key $250g$, "100010", which is the minimum value of the processing target, is stored in the discrimination bit position $230i$ of the root node $210i$ shown in FIG. 22C (b). Also, the array element number $220j$ of node [0] is stored as the coupled node indicator.

As is understood from the foregoing description, the insert processing after the insert target is generated inserts a node pair formed by branch nodes immediately below the root node in the processing target, and this insert processing conjoins the already existing subtree below the root node of the processing target to the node [1] side of that node pair, and conjoins the split node tree to the node [0] side. It is clear that, by this processing, that the sequential nature of the processing target after the insertion of the split node tree is maintained.

Figure 19:
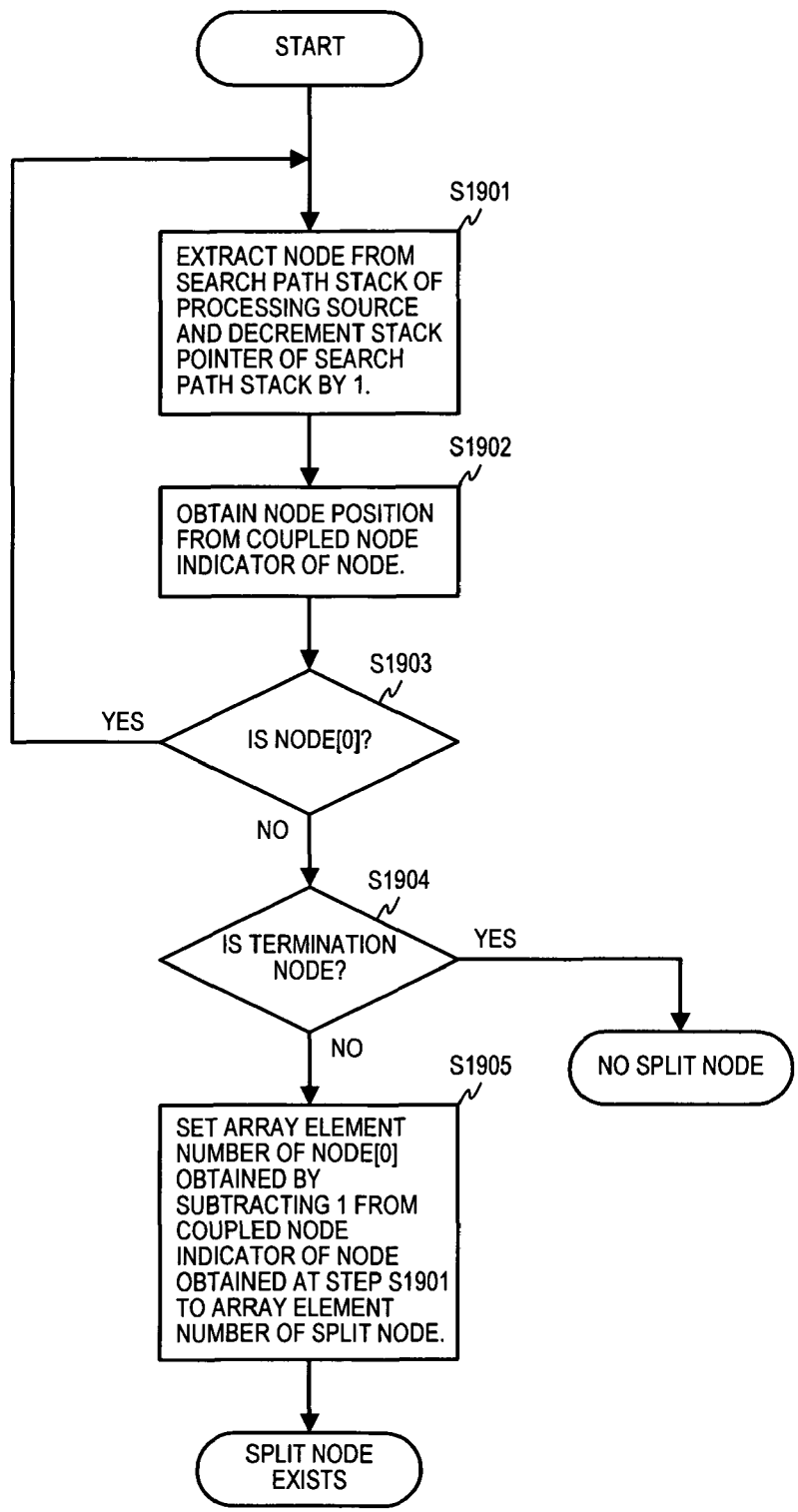
FIG. 19 is a drawing describing the processing flow for determining the next split node.

FIG. 19 is a drawing describing the processing flow for determining the next split node at step S1611 shown in FIG. 16B.

At step S1901, a node is extracted from the search path stack and the stack pointer of the search path stack is decremented by 1. The initial value of the stack pointer is the same as that after the termination of delete processing in step S1609 shown in FIG. 16B and, as will become clear hereinafter in the description of delete processing referencing FIG. 21, points to a node 2 levels above the split node (in delete processing this is the delete node).

Next, proceeding to step S1902, the node position of the node stored in the array element pointed to by the coupled node indicator extracted at step S1901 is obtained from that coupled node indicator.

Next, at step S1903, a determination is made as to whether or not the node position obtained at step S1902 is the node [0] side. If it is the node [0] side, return is made to step S1901. However, if it is the node [1] side, processing proceeds to step S1904.

At step S1904, a determination is made as to whether the node is a termination node. If the determination is that it is a termination node, "split node does not exist" is returned.

However, if the determination is that it is not a termination node, processing proceeds to step S1905, and the array element number of the node [0] obtained by subtracting 1 from the array element number extracted at step S1901 is set as the array element number of the split node, and "split node exists" is returned.

In the example shown in FIG. 22A and FIG. 22B, at the stage of determining the next split node, as was described above and shown in section (3) of FIG. 22A (a), the stack pointer of the search path stack of the processing source points to root node 220a, which is 2 levels above the split node 210f, and since 220a+1 is held in the coupled node indicator of the root node stored in the search pass stack 310 the node position is the node [1] side, and the node 210b positioned at the node [0] side that forms a pair therewith is the next split node, and 220a, which is the array element number of the array element wherein that node is stored, is set as the array element number of the split node.

In addition, as shown in section (3) of FIG. 22A (a), the termination node stored in search path stack 310 is changed from a termination node [0] to a termination node [1] in step S1606 shown in FIG. 16A.

Also, in the example shown in FIGS. 22B and 22C, at the stage of further determining the next split node, because the stack pointer of the search path stack 310 of the processing source points to the termination node [1], as shown in section (3) of FIG. 22B (a), processing proceeds from step S1903 to step S1904, and the determination returns "no split node". That is, when the parent node of the split node becomes the root node, a next split node does not exist. This is only natural, by virtue of the sequential nature of the coupled node tree.

Figure 20:
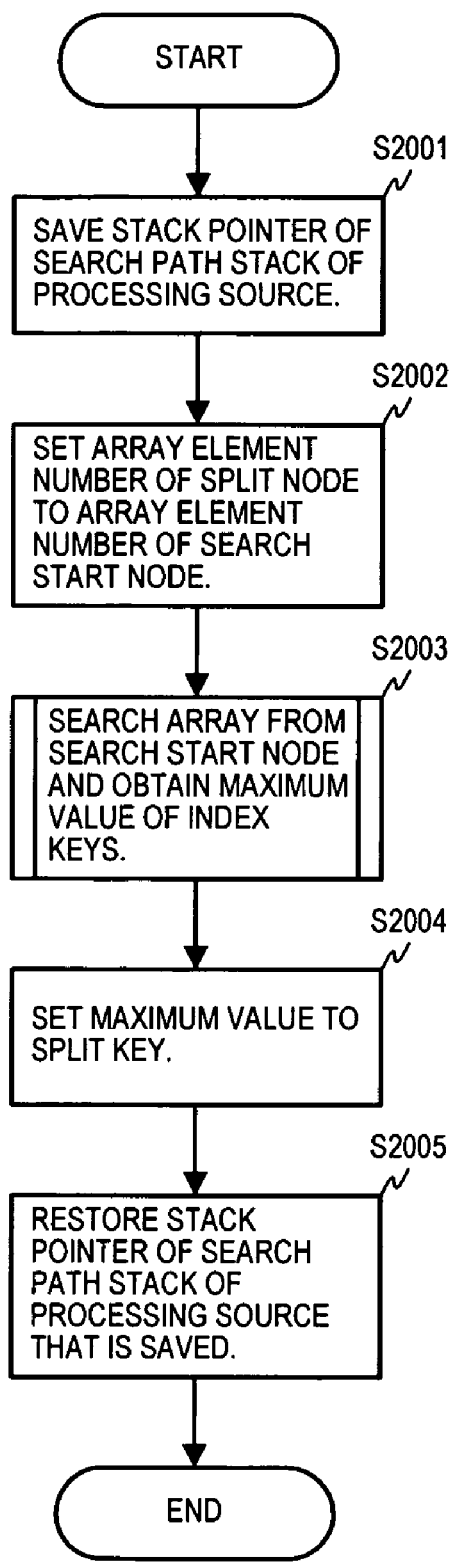
FIG. 20 is a drawing describing the processing flow for determining the maximum value of a split node tree and setting it as the next split key.

FIG. 20 is a drawing describing the processing flow for step S1613, which determines the maximum value of the split node tree having, as the root node, the split node determined at step S1611 shown in FIG. 16B and takes that maximum value as the next split key.

First, at step S2001, the stack pointer of the search path stack of the processing source is saved. The reason for doing this is that the value of the stack pointer of the processing source that points to a node 2 levels above the split node according to the processing of step S1901 in FIG. 19 changes due to the maximum value search of step S2003 described below, thus making it unusable in step S2104 shown in FIG. 21.

Next, at step S2002, the array element number of the split node set at step S1905 in FIG. 19 is set as the array element number of the search start node.

Then, at step S2003, the search for the maximum value shown in FIG. 9B is executed, and the maximum value of the index key is determined.

Next, proceeding to step S2004, the maximum value obtained at step S2003 is set as a split key. Finally, at step S2005, the value that is saved at step S2001 is restored as the value of the stack pointer of the search path stack of the processing source, and processing is ended.

As shown in section (1) of FIG. 22B (a), a maximum value search is preformed with split node 210b as the search start node, and the index key 251c "011010" is obtained as the maximum value. At this time, the stack pointer of search path stack 310 is restored from its saved position and the stack pointer of the search path stack shown in section (3) of FIG. 22B (a) points to the same node as shown in section (2) of FIG. 22B (a).

As can be seen from the above-described detailed description with reference to FIG. 19 and FIG. 20, the relationship between the next split node obtained at step S1611 of FIG. 16B and the next split key obtained at step S1613 is similar to the earlier-described relationship between the split key set at step S1601 and the split node or the split node tree obtained at step S1605.

The next split key obtained at the above cited step S1613 is the maximum value of the split node tree having the next split node obtained at step S1611 as its root node. It is also clear, from the sequential nature of the coupled node tree, that because the next split node obtained at step S1611 is the node [0], a subtree having a root node that is higher in order includes a leaf node into which is stored an index key that is larger than the next split key obtained at step S1613.

Figure 21:
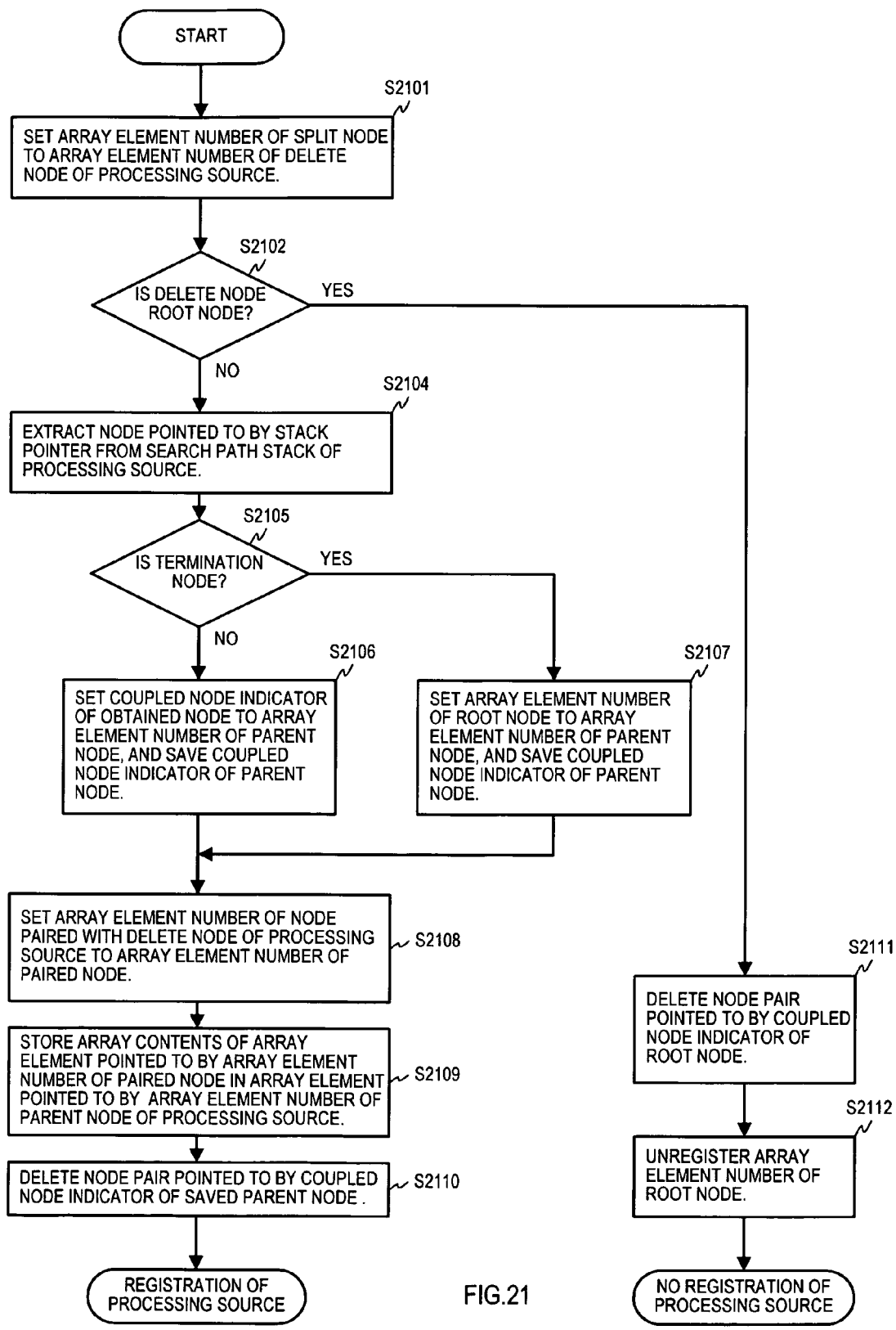
FIG. 21 is a drawing describing the processing flow for delete processing in a split node tree.

FIG. 21 is a drawing describing the processing flow for deleting a split node tree in step S1609 shown in FIG. 16. Although there is similarity in that this is delete processing, there is the difference that, in contrast to the deletion of the delete node, which is a leaf node holding the delete key in the delete processing of FIG. 15, what is shown in FIG. 21 is basically deletion of a split node that is a branch node, in which the split node tree having its root node as the split node is deleted from the processing source.

First, at step S2101, the array element number of the split node determined at either step S1605 shown in FIG. 16A or step S1611 shown in FIG. 16B is set as the array element number of the deletion node of the processing source.

Next, in step S2102, a determination is made as to whether the array element number of the delete node set at step S2101 coincides with the array element number of the root node of the processing source. If the array element number of the delete node coincides with the array element number of the root node of the processing source, processing proceeds to step S2111, at which the node pair pointed to by the coupled node indicator of the root node of the processing source is deleted, and at the next step S2112, the registration of the array element number of the root node of the processing source is deleted, "no registration of the processing source" is returned, and the processing is terminated.

If the result of the determination processing at step S2302 is that the array element number of the delete node does not coincide with the array element number of the root node of the processing source, processing proceeds to step S2104, and the node pointed to by the stack pointer is extracted from the search path stack of the processing source. By the processing of step S1705 shown in FIG. 17B or that of step S1901 shown in FIG. 19, the stack pointer points to a node that is 2 levels higher than the split node.

Next, in step S2105, a determination is made whether that extracted node is a termination node. If the determination is that that extracted node is not a termination node processing proceeds to step S2106, and the coupled node indicator of the extracted node is set as the array element number of the parent node and at the same time the coupled node indicator of the parent node is saved and processing proceeds to step S2108.

At step S2105, when a determination is made that the node extracted in step S2104 is a termination node, processing proceeds to step S2107, wherein the array element number of the root node is set as the array element number of the parent node, the coupled node indicator of the parent node is saved, and processing proceeds to step S2108.

At step S2108, the array element number of the node that forms a pair with the delete node whose array element number is set at step S2101 is obtained and set as the array element number of the paired node.

Next, at step S2109, the contents of the array element pointed to by the array element number of the paired node set at step S2108 are read out and stored in the array element pointed to by the array element number of the parent node set at step S2106 or at step S2107.

Finally, at step S2110, the node pair pointed to by the coupled node indicator of the parent node saved in step S2106 or step S2107 are deleted, "Processing source is registered" is returned, and processing is terminated.

As shown in section (1) of FIG. 22A, the array element number 221b of split node 210f is set in an unillustrated delete node setting area as the array element number of the delete node 210f, and, as again shown in section (3) of FIG. 22A, node 210a is extracted from the search path stack. At this time, as shown in the illustration, the stack pointer is not updated. Then, as shown in step S2106 of FIG. 21, the coupled node indicator 220a+1 is set in the array element number of the parent node and at the same time the coupled node indicator 221b of the parent node 211b is saved.

Next, the array element number 221b+1 of the node 211f that is a pair to the delete node 210f is set in the array element number of the paired node, and the contents of the array element pointed to by the array element number 221b+1 of the paired node 211f, that is to say, the contents of node 211f, is stored in the array element pointed to by the array element number 220a+1 of the parent node of the processing source. The result is shown in node 211b of section (1) of FIG. 22B.

In the same way, as exemplified in section (1) of FIG. 22B, the array element number 220a of split node 210b is set in an unillustrated delete node setting area as the array element number of delete node 210b, and once again as shown in section (3) of FIG. 22B, the termination node [1] is extracted from the search path stack.

Thus the determination result of step S2105 shown in FIG. 21 becomes "yes" and the array element number 220 of the root node 220a is set in the array element number of the parent node and at the same time the coupled node indicator 220a of the parent node 210a is saved.

Next, the array element number 220a+1 of the node 211b that is a pair to the delete node 210b is set in the array element number of the paired node, and the contents of the array element pointed to by the array element number 220a+1 of the paired node 211b, that is to say, the contents of node 211b, is stored in the array element pointed to by the array element number 220 of the parent node of the processing source. That result is shown in node 210a of section (1) of FIG. 22C.

The foregoing is a description of the details of the processing for splitting a coupled node tree according to the third embodiment, according to which splitting processing is performed in units of split node trees. That is, a split node is separated from the processing source, and the paired node of the split node is copied into the parent node, so that the split node tree is deleted from the processing source, the split node being inserted into the processing target, thereby completing the split node tree insertion.

Therefore, as long as the same array is used, processing with regard to nodes other than the split node is unnecessary, resulting in a yet smaller number of executed processing steps than in the case of the second embodiment.

Next, processing for conjoining a coupled node tree according to the third embodiment, which performs processing in units of subtrees, similar to the case of splitting processing is described. In the conjoining processing of this embodiment, which differs greatly from the conjoining processing of the first embodiment and the second embodiment, in contrast to the conjoining processing of the first embodiment and the second embodiment, in which the conjoining processing is performed in units of index keys or, stated differently, in units of nodes, in the conjoining processing of the third embodiment, units of subtrees satisfying a prescribed condition are split from the processing source and conjoined with the processing target. In contrast with the conjoining processing of the first embodiment and the second embodiment, in which a split key is selected to enable the application of the splitting processing as is, if conjoining processing is done in units of subtrees, as is done in this embodiment, simple application of splitting processing is not possible.

This is because both the processing source and the processing target have internal structures that are dependent upon the difference bit positions of the index keys stored therewithin, and it is not necessarily possible to insert the processing source itself as-is into the processing target as a split node tree.

Figure 23A:
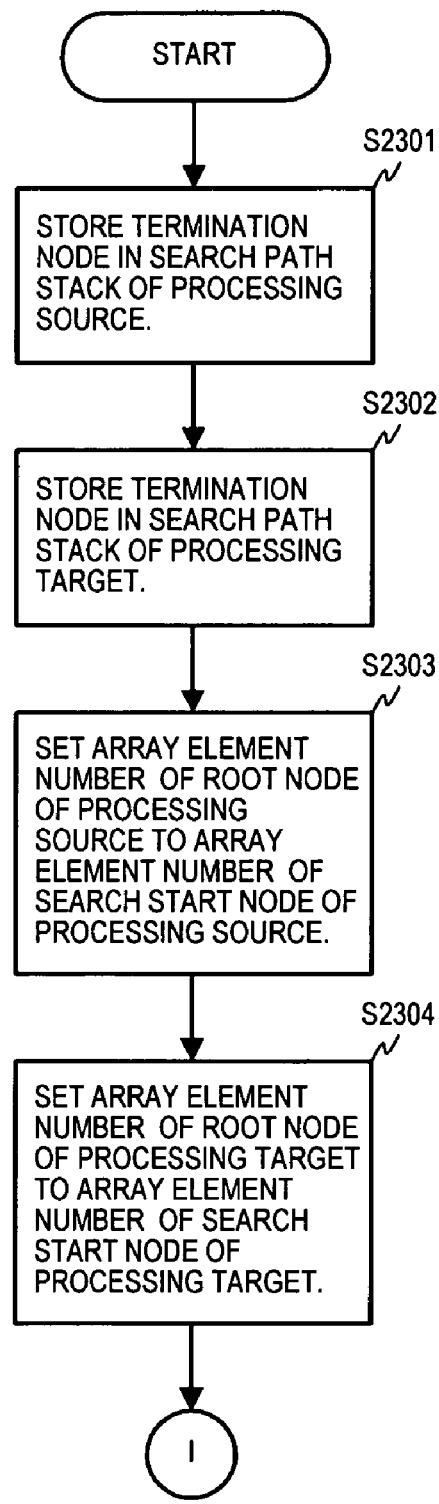
FIG. 23A is a drawing describing the processing flow of the initialization processing in the conjoining processing of a coupled node tree in the example of a third embodiment.
Figure 23B:
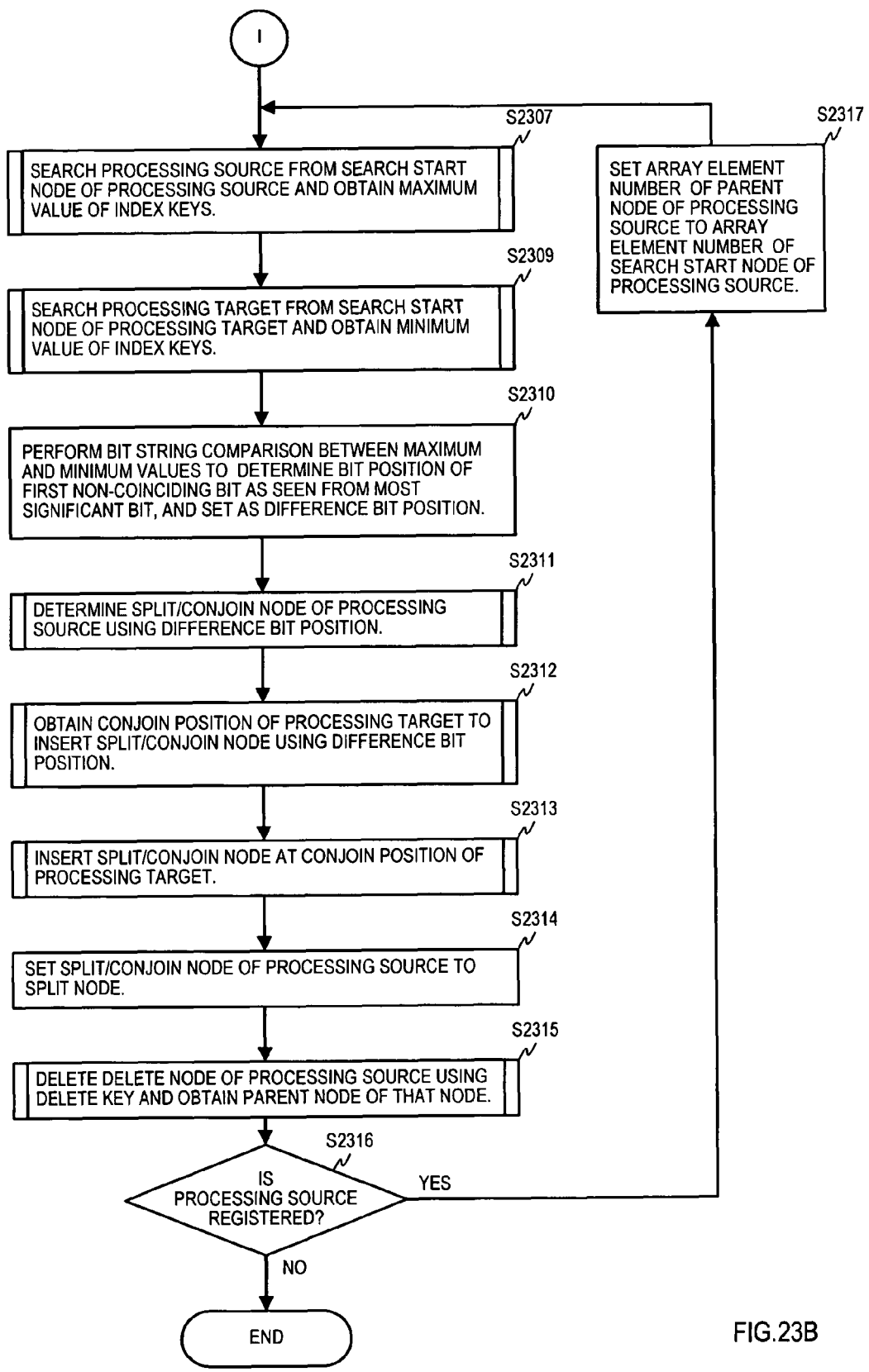
FIG. 23B is a drawing describing the processing flow of the loop process until all are conjoined from the processing source to the processing target in conjoining processing.

FIG. 23A and FIG. 23B are drawings describing the processing flow for conjoining a coupled node tree in the third embodiment. In the description that follows, although the index key of the processing target is taken to be larger than the index key of the processing source, it can be easily understood from the description to follow that it is possible to perform the same type of processing in the reverse case.

Figure 26A:
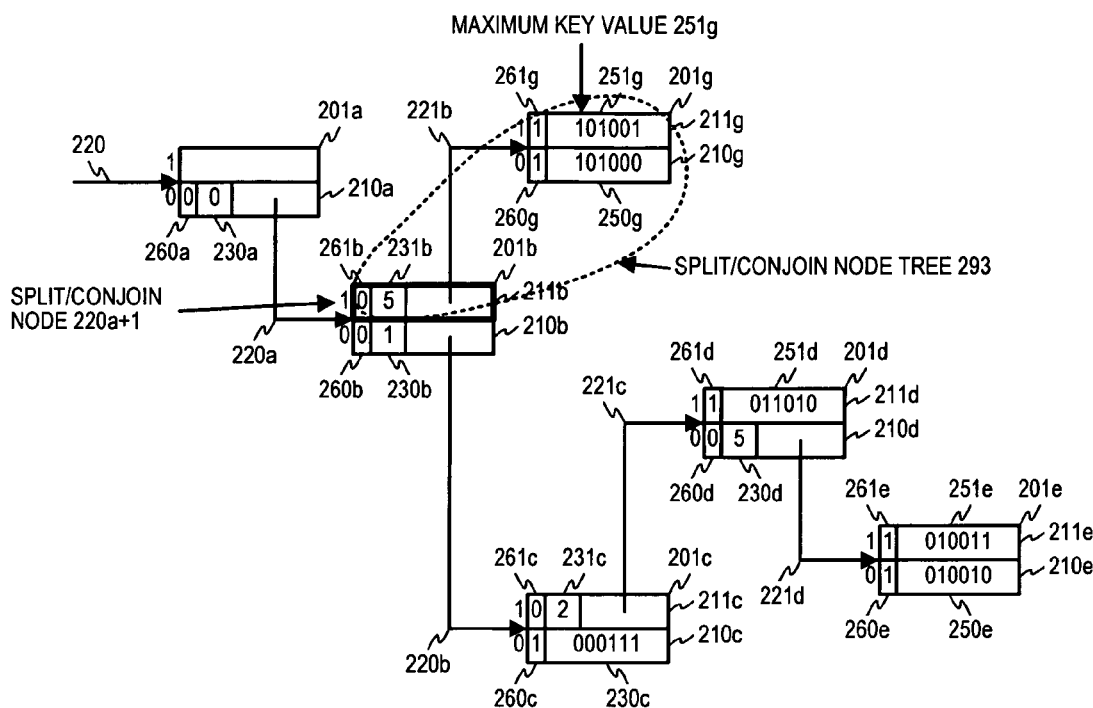
FIG. 26A is a drawing describing an example of a tree configuration before the first conjoining processing.
Figure 26A:
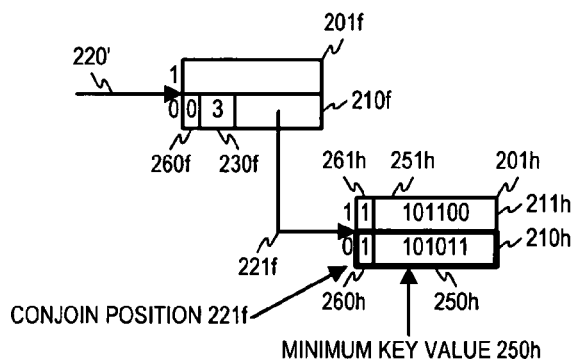
Figure 26B:
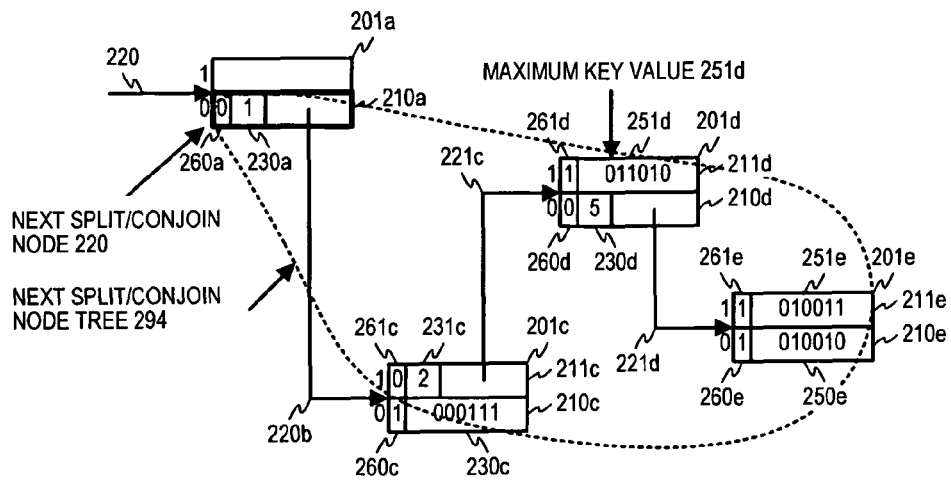
FIG. 26B is a drawing describing an example of a tree configuration after the first conjoining processing.
Figure 26B:
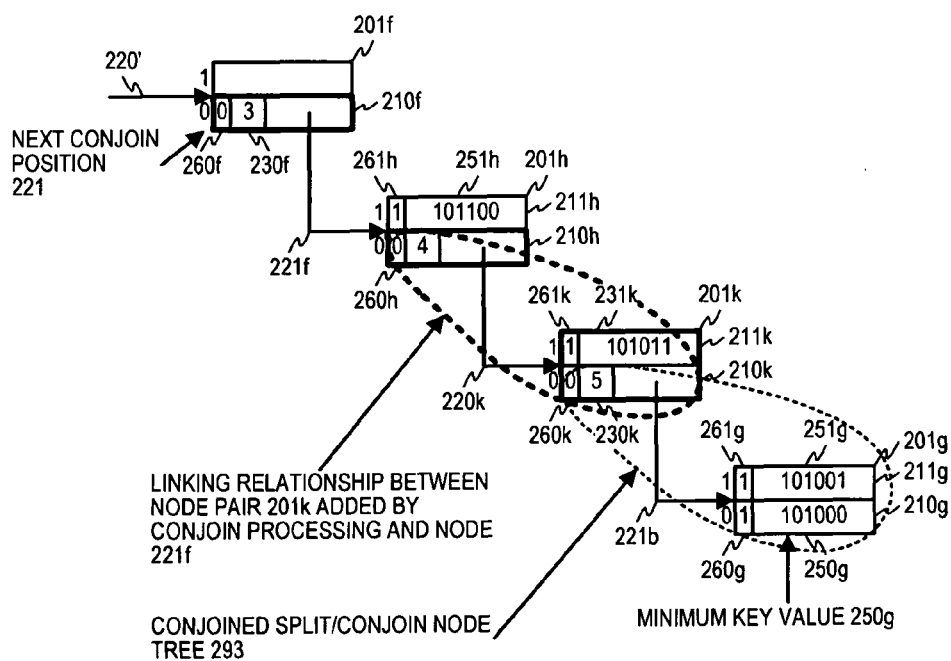
Figure 26C:
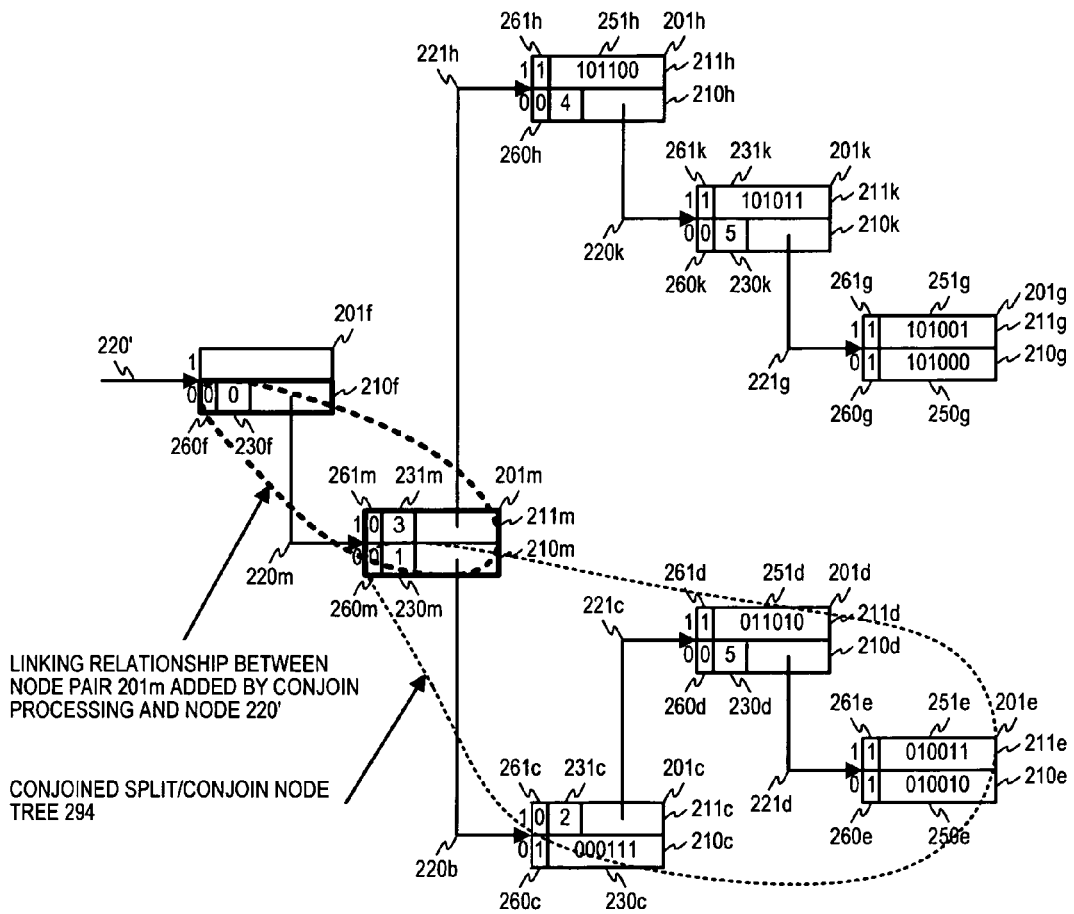
FIG. 26C is a drawing describing an example of a tree configuration after the next conjoining processing.

FIG. 26A to FIG. 26C are drawings describing an actual example of the above-noted conjoining processing, in which a tree having a structure similar to the subtree of the coupled node tree shown by example in FIG. 2B is shown as an example.

FIG. 26A is a drawing showing an example of the tree structures of the processing source and the processing target before the start of the conjoining processing. Section (a) of FIG. 26A shows an example of a processing source, and it shows a split/conjoin node to which the array element number's reference code 220a+1 is affixed and a subtree having that node as its root node, which subtree is the split/conjoin node tree 293 that is the subtree that is the unit of conjoining processing. Hereinunder, the reference code expressing a node is sometimes expressed as the coupled node indicator of the immediately higher level node, which is stacked on the search path stack.

Section (b) of FIG. 26A shows an example of a processing target, in which the node that is the conjoining position has the reference code 221f affixed thereto. FIG. 26A shows that the maximum value of the processing source is the index key 251g, "101001", and also that the minimum value of the processing target is the index key 250h, "101011".

FIG. 26B is a drawing showing the tree structure in which the split/conjoin node tree 293 shown in FIG. 26A is inserted into the processing target and deleted from the processing source. At section (a) of FIG. 26B, the next split/conjoin node tree 294 of the processing source is shown enclosed in a dotted line, and the maximum value is shown to be the index key 251d, "011010". At section (b) of FIG. 26B, the split node tree 293 conjoined to the processing target and the linking relationships between the node pair 201k added by the conjoining processing and the node 221f are each shown enclosed in dotted lines, the next conjoining position is shown to be the node 220'.

FIG. 26C is a drawing showing the tree structure of the split/conjoin node tree 294 shown in FIG. 26B inserted into the processing target and deleted from the processing source. Because the next split/conjoin node 220 of the processing source shown at section (a) of FIG. 26B is the root node, the root node of the processing source is deleted, and therefore nothing is shown at section (a) of FIG. 26C. At section (b) of FIG. 26C, the linking relationships between the split node tree 294 conjoined to the processing target, the node pair 201m added by the conjoining processing, and the node 220' are each shown enclosed by dotted lines.

The general conjoining processing in this exemplary embodiment is described below, with references made to FIG. 23A, FIG. 23B, and FIG. 26A to FIG. 26C.

FIG. 23A is a drawing describing the processing flow of the initial processing in the conjoining processing in this exemplary embodiment. As shown in the drawing, in step S2301, a termination node is stored in the search path stack of the processing source. Next, in step S2302, a termination node is stored in the search path stack of the processing target.

Next, proceeding to step S2303, the root node of the processing source is set in the search start node of the processing source. Then, at the next step, S2304, the root node of the processing target is set in the search start node of the processing target, initialization processing is terminated, and processing proceeds to step S2307 shown in FIG. 23B.

FIG. 23B is drawing describing the loop processing until the processing source is completely conjoined to the processing target.

As shown in FIG. 23B, in step S2307, the maximum value of the index keys in the processing source is obtained by the search processing, shown in FIG. 9B, from the search start node of the processing source. Next, in step S2309, the minimum value of the index keys in the processing target is obtained by the search processing, shown in FIG. 8B, from the search start node of the processing target.

Next, in step S2310, a bit string comparison is performed on the maximum value obtained in step S2307 and the minimum value obtained in step S2309, and the bit position of the first non-matching bit as seen from the highest level 0th bit is obtained and set in the difference bit position.

As was described above, in the example shown in FIG. 26A, the difference bit position 4 is determined between the maximum value of the processing source, "101001", and the minimum value of the processing target, "101011". Also, since, in the example shown in FIG. 26A, the maximum value of the processing source shown in section (a) is "011010" and the minimum value of the processing target shown in section (b) is "101000" the difference bit position is "0". Furthermore no branch node in either the processing source or the processing target has a discrimination bit position that coincides with this difference bit position.

This is due to the fact that, since the minimum value of the processing target is larger than the maximum value of the processing source, the bit value of the difference bit position of the maximum value of the processing source is 0, and if the discrimination bit position in a branch node of the processing source is coincident with the difference bit position, the maximum value of the processing source becomes node [0] and it is contradictory to say that it is a maximum value. The same applies to the processing target.

In the description to follow, the difference bit position determined at step S2310 will sometimes be referred to simply as the difference bit position.

Next, at step S2311, the split/conjoin node of the processing source is obtained using the difference bit position obtained at step S2310. In the example shown in FIG. 26A, as shown in section (a), the processing source, of FIG. 26A, the split/conjoin node obtained is 220a+1. Also in the example shown in FIG. 26B, as shown in section (a), the processing source, of FIG. 26B, the next split/conjoin node obtained is 220. The details of this processing are described later, with reference made to FIG. 24.

Next, proceeding to step S2312, the difference bit position determined at step S2601 is used to determine the conjoining position of the processing target for inserting the split/conjoin node determined at S2311. In the example shown in FIG. 26A, the conjoining position 221f is determined, as shown in section (b), processing target, of FIG. 26A. Also, in the example shown in FIG. 26B, the conjoining position 220' is determined, as shown in section (b), processing target, of FIG. 26B. The details of this processing are described later, with reference made to FIG. 25.

Next, at step S2313, the split/conjoin node obtained at step S2311 is inserted at the conjoining position obtained at step S2312. This processing is implemented in the insert processing described with reference to FIG. 18 by setting the array element number of the split/conjoin node obtained at step S2311 as the array element number of the insert node in step S1801, and setting the array element number of the conjoining position obtained at step S2312 as the insert position of the processing target in step S1802, to execute insert processing.

In the example shown in FIG. 26A and FIG. 26B, at step S1811 of FIG. 18B, the array element number 220a+1 of the split/conjoin node 220a+1 is set into the insert node setting area, and at step S1812, the array element number 221f of the conjoining position 221f is set into the insert position setting area. Next, at step S1813, an empty node pair 201k is obtained, the array element number 220k of the primary node being set as the array element number of the node [0] at step S1814.

Then, in step S1815, the contents of the array element pointed to by the array element number 220a+1 that is set into the insert node setting area, that is, the contents of the split/conjoin node 221b, are read out and are stored into the array element pointed to by the array element number 220k set as the array element number of the node [0], that is, into the node 210k.

Additionally, at step S1816, 220k+1, which is the value obtained by adding 1 to the array element number 220k, is set as the array element number of the node [1]. Then, at step S1817, the array element pointed to by the array element number 221f set as the insert position, that is, the contents of the node 210h, are read out and stored into the array element pointed to by the array element number 220k+1 set as the array element number of the node [1], that is, into node 221k.

Finally, at step S1818, a new branch node is generated by setting 0 into the node type of the array element pointed to by the array element number 221f set as the insert position, that is, as the node 210h position, by setting the difference bit position 4 determined at step S2310 of FIG. 23 into its discrimination bit position, and by setting the array element number 220k set as the array element number of the node [0] into its coupled node indicator, thereby obtaining the processing target structure after the conjoining, as shown at section (b) in FIG. 26B.

Also, in the illustrations of FIG. 26B and FIG. 26C, since difference bit position between the maximum value "011010" of the processing source shown in section (a) of FIG. 26B and the minimum value "101000" of the processing target shown in section (b) is "0", the node 220 is set as the next split/conjoin node. In step S1811 of FIG. 18B, the array element number 220 of the next split/conjoin node 220 is set in the insert node setting area, and in step S1812, the array element number 220' of the conjoin position 220' is set in the insert position setting area. Next, in step S1813, as shown in section (b) of FIG. 26C, an empty node pair 201m is acquired, and in step S1814 its array element number 220m is set as the array element number of node [0].

Then, in step S1815, the contents of the array element pointed to by the array element number 220 set in the insert node setting area, that is to say, the contents of the next split/conjoin node 210a, is read out and is stored in the array element pointed to by the array element number 220m set as the array element number of the node [0], that is to say, in node 210m.

Furthermore, in step S1816, the value 220m+1 obtained by adding 1 to the value of array element number 220m is set as the array element number of node [1]. Then, at step S1817, the contents of the array element pointed to by the array element number 220' set as the insert position, that is, the contents of node 210f, are read out and stored in the array element pointed to by the array element number 220m+1 set as the array element number of node [1], that is, node 211m.

Finally, in step S1818, a new branch node is generated by setting the following in the position of the array element pointed to by the array element number 220' set as the insert position, that is, in node 210f, setting 1) a 0 in the node type, 2) the difference bit position "0" obtained in step S2310 of FIG. 23B in the discrimination bit position, and 3) the array element number 220m set as the array element of number of node [0] in the coupled node indicator, and in this way the configuration of the processing target after conjoining shown in section (c) of FIG. 26B is obtained.

Next, returning to the description of the tree conjoining processing in accordance with FIG. 23B, at step S2314, the split/conjoin node determined in step S2314 is set in the split node, and proceeding to step S2315, the delete node is deleted from the processing source, and the parent node of that node is obtained. The processing in step S2315 is implemented by executing the delete processing described with reference to FIG. 21. Since this delete processing is executed after setting the split/conjoin node determined in step S2311 as the split node in step S2314, it corresponds to an execution wherein the split node is read as the split/conjoin node.

Next, proceeding to step S2316, a determination is made as to whether the processing source is registered. If it is registered, processing proceeds to step S2317, and if it not registered, conjoin processing is completed and so processing is terminated.

At step S2317, the parent node of the delete node acquired in step S2315 is set as the search start node of the processing source, and processing returns to step S2307. In the illustrations of FIG. 26A and FIG. 26B, since the stack pointer of the search path stack of the processing source points to a termination node when the processing to obtain the split/conjoin node 220a+1 of the processing source terminates, the determination process of step S2105 of the delete processing shown in FIG. 21, called out in step S2315 shown in FIG. 23B, becomes "yes" and processing proceeds to step S2107. At step S2107, the array element number 220 of the root node 210a is set in the array element number of the parent node, and the coupled node indicator 220a is saved. The split/conjoin node 220a+1 is set in the delete node, and the node 210b is set in the paired node. Then, the contents of node 210b is stored in the array element with array element number 220, and the node pair 201b pointed to by the coupled node indicator 220a is deleted, and the processing target becomes as shown in section (a) of FIG. 26B.

In the illustrations of FIG. 26B and FIG. 26C, when the processing to obtain the split/conjoin node 220 of the processing source terminates, the determination process of whether the delete node is the root node in step S2102 of the delete processing shown in FIG. 21, called out in step S2315 shown in FIG. 23B, becomes "yes" and processing proceeds to step S2111. At step S2111, the node pair 201a pointed to by the array element number 220 of the root node is deleted, and the registration of the array element number of the root node is deleted, and as shown in section (a) of FIG. 26C, the processing target is excised.

Next, the processing to obtain a split/conjoin node of the processing source in the conjoin processing of an exemplary embodiment of this invention is described. A split/conjoin node is, ignoring the exceptional case wherein the processing source has only a root node, of the branch nodes traversed in a maximum value search, the branch node whose discrimination bit position is the highest of all those positions lower than the difference bit position obtained in step S2310 shown in FIG. 23B.

If the subtree in the processing source with the split/conjoin node as its root node were to be called a split/conjoin node tree, then the conjoin processing of the preferred embodiment of this invention in the conjoin processing is in units of split/conjoin node trees.

Figure 24:
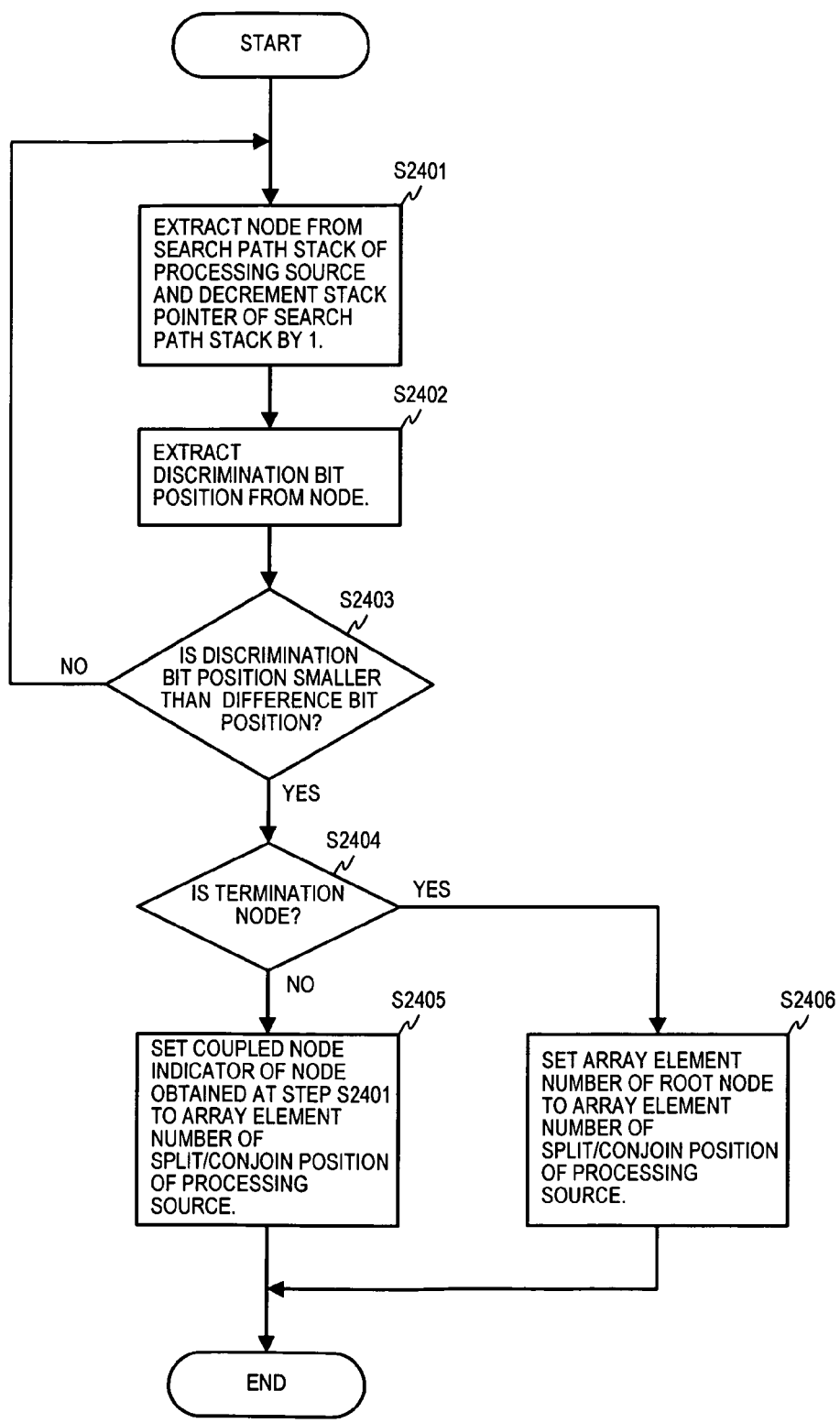
FIG. 24 is a flowchart describing the processing flow for determining the split/conjoin node of the processing source.

FIG. 24 is a drawing describing the processing flow of step S2311 shown in FIG. 23B, to obtain a split/conjoin node of the processing source. At the start of the processing to obtain a split/conjoin node, the stack pointer of the search path stack of the processing source points to the node directly above the leaf node holding the maximum value of the index keys that is the search result of the maximum value search in step S2307 shown in FIG. 23B.

As shown in FIG. 24, in step S2401, the node pointed to by the stack pointer, is extracted from the search path stack of the processing source, the stack pointer is decremented by 1, and processing proceeds to step S2402.

At step S2402, a discrimination bit position is acquired from the node extracted in step S2401.

Next, in step S2403, a determination is made whether the value of the discrimination bit position acquired in step S2402 is smaller (has a higher level position relationship) than the difference bit position. If it is not smaller, processing returns to step S2401, and if it is smaller processing proceeds to step S2404. As was noted previously, there is no coincidence between the above discrimination bit position and the difference bit position.

In step S2404, a determination is made whether the node extracted in S2401 is a termination node. If it is not a termination node, processing proceeds to step S2405, wherein the coupled node indicator of the node extracted in step S2401 is set as the array element number of the split/conjoin node of the processing source, and processing is terminated.

If the determination result in step S2404 is that of a termination node, processing proceeds to step S2406, wherein the array element number of the root node is set as the array element number of the split/conjoin node of the processing source, and processing is terminated.

The above-noted processing is described below, with references made to FIG. 26A and FIG. 26B.

In the example of the processing of section (a) of FIG. 26A, since the result of the maximum value search is that the stack pointer of the not-shown search path stack points to the node 211b and the discrimination bit position "5" is extracted, and since the difference bit position is "4", therefore the determination in step S2403 is "no", and the processing from step S2401 is repeated until the root node 210a is reached. Because the discrimination bit position of the root node 210a is 0, which is higher in order than the difference bit position, the determination processing at step S2403 results in branching to step S2404, and the processing of step S2405 determines the split/conjoin node to be 220a+1. (Since the maximum value search has been executed, the coupled node indicator for the root node 210*a* in the search path stack is changed to 220*a*+1.)

In the example of FIG. 26B, the maximum value "011010" is determined by the maximum value search of the processing source from the root node 210*a*, which is the parent node of the delete node 211*b*, and since the minimum value of the processing target is "101000", as shown in section (b) of FIG. 26B, the difference bit position "0" is set. Since the stack pointer of the search path stack of the processing source points to node 211*c*, the discrimination bit position "2" is extracted, and since the difference bit position is "0", the determination in step S2403 is "no", and the processing from step S2401 is repeated until the root node 210*a* is reached, and because the discrimination bit position of the root node 210*a* is 0, which is not smaller than the difference bit position, once again the processing from step S2401 is repeated until the termination node is reached, and since the discrimination bit position of the termination node is "−1" the determination processing in step S2403 results in a branch to step S2404, and the determination processing in step S2404 results in a branch to step S2406, and the next split/conjoin node 220 is determined in the processing of step S2406.

Next, the processing for obtaining the conjoining position of the processing target will be described. Because the leaf node into which the maximum value of the index key of the processing source is stored is inserted into the processing target after the conjoining processing, there exists a new branch node that has a discrimination bit position that is equal in value to the difference bit position. That is, a branch node having a discrimination bit position with a value that is equal to difference bit position is inserted into the path traversed in the minimum value search, this insert position being the conjoining position of the processing target.

In a coupled node tree, because the discrimination bit position of a lower-order branch node is of lower order than the discrimination bit position of a higher-order branch node, the position of a child node of a branch node that has a discrimination bit position immediately above the difference bit position is the conjoining position or, in an exceptional case wherein there is no branch node with an upper-order discrimination bit position, the root node is the conjoining position.

On the node [1] side of a child node pair of a branch node inserted at the conjoining position, a leaf node exists into which is stored the minimum value of the index key of the processing target before conjoining, and the node [0] is the split/conjoin node.

Figure 25:
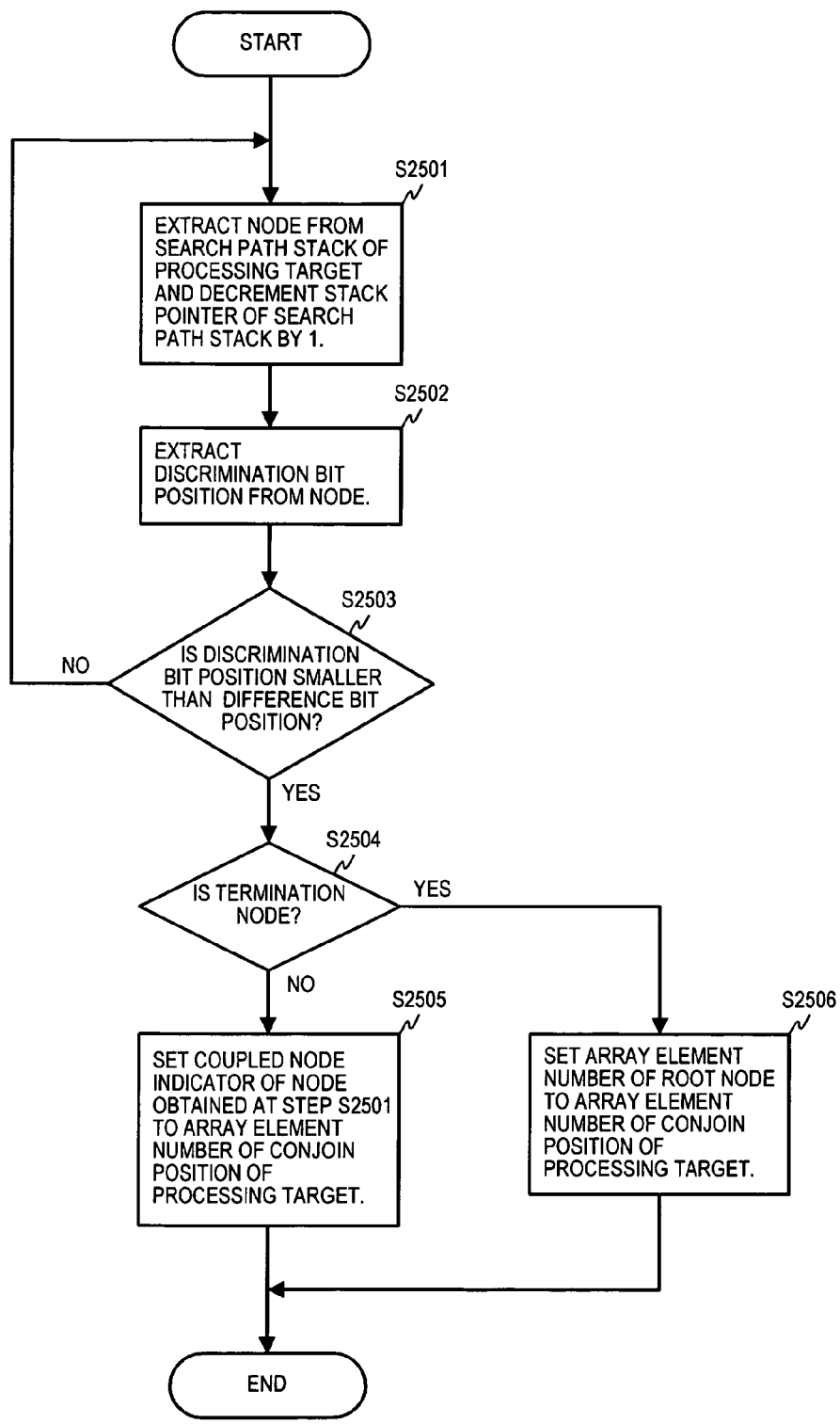
FIG. 25 is a drawing describing the processing flow for determining the conjoining position of the processing target.

FIG. 25 is a drawing describing the processing flow for obtaining the conjoining position of the above-noted processing target. As shown in FIG. 25, the flow of processing for obtaining the conjoining position of the processing target has the same structure as the processing flow for obtaining the split/conjoin node of the processing source shown in FIG. 24, and the only difference is what is obtained as the conjoining position. When the processing to obtain the conjoining position of the processing target is started, the stack pointer of the search path stack of the processing target, as a result of the minimum value search in step S2309 shown in FIG. 26, points to the node immediately above the leaf node in which the maximum key value is stored.

As shown in FIG. 25, in step S2501, the node pointed to by the stack pointer is extracted from the search path stack of the processing target, the stack pointer is decremented by 1, and processing proceeds to step S2502.

At step S2502, the discrimination bit position of the node extracted in step S2501 is obtained.

Next, at step S2503, a determination is made as to whether the discrimination bit position obtained at step S2502 is smaller than the difference bit position (whether it has a higher position relation). If not smaller, return is made to step S2501. If smaller, processing proceeds to step S2504. As noted above, the above-described discrimination bit position would not coincide with the difference bit position.

In step S2504, a determination is made whether the node extracted in step S2501 is the termination node. If it is not the termination node, processing proceeds to step S2505 and the coupled node indicator of the node extracted in step S2501 is set as the array element number of the conjoin position in the processing target and processing is terminated.

If the determination result of step S2504 is that of a termination node, processing proceeds to step S2506, wherein the array element number of the root node is set as the array element number of the conjoin position in the processing target, and processing is terminated.

The above processing is described below referencing FIG. 26A and FIG. 26B.

In the illustration of the processing target (b) of FIG. 26A, as a result of the minimum value search, since the stack pointer of an unillustrated search path stack points to node 210*f*, the discrimination bit position "3" is extracted, and because the difference bit position is "4", the determination in step S2503 becomes "yes", and processing branches from step S2504 to step S2505, wherein the coupled node indicator 221*f* of node 210*f* is set as array element number of the conjoin position.

In the example shown in FIG. 26B, when back-tracing is done along the search path from node 210*g*, into which the minimum key value is stored, the termination node is reached because the difference bit position is 0 between the maximum value "011010" of the processing source and the minimum value "101000" of the processing target, and at step S2504, the determination is made that this is the termination node, and branching is done to step S2506, the array element number 220' of the root node 210*f* being obtained as the array element number of the next conjoining position.

The foregoing is a description of the details of the processing for conjoining a coupled node tree in the third embodiment, according to which conjoining processing is performed in units of split/conjoin node trees. That is, a split/conjoin node is separated from the processing source, the paired node of the split/conjoin node is copied into the parent node, so that the split/conjoin node tree is deleted from the processing source, the split/conjoin node being conjoined to the processing target, thereby completing the conjoining of the split/conjoin node tree.

Therefore, as long as the same array is used, processing with regard to nodes other than the split/conjoin nodes is unnecessary, resulting in a yet smaller number of executed processing steps than in the case of the second embodiment.

Although the foregoing is a detailed description of a preferred mode of embodying the present invention, the embodiments of the present invention are not limited in this manner, and it will be clear to a person skilled in the art that a variety of modifications thereof are possible.

Figure 27A:
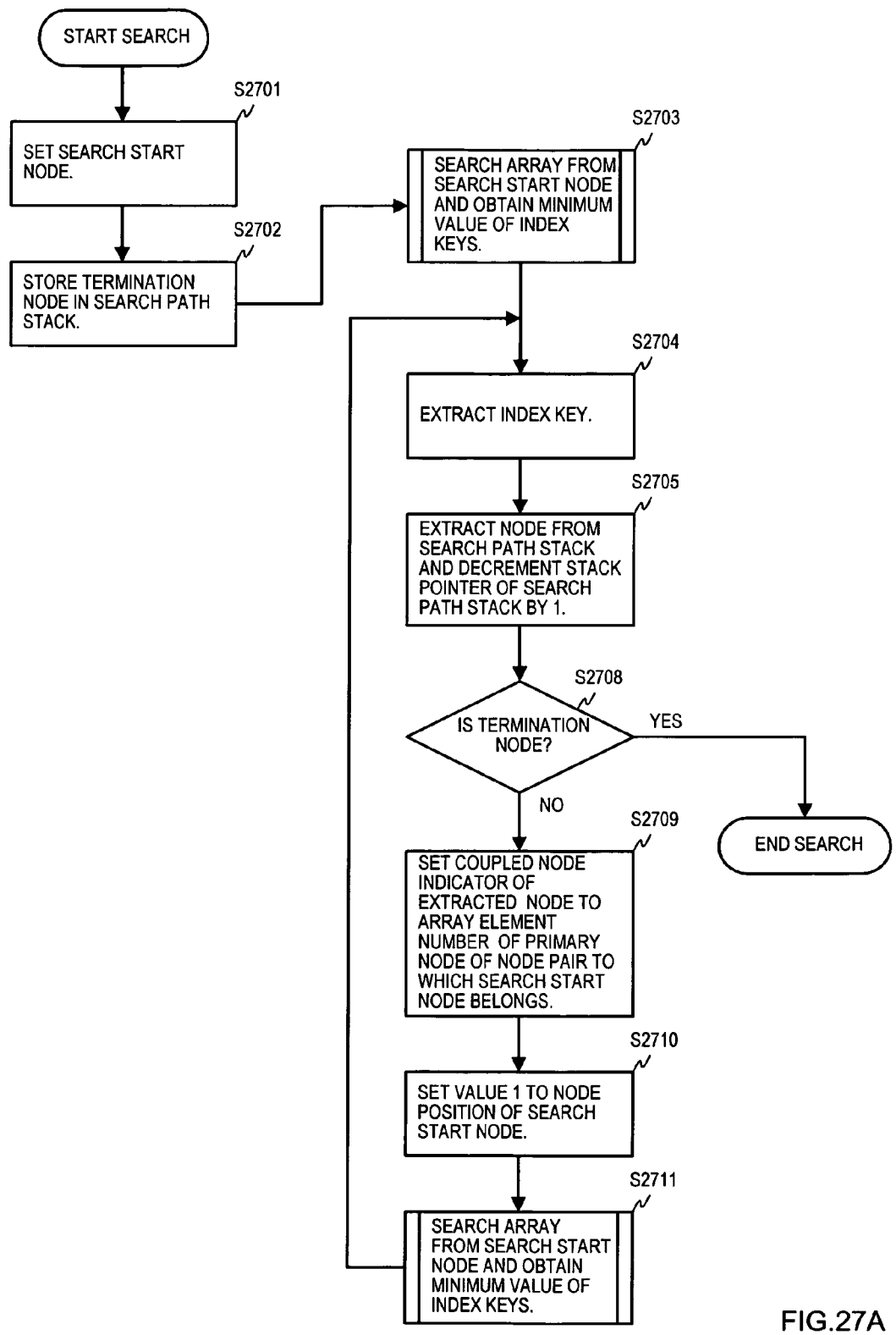
FIG. 27A is a flowchart describing the processing for extracting in ascending order index keys stored in an arbitrary subtree of a coupled node tree in accordance with an embodiment of this invention.
Figure 27B:
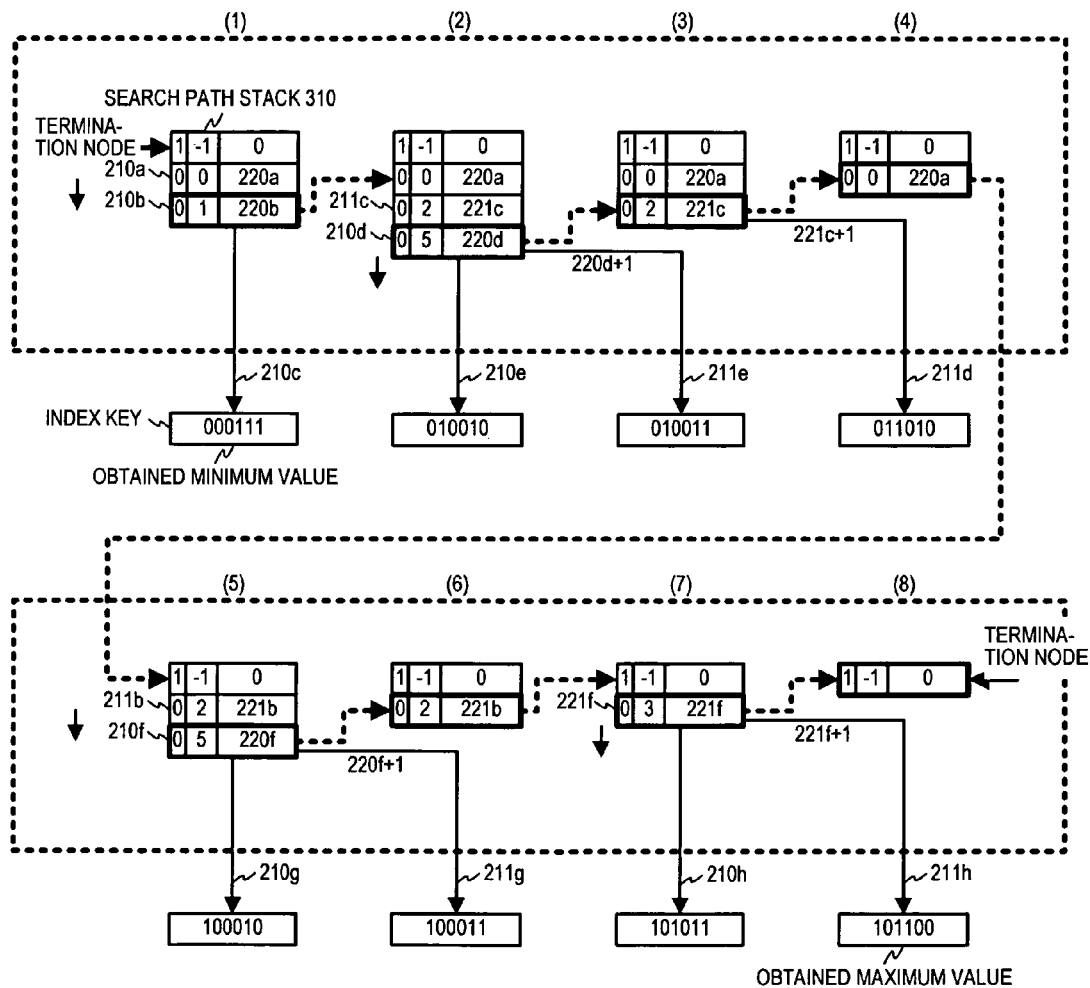
FIG. 27B is a drawing describing an example of the processing for extracting index keys in ascending order.

Next the processing to extract in ascending order the index keys stored in a coupled node tree, referencing FIG. 27A and FIG. 27B. FIG. 27A is an example flowchart of the process to extract, in ascending order, index keys stored in the coupled node tree. The process to extract index keys in ascending order is equivalent to traversing the nodes successively, giving priority to the node [0] side of the node pairs and the tree depth direction, and extracting the index key from each leaf node.

As shown in FIG. 27A, in step S2701 the search start node is set, and in step S2702 the termination node is stored in the search path stack, and in step S2703 the minimum value search shown in FIG. 8B is executed and processing proceeds to step S2704.

In step S2704 the index key that is the minimum value obtained in step S2703 or in the step S2711 described later is extracted. Next, in step S2705, the node pointed to by the stack pointer is extracted from the search path stack, and the value of the stack pointer is decremented by 1. The status of the search path stack at the first execution of step S2705 is the same status as that when the minimum value search of step S2703 has been executed.

In step S2708 a determination is made whether the node extracted in step S2705 is the termination node. If the node is the termination node, processing is terminated because the extraction of index keys is completed.

If the determination in step S2708 is "not a termination node", processing proceeds to step S2709, and the coupled node indicator of the node extracted in step S2705 is set as the array element number of the primary node of a node pair to which the search start node belongs.

In addition, at step S2710, the value "1" is set as the node position of the search start node, and processing proceeds to step S2711, wherein the minimum value search shown in FIG. 8B is executed and the minimum value of the index keys is acquired, and processing returns to the processing at step S2704 to extract the index key that is the minimum value.

By repeating the loop processing of the above steps S2704 to S2711 until the determination in step S2708 is "yes", the index keys of the subtree with the search start node as its root node are extracted in ascending sequence.

FIG. 27B is a drawing describing an example of the processing, described in the flowchart of FIG. 27A, to extract index keys in ascending sequence. The coupled node tree is the one illustrated in FIG. 2B, and the search start node is the root node 210a. The sections (1) to (8) of FIG. 27B show the status of the search path stack 310 and the index key to be extracted at each stage of the processing to extract index keys in ascending order.

FIG. 27B(1) shows the search path stack 310 and the index key to be extracted at the stage after minimum value search processing has been executed with the root node 210a as the search start node. The position pointed to by the stack pointer has been changed from the termination node to node 210b. Here, since the node pointed to by the coupled node indicator 220b of node 210b is the leaf node 210c, the index key "000111" of this node 210c is extracted, and the position pointed to by the stack pointer is decremented by 1 and points to node 210a. Then, the coupled node indicator 220b is set in the coupled node indicator of the minimum value search, the value "1" is set in the node position, and the next minimum value search is executed. In other words, the next search start node becomes node 211c, which is the node [1] of node pair 201c pointed by the coupled node indicator 220b.

FIG. 27B(2) shows the search path stack 310 and the index key to be extracted at the stage after minimum value search processing has been executed with node 211c as the search start node. As a result of the minimum value search nodes node 211c and node 210d are stored above node 210a in the search path stack 310. Here, since the node 210e pointed to by the coupled node indicator 220d of node 210d is a leaf node, the index key "010010" of this node 210e is extracted, and the position pointed to by the stack pointer is decremented by 1 and points to node 211c. Then, the coupled node indicator 220d is set in the coupled node indicator of the minimum value search, the value "1" is set in the node position, and the next minimum value search is executed.

FIG. 27B(3) shows the search path stack 310 and the index key to be extracted at the stage after minimum value search processing has been executed with coupled node indicator 220d set in the coupled node indicator and the value "1" set in the node position. Here, since the node 211e extracted from the array is a leaf node, the index key "010011" of this node 211e is extracted, and the position pointed to by the stack pointer is decremented by 1 and points to node 210a. Then, the coupled node indicator 221c is set in the coupled node indicator of the minimum value search, the value "1" is set in the node position, and the next minimum value search is executed.

FIG. 27B(4) shows the search path stack 310 and the index key to be extracted at the stage after minimum value search processing has been executed with coupled node indicator 221c set in the coupled node indicator and the value "1" set in the node position. Here, since the node 211d extracted from the array is a leaf node, the index key "011010" of this node is extracted, and the position pointed to by the stack pointer is decremented by 1 and points to the termination node. Then, the coupled node indicator 220a is set in the coupled node indicator of the minimum value search, the value "1" is set in the node position, and the next minimum value search is executed. In other words, the next search start node is node 211b.

FIG. 27B(5) shows the search path stack 310 and the index key to be extracted at the stage after minimum value search processing has been executed with node 211b as the search start node. As a result of the minimum value search nodes node 211b and node 210f are stored above the termination node in the search path stack 310. Here, since the node 210g pointed to by the coupled node indicator 220f of node 210f is a leaf node, the index key "100010" of this node 210g is extracted, and the position pointed to by the stack pointer is decremented by 1 and points to node 211b. Then, the coupled node indicator 220f is set in the coupled node indicator of the minimum value search, the value "1" is set in the node position, and the next minimum value search is executed.

FIG. 27B(6) shows the search path stack 310 and the index key to be extracted at the stage after minimum value search processing has been executed with coupled node indicator 220f set in the coupled node indicator and the value "1" set in the node position. Here, since the node 211g extracted from the array is a leaf node, the index key "100011" of this node is extracted, and the position pointed to by the stack pointer is decremented by 1 and points to the termination node. Then, the coupled node indicator 221b of node 211b is set in the coupled node indicator of the minimum value search, the value "1" is set in the node position, and the next minimum value search is executed.

FIG. 27B(7) shows the search path stack 310 and the index key to be extracted at the stage after minimum value search processing has been executed with coupled node indicator 221b set in the coupled node indicator and the value "1" set in the node position. As a result of the minimum value search node 211f is stored above the termination node. Here, since the node 210h pointed to by the coupled node indicator 221f of node 211f is a leaf node, the index key "101011" of this node 210h is extracted, and the position pointed to by the stack pointer is decremented by 1 and points to the termination node. Then, the coupled node indicator 221f is set in the coupled node indicator of the minimum value search, the value "1" is set in the node position, and the next minimum value search is executed.

FIG. 27B(8) shows the search path stack 310 and the index key to be extracted at the stage after minimum value search processing has been executed with coupled node indicator 221f set in the coupled node indicator and the value "1" set in the node position. Here, since the node 211h extracted from the array is a leaf node, the index key "101100" of this node 211h is extracted. Then, at step S2708 shown in FIG. 27A, a determination is made that the node extracted from search path stack 310 in the previous step S2705 is a termination node, and processing is terminated.

As can be understood from the above description, when the index key that is the maximum value is obtained during a minimum value search, the branch node immediately above the leaf node holding the index key that is the maximum value is extracted from the search path stack and next, since no new node is stored above the termination node, before proceeding to the next minimum value search, at step S2705 shown in FIG. 27A the termination node is extracted, and at step S2708 a determination is made that it is a termination node, and processing is terminated.

Figure 28A:
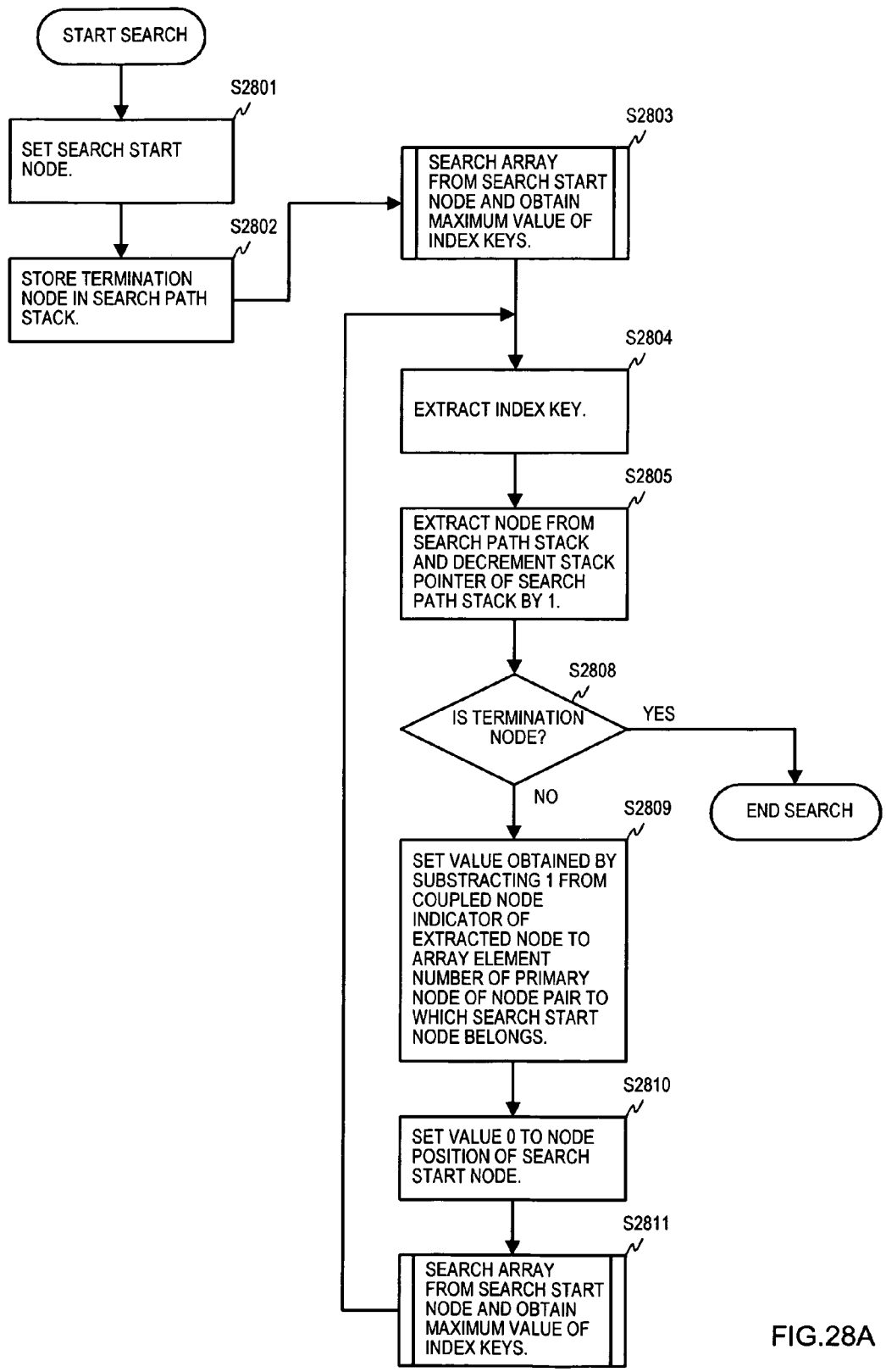
FIG. 28A is a flowchart describing the processing for extracting in descending order index keys stored in an arbitrary subtree of a coupled node tree in accordance with an embodiment of this invention.
Figure 28B:
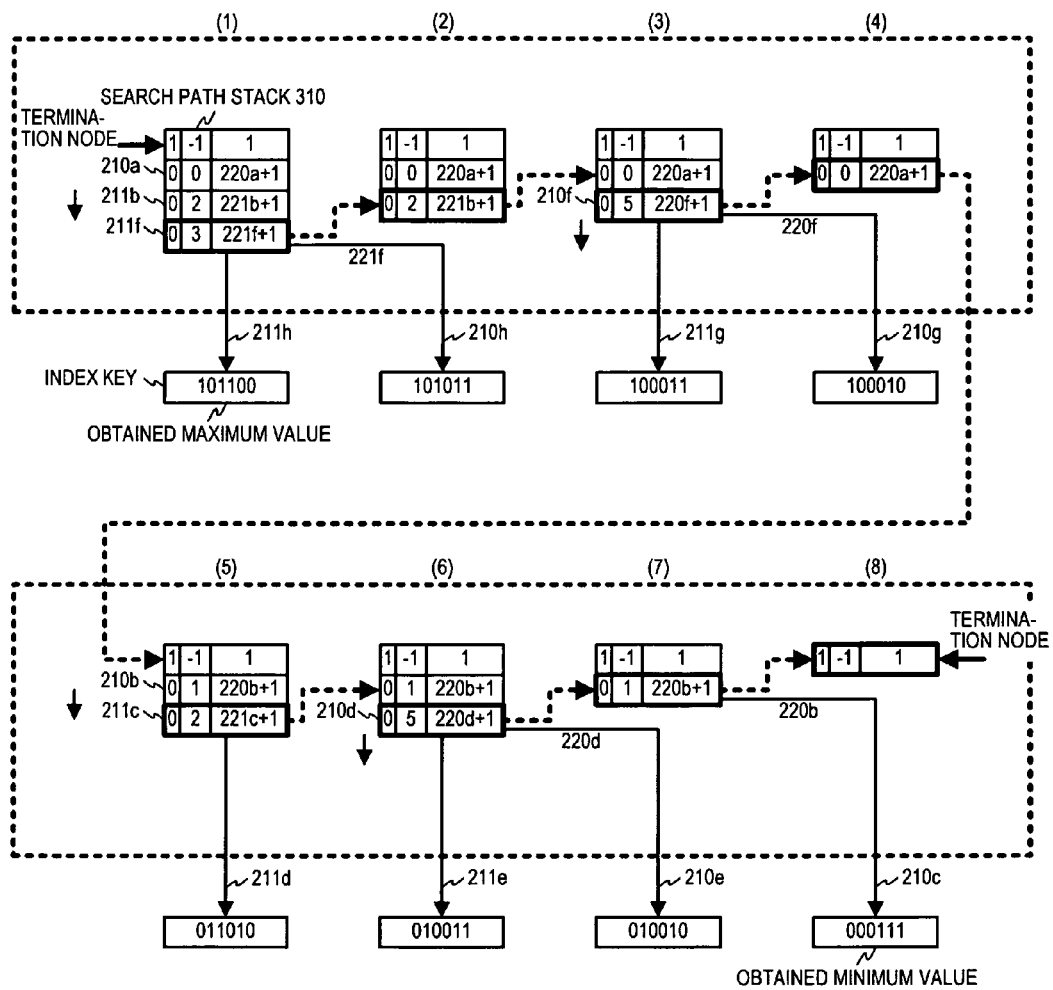
FIG. 28B is a drawing describing an example of the processing for extracting index keys in descending order.

Next, the processing to extract in descending order the index keys stored in a coupled node tree, referencing FIG. 28A and FIG. 28B, is described. This processing to extract index keys in descending order has, as it were, a mirror relation to the processing that extracts in ascending order, described previously referencing FIG. 27 and FIG. 27B, and corresponds to a process wherein the minimum value search is replaced by a maximum value search and the node position is reversed.

FIG. 28A is a flowchart describing the process to extract, in descending order, index keys stored in an arbitrary subtree of a coupled node tree. The process to extract index keys in descending order is equivalent to traversing the nodes successively, giving priority to the node [1] side of the node pairs and the tree depth direction, and extracting the index key from each leaf node.

As shown in FIG. 28A, in step S2801 the search start node is set, and in step S2802 the termination node is stored in the search path stack, and in step S2803 the maximum value search shown in FIG. 9B is executed and processing proceeds to step S2804.

In step S2804 the index key that is the maximum value obtained in step S2803 or in the step S2811 described later is extracted.

Next, in step S2805, the node pointed to by the stack pointer is extracted from the search path stack, and the value of the stack pointer is decremented by 1. The status of the search path stack at the first execution of step S2805 is the same status as that when the maximum value search of step S2803 has been executed.

In step S2808 a determination is made whether the node extracted in step S2805 is the termination node. If the node is the termination node, processing is terminated because the extraction of index keys is completed.

If the determination in step S2808 is "not a termination node", processing proceeds to step S2809, and the coupled node indicator of the node extracted in step S2805 is decremented by one and is set as the array element number of the primary node of a node pair to which the search start node belongs.

In addition, at step S2810, the value "0" is set as the node position of the search start node, and processing proceeds to step S2811, wherein the maximum value search shown in FIG. 9B is executed and the maximum value of the index keys is acquired, and processing returns to the processing at step S2804 to extract the index key that is the maximum value.

By repeating the loop processing of the above steps S2804 to S2811 until the determination in step S2808 is "yes", the index keys of the subtree with the search start node as its root node are extracted in descending sequence.

FIG. 28B is a drawing describing an example of the processing for extracting, in descending order, the index keys stored in a coupled node tree as was described in the flow chart of FIG. 28A. The coupled node tree is the one exemplified in FIG. 2B and the search start node is the root node 210a. The sections (1) to (8) of FIG. 28B show the status of the search path stack 310 and the index keys to be extracted at the various stages that execute the processing to extract index keys in descending order.

FIG. 28B(1) shows search path stack 310 and the index key to be extracted in the stage wherein maximum value search processing is executed using the root node 210a as the search start node. The position pointed to by the stack pointer has moved from the termination node to node 211f. Here, since the node 211h pointed to by array element number (221f+1) of node 211f is a leaf node, the index key "101100" is extracted and the position pointed to by the stack pointer is decremented by 1 and becomes node 211b. Then 221f that is the value resulting from decrementing "1" from the coupled node indicator 221f+1 is set in the coupled node indicator of the maximum value search, the value "0" is set in the node position, and the next maximum value search is executed.

FIG. 28B(2) shows search path stack 310 and the index key to be extracted in the stage wherein maximum value search processing is executed setting "0" in the node position and coupled node indicator 221f in the coupled node indicator. Here, since the node 210h extracted from the array is a leaf node, the index key "101011" of that node 210h is extracted and the position pointed to by the stack/pointer is decremented by 1 and becomes node 210a. Then coupled node indicator 221b is set in the coupled node indicator of the maximum value search, the value "0" is set in the node position, and the next maximum value search is executed.

FIG. 28B(3) shows search path stack 310 and the index key to be extracted in the stage wherein maximum value search processing is executed setting "0" in the node position and coupled node indicator 221b in the coupled node indicator. As a result of the maximum value search, the node 210f is stored above node 210a in search path stack 310. Here, since the node 211g pointed to by coupled node indicator (220f+1) of node 210f is a leaf node, the index key "100011" of that node 211g is extracted and the position pointed to by the stack pointer is decremented by 1 and becomes node 210a. Then coupled node indicator 220f is set in the coupled node indicator of the maximum value search, the value "0" is set in the node position, and the next maximum value search is executed.

FIG. 28B(4) shows search path stack 310 and the index key to be extracted in the stage wherein maximum value search processing is executed setting "0" in the node position and coupled node indicator 220f in the coupled node indicator. Here, since the node 210g extracted from the array is a leaf node, the index key "100010" of that node 210g is extracted and the position pointed to by the stack pointer is decremented by 1 and becomes a termination node. Then coupled node indicator 220a is set in the coupled node indicator of the maximum value search, the value "0" is set in the node position, and the next maximum value search is executed. In other words, the next search start node becomes node 210b.

FIG. 28B(5) shows search path stack 310 and the index key to be extracted in the stage wherein maximum value search processing is executed using node 210b as the search start node. As a result of the maximum value search, the node 210b and node 211c are stored above the termination node in search path stack 310. Here, since the node 211d pointed to by coupled node indicator (221c+1) of node 211c is a leaf node, the index key "011010" of that node 211d is extracted and the position pointed to by the stack pointer is decremented by 1 and becomes node 210b. Then coupled node indicator 221c is set in the coupled node indicator of the maximum value search, the value "0" is set in the node position, and the next maximum value search is executed.

FIG. 28B(6) shows search path stack 310 and the index key to be extracted in the stage wherein maximum value search processing is executed setting "0" in the node position and coupled node indicator 221c in the coupled node indicator. As a result of the maximum value search, the node 210d is stored above node 210b in search path stack 310. Here, since the node 211e pointed to by coupled node indicator (220d+1) of node 210d is a leaf node, the index key "010011" of that node 211e is extracted and the position pointed to by the stack pointer is decremented by 1 and becomes node 210b. Then the coupled node indicator 220d of node 210d is set in the coupled node indicator of the maximum value search, the value "0" is set in the node position, and the next maximum value search is executed.

FIG. 28B(7) shows search path stack 310 and the index key to be extracted in the stage wherein maximum value search processing is executed setting "0" in the node position and coupled node indicator 220d in the coupled node indicator. Here, since the node 210e extracted from the array is a leaf node, the index key "010010" of that node 210e is extracted and the position pointed to by the stack pointer is decremented by 1 and becomes a termination node. Then the coupled node indicator 220b is set in the coupled node indicator of the maximum value search, the value "0" is set in the node position, and the next maximum value search is executed.

FIG. 28B(8) shows search path stack 310 and the index key to be extracted in the stage wherein maximum value search processing is executed setting "0" in the node position and coupled node indicator 220b in the coupled node indicator. Here, since the node 210c extracted from the array is a leaf node, the index key "000111" of that node 210c is extracted. Then in step S2808 shown in FIG. 28A, a determination is made that the node extracted from the search path stack 310 in the previous step S2805 is a termination node, and processing is terminated.

As can be understood from the above description, when the index key that is the minimum value is obtained during a maximum value search, the branch node immediately above the leaf node holding the index key that is the minimum value is extracted from the search path stack and next, since no new node is stored above the termination node, before proceeding to the next maximum value search, at step S2805 shown in FIG. 28A the termination node is extracted, and at step S2808 a determination is made that it is a termination node, and processing is terminated.

Figure 29A:
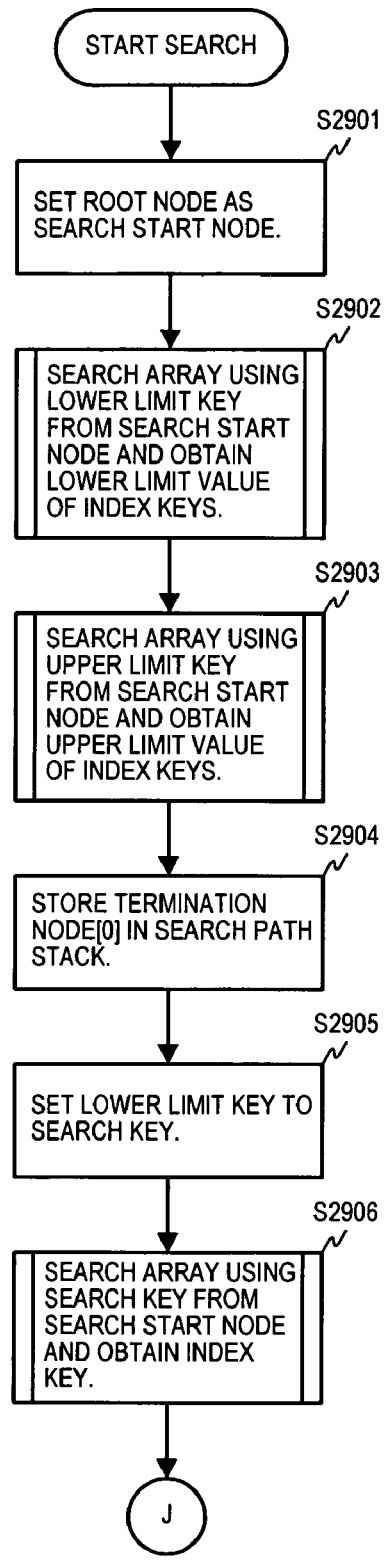
FIG. 29A is a flowchart describing the initialization processing for extraction in ascending order with the search range specified in accordance with an embodiment of this invention.
Figure 29B:
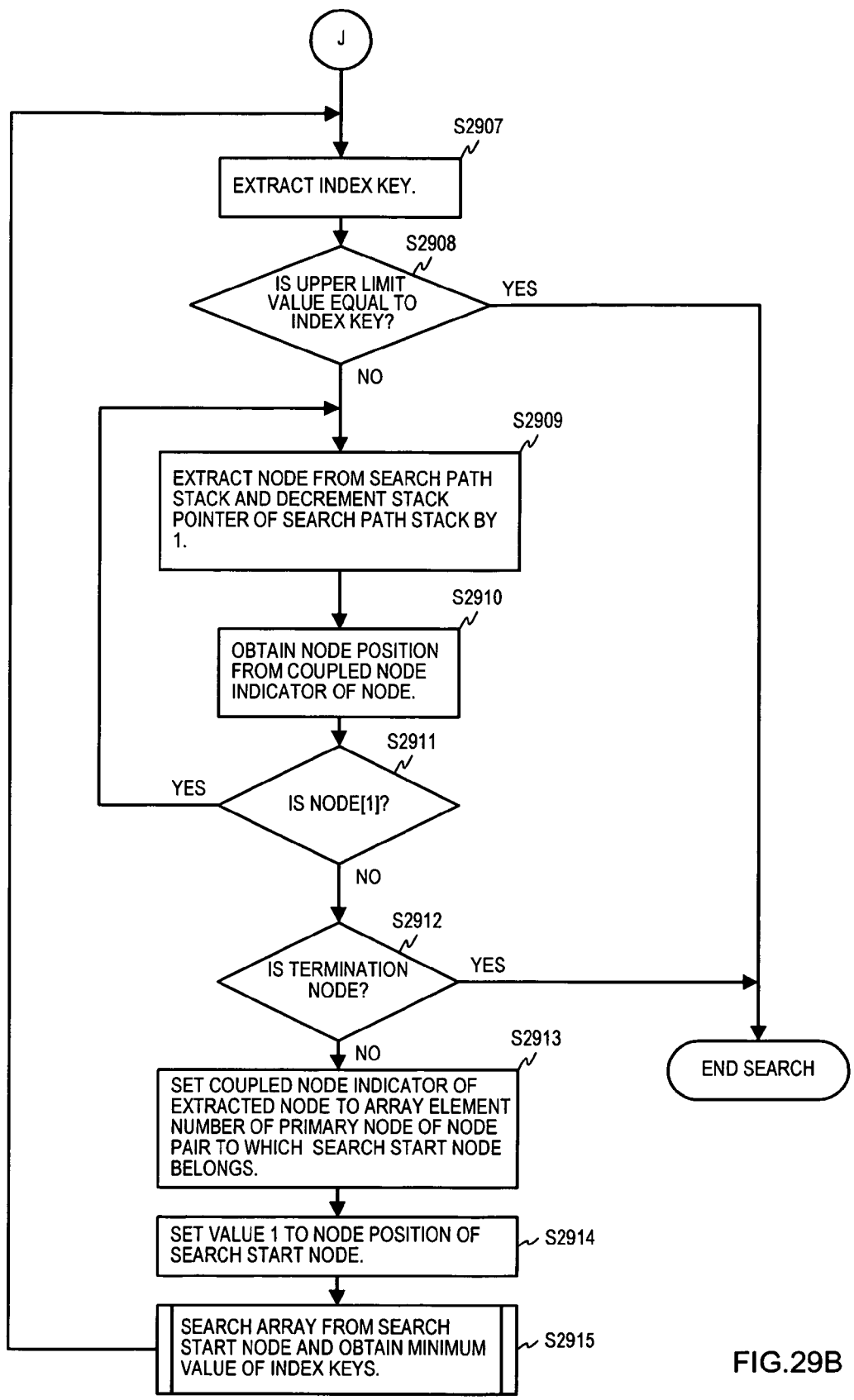
FIG. 29B is a flowchart describing the loop process for extraction in ascending sequence with a range specified.
Figure 29C:
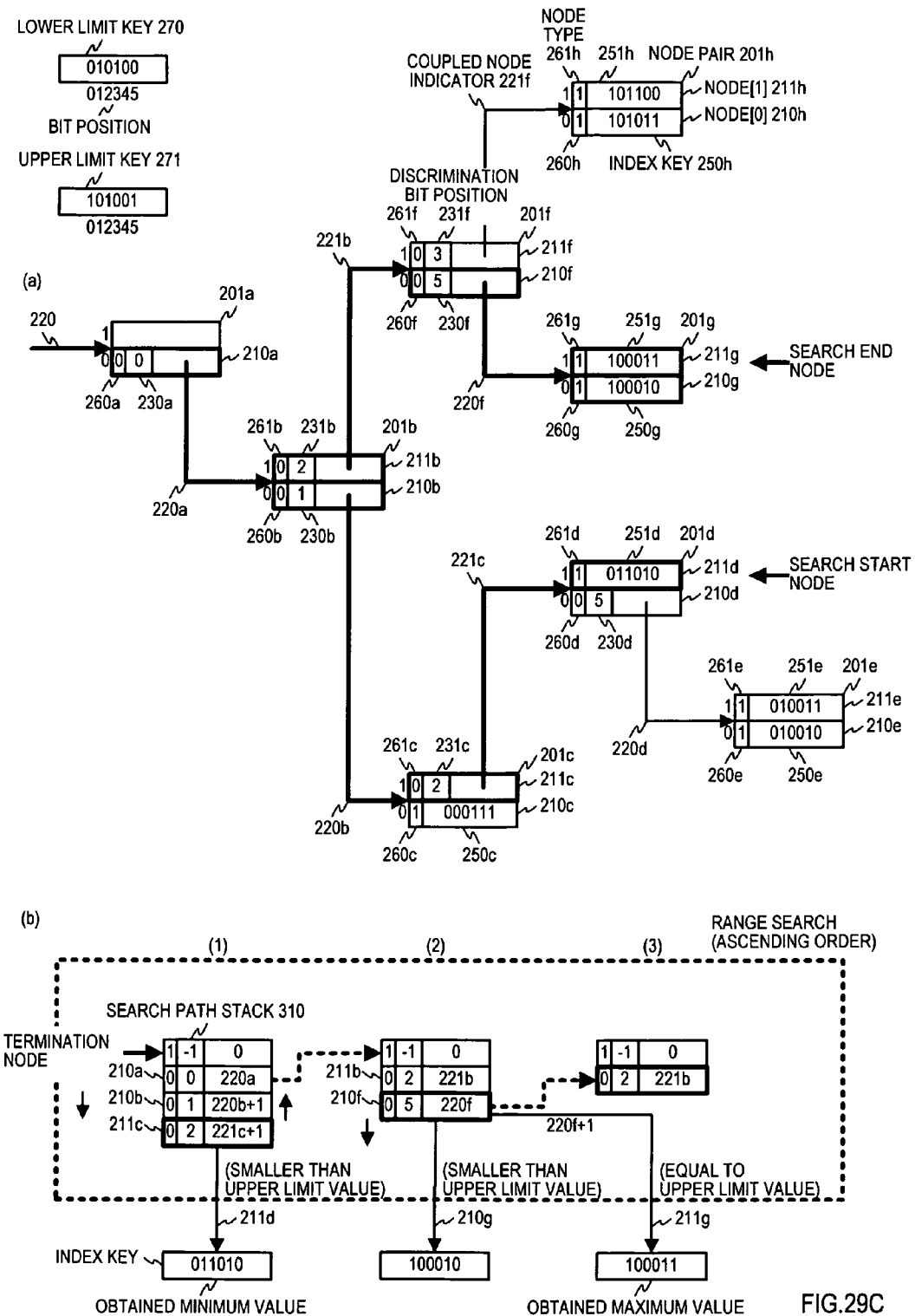
FIG. 29C is a drawing describing the extraction processing of keys in ascending order with the index key range specified.

Next, referencing FIG. 29A, FIG. 29B, and FIG. 29C, the range-specified ascending-order extraction processing to extract in ascending order, with a range specified, the index keys stored in a coupled node tree is described.

FIG. 29A is a flowchart describing the initialization processing of range-specified ascending-order extraction processing. The range for extracting index keys is assumed to be already specified by an upper limit key and a lower limit key.

As shown in the flowchart, at step S2901 the root node is set as the search start node. Next, at step S2902, the lower limit value is obtained from the lower limit key by the lower limit value search processing shown in FIG. 10A and FIG. 10B, and at step S2903 the upper limit value is obtained from the upper limit key by the upper limit value search processing shown in FIG. 11A and FIG. 11B.

Next, in step S2904, termination node [0] is stored in the search path stack and at step S2905 the lower limit value obtained in the above step S2902 is set as the search key, and processing proceeds to step S2906.

At step S2906, the array in which the coupled node tree is arranged is searched by the search processing shown in FIG. 4B, an index key is obtained, the initialization processing is terminated, and processing moves to step S2907 shown in FIG. 29B.

FIG. 29B is a flowchart describing the loop processing of range-specified ascending-order extraction processing. At step S2907, the index key that is the index key acquired in step S2906 or the index key that is the minimum value acquired in the step S2915 described later is extracted.

Next, at step S2908, a determination is made whether the upper limit value obtained in step S2903 and the index key extracted in step S2907 coincide, and if they coincide, since the extraction of index keys in ascending order up to the upper limit value is completed, processing is terminated.

If they do not coincide, next, at step S2909, the node pointed to by the stack pointer is extracted from the search path stack and the value of the stack pointer is decremented by 1. The status of the search path stack at the first execution of step S2909 is the status at the time the search of step S2906 is executed.

Next, at step S2910, the node position of the node extracted from the coupled node indicator of the extracted node is acquired.

Next, proceeding to step S2911, a determination is made whether the node position of the node acquired in step S2910 is the node [1] side. If it is node [1] side, processing returns to step S2909, and if it is node [0] side, processing proceeds to step S2912.

At step S2912, a determination is made whether the node extracted in step S2909 is a termination node. If that node is a termination node, since the extraction of index keys is completed, processing is terminated.

If the determination in step S2912 is "not a termination node", processing proceeds to step S2913, and the coupled node indicator of the node extracted in step S2909 is set as the array element number of the primary node of the node pair to which the search start node belongs.

Furthermore, at step S2914, the value "1" is set as the node position of the search start node, and processing proceeds to step S2915, wherein the minimum value search shown in FIG. 8B is executed, the minimum value of the index keys is acquired, and return is made to the processing in step S2907 to extract the index key that is the minimum value.

By repeating the loop processing of the above steps S2907 to S2915 until the determination in step S2908 or step S2912 is "yes", the index keys of the subtree with the search start node as its root node are extracted in ascending sequence within the range specified by the upper limit key and the lower limit key.

FIG. 29C is a drawing describing an example of the processing for extracting, within a specified range and in ascending order, the index keys stored in a coupled node tree as was described in the flow charts of FIG. 29A and FIG. 29B. FIG. 29C (a) shows the coupled node tree exemplified in FIG. 2B and the lower limit key "010100" and upper limit key "101001" which are stored in the search key setting area 270 and the second search key setting area 271, respectively. The sections (1) to (3) of FIG. 28C (b) show the status of the search path stack 310 and the extracted index keys at the various stages that execute the processing to extract index keys in ascending order.

Using the lower limit key "010100" the index key "011010" stored in node 211*d* is obtained as the lower limit value, and node 211*d* becomes the search start node for range-specified ascending-order extraction processing. Also, using the upper limit key "101001" the index key "100011" stored in node 211*g* is obtained as the upper limit value, and node 211*g* becomes the search ending node for range-specified ascending-order extraction processing.

Next, a search is performed from root node 210*a* using the above noted lower limit value as the search key and the index key "010100" is extracted as the search start node. This index key is the minimum value within the search range.

Section (1) of FIG. 29C (b) shows the extracted index key and the status of the nodes stored in search path stack 310 as a result of the search execution. In this case, a termination node [0], node 210*a*, node 210*b*, and node 211*c* are stored in search path stack 310, and the coupled node indicators of node 210*b* and node 211*c* have each had "1" added to them. Since the index key "010100" is smaller than the upper limit value "100011" the next loop processing for a minimum value search is executed.

Since the coupled node indicator 220*a* of node 210*a* at the stack pointer position pointed to by the solid line on the right side of search path stack 310 shown in section (1) of FIG. 29C (b) is the first node [0] side when search path stack 310 has been traced back, that coupled node indicator 220*a* is set as the array element number of the primary node 210*b* of the node pair to which the search start node of a minimum value search belongs, and the value "1" set in the node position of the search start node, and a minimum value search is performed. As shown by the dotted line arrow, the stack pointer points to a termination node [0].

Section (2) of FIG. 29C (b) shows search path stack 310 and the index key to be extracted in the stage after the above noted minimum value search processing has been executed. As a result of the minimum value search, the nodes 211*b* and 210*f* are stored above termination node [0] in search path stack 310. Then, since the node 210*g* pointed to by coupled node indicator 220*f* of node 210*f* is a leaf node, its index key, "100010", is extracted. Since this index key is also smaller than the upper limit value, once again loop processing is performed.

Section (3) of FIG. 29C shows search path stack 310 and the index key to be extracted in the stage wherein the coupled node indicator 220*f* has been set in the coupled node indicator, the value "1" has be set in the node position, and minimum value search processing has been executed. Here, since the node 211*g* extracted from the array as the result of the minimum value search is a leaf node, the index key "100011" of that node 211*g* is extracted. Since the extracted index key "100011" coincides with the upper limit value, processing is terminated. As shown in FIG. 29C (a) node 211*g* is the search ending node, and as shown section (3) of FIG. 29C (b), its index key, "100011", is the maximum value of the search range.

Figure 30A:
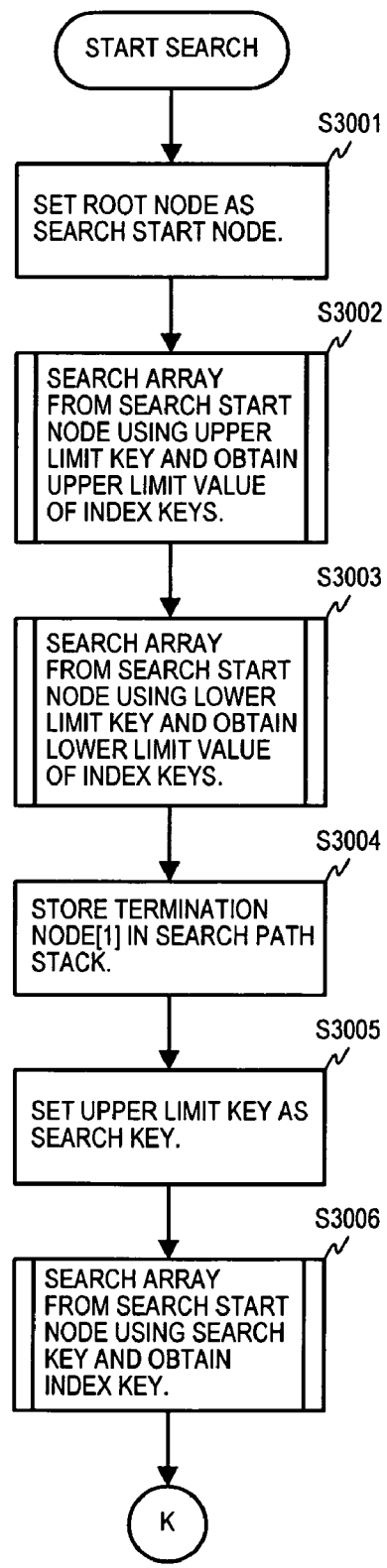
FIG. 30A is a flowchart of the initialization processing for extraction in descending order with the search range specified in accordance, with an embodiment of this invention.
Figure 30B:
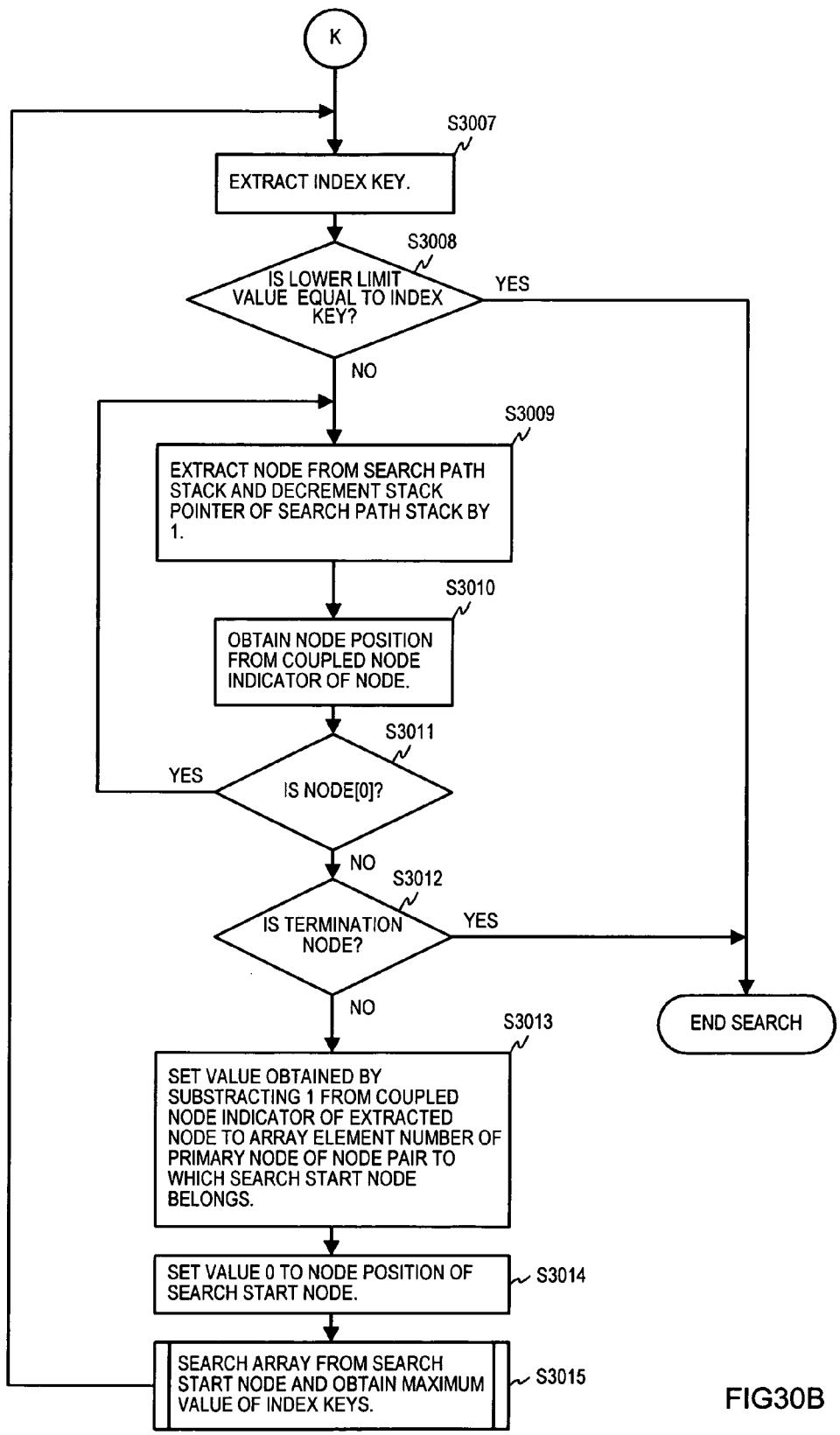
FIG. 30B is a flowchart describing the loop process for extraction in descending sequence with a range specified.
Figure 30C:
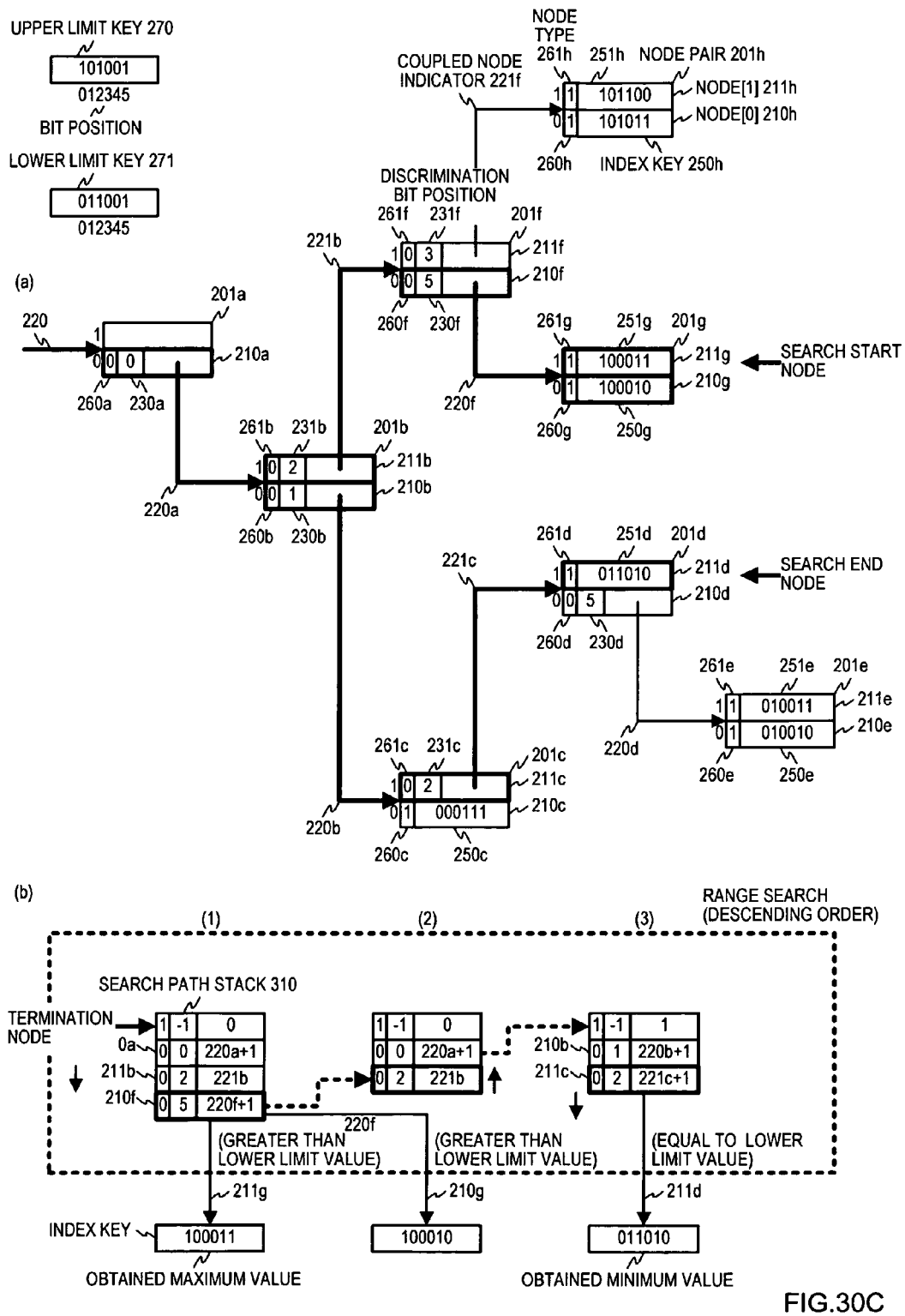
FIG. 30C is a drawing describing an example of the extraction processing in descending order with the index key range specified.

Next, referencing FIG. 30A, FIG. 30B, and FIG. 30C, the range-specified descending-order extraction processing to extract in descending order with a range specified the index keys stored in a coupled node tree is described. This range-specified descending-order extraction processing has as it were a mirror relation with range-specified ascending-order extraction processing, described previously referencing FIG. 29A to FIG. 29C, and corresponds to a process wherein the minimum value search is replaced by a maximum value search and the node position and upper and lower limits are reversed.

FIG. 30A is a flowchart describing the initialization processing of range-specified descending-order extraction processing. Just as for the previously described range-specified ascending-order extraction processing, the range for extracting index keys is assumed to be already specified by an upper limit key and a lower limit key.

As shown in the flowchart, at step S3001 the root node is set as the search start node. Next, at step S3002, the upper limit value is obtained from the upper limit key by the upper limit value search processing shown in FIG. 11A and FIG. 11B, and at step S3003 the lower limit value is obtained from the lower limit key by the lower limit value search processing shown in FIG. 10A and FIG. 10B.

Next, in step S3004, termination node [1] is stored in the search path stack and at step S3005 the upper limit value obtained in the above step S3002 is set as the search key, and processing proceeds to step S3006.

At step S3006, the array in which the coupled node tree is arranged is searched by the search processing shown in FIG. 4B, an index key is obtained, the initialization processing is terminated, and processing moves to step S3007 shown in FIG. 30B.

FIG. 30B is a flowchart describing the loop processing of range-specified descending-order extraction processing. At step S3007, the index key that is the index key acquired in step S3006 or the index key that is the maximum value acquired in the step S3015 described later is extracted.

Next, at step S3008, a determination is made whether the lower limit value obtained in step S3003 and the index key extracted in step S3007 are coincident, and if they are coincident, since the extraction of index keys in descending order down to the lower limit value is completed, processing terminated.

If they are not coincident, next, at step S3009, the node pointed to by the stack pointer is extracted from the search path stack and the value of the stack pointer is decremented by 1. The status of the search path stack at the first execution of step S3009 is the status at the time the search of step S3006 is executed.

Next, at step S3010, the node position of the node extracted from the coupled node indicator of the extracted node is acquired.

Next, proceeding to step S3011, a determination is made whether the node position acquired in step S3010 is node [0] side. If it is node [0] side, processing returns to step S3009, and if it is node [1] side, processing proceeds to step S3012.

At step S3012, a determination is made whether the node extracted in step S3009 is a termination node. If that node is a termination node, since the extraction of index keys is completed, processing is terminated.

If the determination in step S3012 is "not a termination node", processing proceeds to step S3013, and the coupled node indicator of the node extracted in step S2909 is decremented by 1 and set as the array element number of the primary node of the node pair to which the search start node belongs.

Furthermore, at step S3014, the value "1" is set as the node position of the search start node, and processing proceeds to step S3015, wherein the maximum value search shown in FIG. 9B is executed, the maximum value of the index keys is acquired, and return is made to the processing in step S3007 to extract the index key that is the maximum value.

By repeating the loop processing of the above steps S3007 to S3015 until the determination in step S3012 is "yes", the index keys within the range specified by the upper limit key and lower limit key are extracted in descending order.

FIG. 30C is a drawing describing the example of extracting keys in descending order with a range specified, as described in the flowcharts of FIG. 30A and FIG. 30B. FIG. 30C (a) shows the coupled node tree illustrated in FIG. 2B and the upper limit key "101001" and lower limit key "011001" set in the search key setting area 270 and the second search key setting area 271, respectively. Sections (1) to (3) of FIG. 30C (b) show the status of the search path stack 310 and the index key to be extracted at the various stages that execute the processing to extract index keys in descending order.

Using the upper limit key "101001" the index key "100011" stored in node 211g is obtained as the upper limit value, node 211g is made the search start node for range-specified descending-order extraction processing. Also, using the lower limit key "011001" the index key "011010" stored in node 211d is obtained as the lower limit value, and node 211d is made the search ending node for range-specified descending-order extraction processing.

Next, a search is performed from the root node 210a with the above noted upper limit value as the search key and the index key "100011" of the search start node is extracted. This index key is the maximum value of the search range.

Section (1) of FIG. 30C. (b) shows this extracted key and the status of the nodes stored in search path stack 310 as a result of the search execution. In this case, a termination node [0], node 210a, node 211b, and node 210f are stored in search path stack 310, and the coupled node indicators of node 210a and node 210f have been added "1" to them respectively. Since the index key "100011" is larger than the lower limit value "011001" the next loop processing for a maximum value search is executed.

Since, from the coupled node indicator 220f+1 of node 210f stored in search path stack 310 shown in section (1) of FIG. 30C (b), a determination is made that the node position is a node [1] side, the value obtained by decrementing by 1 that coupled node indicator 220f+1 is set as the array element number of the primary node 210g of the node pair 201g to which the search start node of the maximum value search belongs, and the value "0" is set in the node position of the search start node, and a maximum value search is performed.

Section (2) of FIG. 30C (b) shows search path stack 310 and the index key to be extracted in the stage after the above noted maximum value search processing has been executed. Then, since the node 210g pointed to by coupled node indicator 220f of node 210f is a leaf node, its index key, "100010", is extracted. Since this index key is also larger than the lower limit value, once again loop processing is performed. Then, as shown by the solid line arrow on the right side of search path stack 310, the stack pointer points to node 210a, and the value obtained by decrementing by 1 that coupled node indicator 220a+1 is set as the array element number of the primary node 210b of the node pair 201b to which the search start node of the next maximum value search belongs, and the value "0" is set in the node position of the search start node, and a maximum value search is performed.

Section (3) of FIG. 30C (b) shows search path stack 310 and the index key to be extracted in the stage after the maximum value search processing has been executed with coupled node indicator 220a set in the coupled node indicator and the value "0" set in the node position. When the maximum value search is started, the stack pointer points to termination node [1], as shown by the dotted-line arrow on the right side of search path stack 310, and the maximum value search results in node 210b and node 211c being stored above that termination node. Since node 211d pointed to by the coupled node indicator 221c+1 of node 211c is a leaf node, the index key "011010" of this node 211d is extracted. Since the extracted index key "011010" coincides with the lower limit value, processing is terminated. As shown in FIG. 30C (a) node 211d is the search ending node, and, as shown in section (3) of FIG. 30C (b), its index key "011010" is the minimum value of the search range.

Next, prefix match search processing of index keys stored in a coupled node tree is described. In the prefix match search of a preferred embodiment of this invention, a prefix match key that has higher level significant bits is assumed to have been already specified.

Figure 31A:
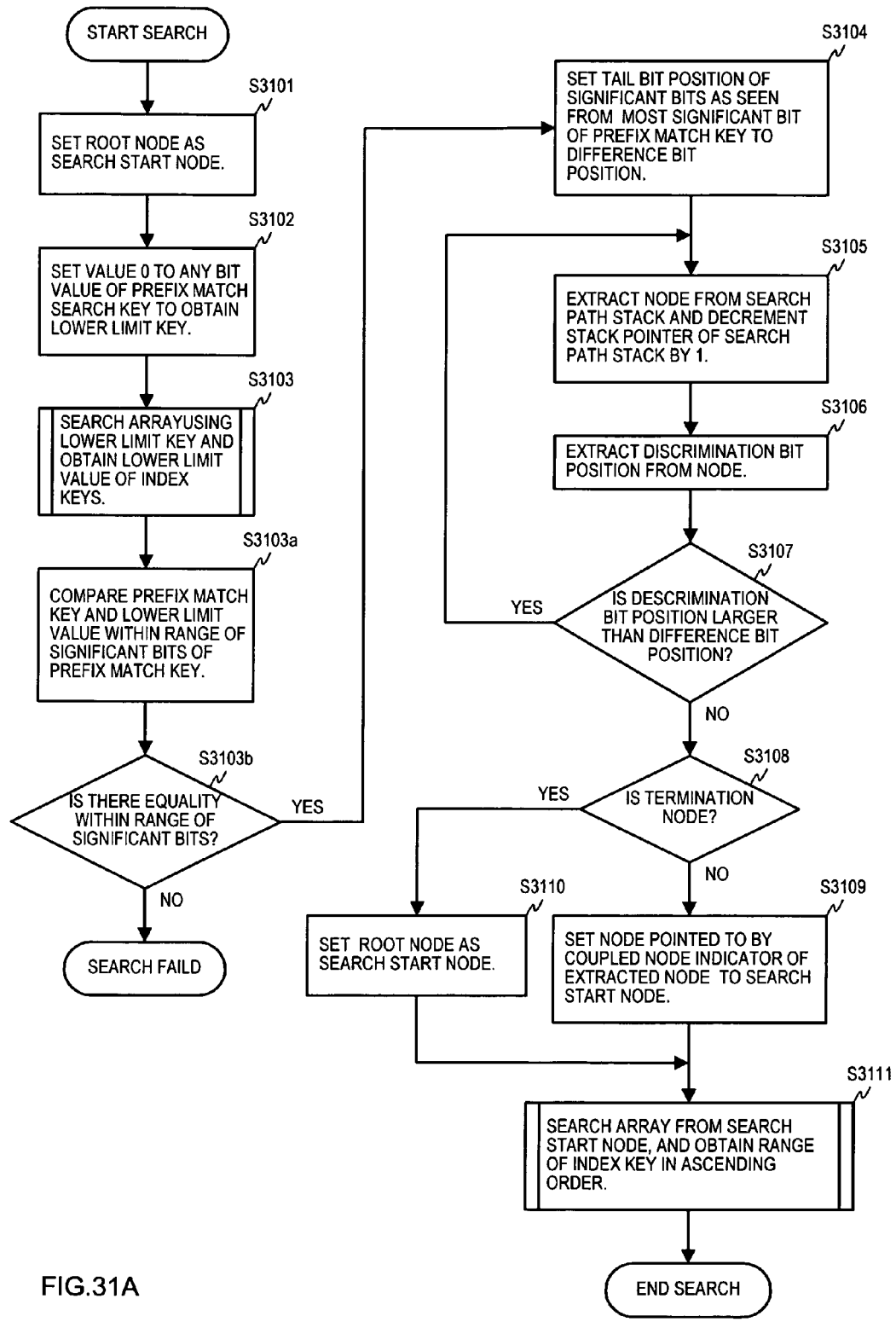
FIG. 31A is a drawing describing the processing flow for a prefix match in accordance with an embodiment of this invention.

FIG. 31A is a drawing describing the processing flow in a prefix match search in a preferred embodiment of this invention.

As shown in the drawing, at step S3101, the root node is set in the search start node, and at step S3102, a bit string key obtained by replacing the don't-care bits of the prefix match key with "0" is set as the lower limit key, and in step S3103, the lower limit value search shown in FIG. 10A and FIG. 10B is performed based on the settings of step S3101 and step S3102, and a lower limit value of the index keys is acquired.

Next, proceeding to step S3103a, the prefix match key and the lower limit value acquired in step S3103 are compared within the range of the significant bits of the prefix match key, and at step S3103b, a determination is made whether there is equality within the range of the significant bits. If there is equality, processing proceeds to step S3104, and if there is not equality, the search fails because no index keys exist to be extracted for the specified prefix match key, and processing is terminated. The determination of step S3103b above guarantees that the lower limit value, at least, is a "hit" in the prefix match search.

In step S3104, the tail bit position of the significant bits, as seen from the highest level 0th bit of the prefix match key, is set in an unillustrated difference bit position setting area.

Next, proceeding to step S3105, a node is extracted from the search path stack, and stack pointer of the search path stack is decremented by 1.

Next, at step S3106, the discrimination bit position of the node extracted in step S3105 is extracted, and processing proceeds to step S3107. At step S3107, a determination is made whether the discrimination bit position extracted in step S3106 larger than the value of the difference bit position set in step S3104. If the discrimination bit position is larger than the difference bit position, processing returns to step S3105, and if it is not larger, processing proceeds to step S3108.

In step S3108, a determination is made whether the node extracted in step S3105 is a termination node. If it is not a termination node, processing proceeds to step S3109, and if it is a termination node, processing proceeds to step S3110.

In step S3109, the node pointed to by the coupled node indicator of the node extracted in step S3105 is set in the search start node, and processing proceeds to step S3111, while in step S3110, the root node is set in the search start node, and processing proceeds to step S3111.

The processing of steps S3105 to S3110 described above is a processing wherein the root node of the subtree including all the leaf nodes holding index keys that produce a "hit" in the prefix match search and not including leaf nodes holding index keys that do not produce a "hit" is made the search start node for the search in step S3111.

The above cited lower limit value is the minimum value of the above cited subtree, and it is clear that the root node of that subtree is stored in the search path stack by the processing that obtains a lower limit value in step S3103

Then, when a branch node stored in the search path stack is read out and its discrimination bit position is extracted and compared with the difference bit position set in step S3104, if the discrimination bit position is larger than the difference bit position, all index keys stored in lower level leaf nodes will produce hits in the prefix match search but there is a possibility that leaf nodes at lower levels of a higher level branch node may have keys that produce a hit in a prefix match search.

At that point, when a branch node is again read out and its discrimination bit position is extracted and compared with the difference bit position, if the discrimination bit position coincides with the difference bit position, the coupled node indicator of that branch node points to the node whose node position is the side of a node pair which has the leaf node that includes the above cited lower limit value, and it can be easily understood that the subtree with that node as a root node includes all the leaf nodes that hold index keys that produce a hit in a prefix match search and does not include leaf nodes that hold index keys that do not produce a hit.

When no branch node has a discrimination bit position whose value coincides with the difference bit position and a branch node whose the discrimination bit position is smaller than the difference bit position is extracted, that coupled node indicator points to a node whose node position is the side of a node pair which has the leaf node that includes the above cited lower limit value, and, since the discrimination bit position of that node is larger than the difference bit position, all the index keys stored in leaf nodes at a lower level, as was mentioned above, produce a hit in a prefix match search.

Conversely, from the definition of a discrimination bit position, the index keys stored in a leaf node that is in a node side that pairs with the node pointed to by coupled node indicator of the branch node whose discrimination bit position extracted above is smaller than the difference bit position cannot produce a hit in a prefix match search.

From the above description, it can be understood that the node immediately below the branch node whose discrimination bit position is equal to or less than the difference bit position set in step S3104, in other words, the node pointed to by the coupled node indicator, is the root node of a subtree that includes all the leaf nodes that hold index keys that produce a hit in a prefix match search and does not include leaf nodes that hold index keys that do not produce a hit.

In step S3111, the processing that extracts index keys in ascending order shown in FIG. 27A searches the array from the search start node and extracts the index keys in ascending order.

The above processing extracts all the index keys of the index keys stored in the coupled node tree, whose bit value matches the bit value of the prefix match key within the range of the significant bits.

Figure 31B:
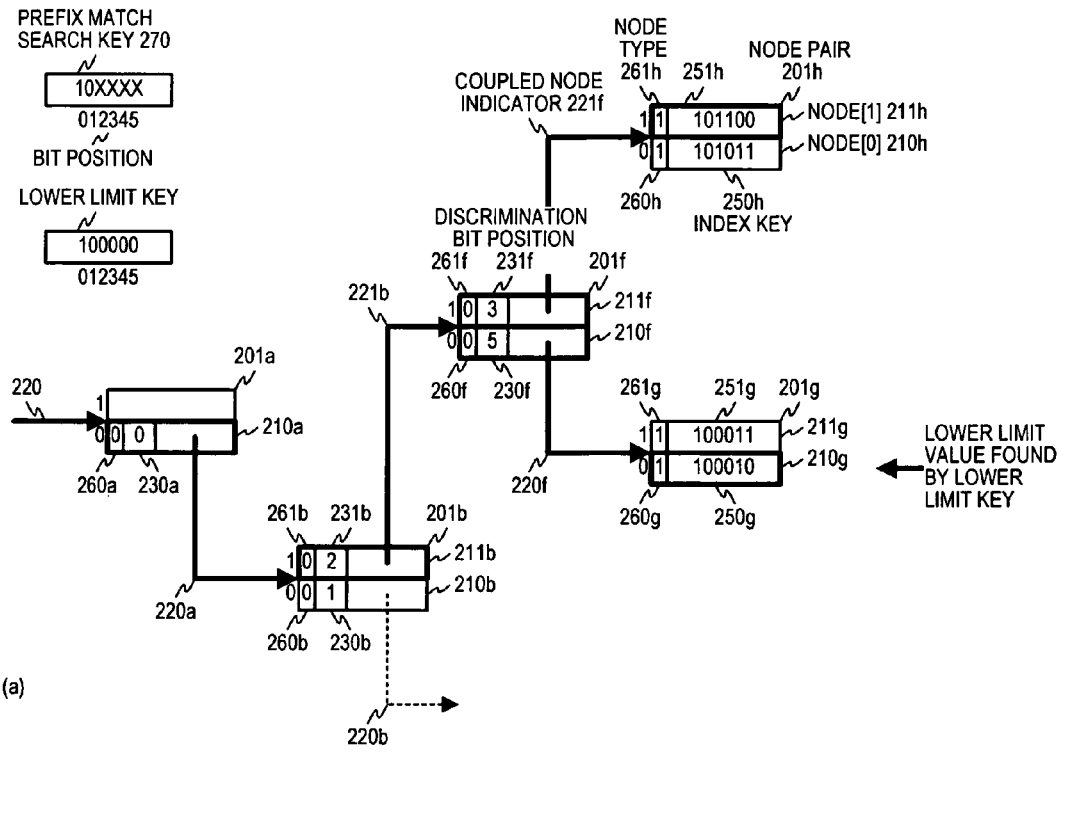
FIG. 31B is a drawing describing an example of a search in a prefix match search.
Figure 31B:
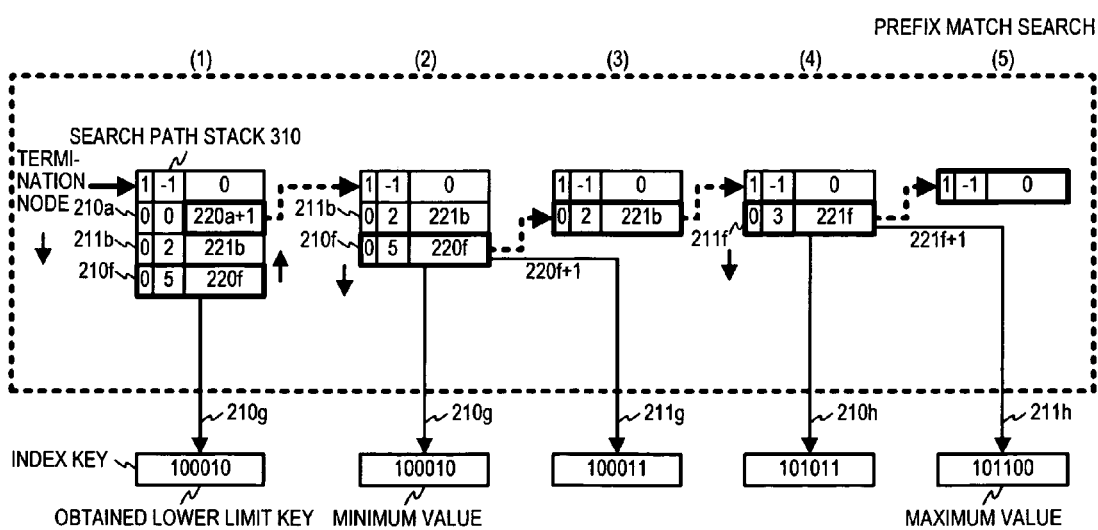

FIG. 31B is a drawing describing an exemplary search of the prefix match search described in the flowchart of FIG. 31A. FIG. 31B (a) shows, of the coupled node tree illustrated in FIG. 2B, the root node 210a and the subtree of the levels of nodes 211b and below, related to an exemplary embodiment of this invention, and the search key setting area 270 and second search key setting area 271. The prefix match key "10xxxx" is set in search key setting area 270, and the lower limit key "100000" obtained by replacing the don't-care bits "x" of the prefix match key with "0" is set in the second search key setting area 271.

In the distinction between the significant bits and don't-care bits of the prefix match key, clearly, besides specifying the number of significant bits, the distinction can also be enabled by a bit affixed to each bit, that distinguishes whether a given bit is a significant bit or a don't-care bit.

FIG. 31B (b) shows the status transitions (1) to (5) of search path stack 310 and the extracted index keys caused by extracting index keys in ascending order after the lower limit value search.

Section (1) of FIG. 31B (b) shows search path stack 310 and the index key to be extracted in the stage after the lower limit value search of step S3103 shown in FIG. 31A. The position pointed to by the stack pointer has changed from the termination node to node 210f. Here, since the node pointed to by the coupled node indicator 220f of node 210f is the leaf node 210g, the index key "100010" of this node 210g is extracted as the lower limit value.

Although it is not illustrated, the bit position "1" that indicates the end of the significant bits of the prefix match key 10xxxx" is set as the difference bit position.

Then the discrimination bit positions of the nodes stored in search path stack 310 from node 210f onward are successively compared with the difference bit position, node 210a is extracted as the node (parent mode) immediately above the search start node, and its coupled node indicator 220a+1 is set as the array element number of the search start node 211b.

Below, the processing to extract index keys in ascending order shown in step S3111 of FIG. 31A, that is, the process of repeating a minimum value search is executed. Section (2) of FIG. 31B (b) shows search path stack 310 and the index key to be extracted in the stage after the minimum value search processing has been executed with node 211b as the search start node. As a result of the minimum value search, nodes 211b and 210f are stored above the termination node [0] in search path stack 310. Here, since the node 210g pointed to by the coupled node indicator 220f of node 210f is a leaf node, the index key "100010" of this node 210g is again extracted as the minimum value, and the position pointed to by the stack pointer is decremented by 1 and points to node 211b. Then, the coupled node indicator 220f is set in the coupled node indicator for a minimum value search, the value "1" is set in the node position, and the next minimum value search is executed.

Section (3) of FIG. 31B (b) shows search path stack 310 and the index key to be extracted in the stage after the minimum value search processing has been executed with coupled node indicator 220f set in the coupled node indicator and the value "1" set in the node position. Here, since the node 211g extracted from the array is a leaf node, the index key "100011" of this node 211g is extracted, and the position pointed to by the stack pointer is decremented by 1 and points to the termination node [0]. Then, the coupled node indicator 221b is set in the coupled node indicator for a minimum value search, the value "1" is set in the node position, and the next minimum value search is executed.

Section (4) of FIG. 31B (b) shows search path stack 310 and the index key to be extracted in the stage after the minimum value search processing has been executed with coupled node indicator 221b set in the coupled node indicator and the value "1" set in the node position. As a result of the minimum value search, the node 211f is stored above termination node [0] in search path stack 310. Here, since the node 210h pointed to by the coupled node indicator 221f of node 211f is a leaf node, the index key "101011" of this node 210h is extracted, and the position pointed to by the stack pointer is decremented by 1 and points to the termination node [0]. Then, the coupled node indicator 221f is set in the coupled node indicator for a minimum value search, the value "1" is set in the node position, and the next minimum value search is executed.

Section (5) of FIG. 31B (b) shows search path stack 310 and the index key to be extracted in the stage after the minimum value search processing has been executed with coupled node indicator 221f set in the coupled node indicator and the value "1" set in the node position. Here, since the node 211h extracted from the array is a leaf node, the index key "101100" of this node 211h is extracted. Then, at step S2708 shown in FIG. 27A, a determination made that the node extracted from search path stack 310 in the preceding step S2705 is a termination node, and processing is terminated.

It is clear that it is possible to embody the various search processing, split/conjoin processing and its equivalents according to the preferred embodiments of this invention described above by a program that a computer is caused to execute to enable the various search methods, split method, and conjoin method of this invention on a coupled node tree.

Therefore, the above-noted programs, and a computer-readable storage medium into which the programs are stored are encompassed by the embodiments of the present invention. Additionally, the data structure of the coupled node tree according to the present invention is encompassed by the embodiments of the present invention.

What is claimed is:

1. A bit string searching apparatus for searching for index keys based on a tree data structure that holds index keys composed of bit strings that are the object of searches by means of a search key composed of a bit string, comprising:
    a coupled node tree having a root node as the starting point of the tree and node pairs which are configurational elements of the tree and which are two nodes, a primary node and a non-primary node, arranged in adjacent areas of storage,
    wherein
    the nodes have an area that holds the node type, which indicates whether the node is a branch node or a leaf node, and
    the branch node having, in addition to the node type, an area that holds a discrimination bit position of the search key and an area holding a coupled node indicator that is position information indicating the position of a primary node of a node pair that is a link target but not having an area holding an index key composed of a bit string that is an object of searches,
    the leaf node having, in addition to the node type, an area holding the index key composed of a bit string that is the object of searches but not having an area that holds a discrimination bit position of the search key nor an area holding the coupled node indicator;
    a search start node read-out means obtaining the information indicating a position of a search start node which is an arbitrary node of the coupled node tree and reading out the search start node by means of the information indicating the position of the search start node;
    a node type determination means reading out the node type from the area that holds the node type of the node and determining whether the node type indicates a leaf node or a branch node;
    an index key read-out means reading out the index key from the area in the leaf node holding the index key;
    a link means reading out the discrimination bit position and the coupled node indicator from the area in the branch node holding the discrimination bit position and from the area holding the coupled node indicator respectively, and obtaining information indicating the node position of one of the nodes of a node pair by a calculation with the bit value in the search key at the discrimination bit position read out and the coupled node indicator, and, from a storage area indicated by the obtained information indicating the node position, reading out the node stored in the storage area as the link target node; and
    wherein
    the node type determination means makes a determination of the node type of the search start node read out by the search start node read-out means, and
    if the node type indicates a leaf node, the index key read-out means reads out the index key from the leaf node, and
    if the node type indicates a branch node, the processes of the link means reading out the link target node and the node type determination means determining the node type of the link target node read out are repeated until the node type indicates a leaf node, and the index key read-out means reads out the index key from the leaf node, and
    an index key stored in the leaf node is obtained as a search result key of an arbitrary subtree of the coupled node tree by means of the search key, the subtree having the search start node as its root node, and
    the branch nodes on the link path from the search start node to the leaf node are successively saved in a stack.

2. A bit string search apparatus according to claim 1, wherein
    the coupled node tree is stored in an array and the coupled node indicator is an array element number of an array element in which is stored a primary node corresponding to the coupled node indicator, and a termination node with a discrimination bit position value of less than 0 is initially stored in the stack as a virtual branch node.

3. A bit string search apparatus according to claim 2, further comprising
    a coupled node indicator setting area for setting a coupled node indicator and
    a node position setting area for setting the bit value of a node position expressing whether a node is stored in the primary node side of the related node pair or in the non-primary node side, and wherein
    the coupled node indicator setting area is initialized with the array element number of the array element holding the primary node of the node pair to which the search start node belongs, and
    the node position setting area is initialized with the bit value expressing the node position of the search start node, and
    whenever a branch node links to the next node the bit value of the search key at the discrimination bit position of the branch node is set in the node position setting area while the coupled node indicator of the branch node is set in the coupled node indicator setting area, and
    the node pair including the array element pointed to by the coupled node indicator that is set in the coupled node indicator setting area is read out, and
    the node in the node pair with the node position set in the node position setting area is made the link target.

4. A bit string search apparatus according to claim 3, wherein,
    when a branch node of a link source is stored in the stack, the bit value set in the node position setting area is added to the coupled node indicator of the branch node.

5. A bit string search method wherein the bit string search apparatus according to claim 1 searches for index keys based on the coupled node tree data structure by means of a search key composed of a bit string, comprising:
    a search start node read-out step obtaining the information indicating a position of a search start node which is an arbitrary node of the coupled node tree and reading out the search start node by means of the information indicating the position of the search start node;

a node type determination step reading out the node type from the area that holds the node type of the node and determining whether the node type indicates a leaf node or a branch node;

an index key read-out step reading out the index key from the area in the leaf node holding the index key;

a link step reading out the discrimination bit position and the coupled node indicator from the area in the branch node holding the discrimination bit position and from the area holding the coupled node indicator respectively, and obtaining information indicating the node position of one of the nodes of a node pair by a calculation with the bit value in the search key at the discrimination bit position read out and the coupled node indicator, and, from a storage area indicated by the obtained information indicating the node position, reading out the node stored in the storage area as the link target node; and wherein making, by the node type determination step, a determination of the node type of the search start node read out by the search start node read-out step, and if the node type indicates a leaf node, reading out, by the index key read-out step, the index key from the leaf node, and if the node type indicates a branch node, reading out, by the link step, the link target node and the determination of the node type, by the node type determination step, of the link target node read out are repeated until the node type indicates a leaf node, and reading out, by the index key read-out step, the index key from the leaf node, an index key stored in the leaf node is obtained as a search result key of an arbitrary subtree of the coupled node tree by means of the search key, the subtree having the search start node as its root node, saving successively in a stack the branch nodes on the link path from the search start node to the leaf node.

6. A bit string search method according to claim 5, wherein the coupled node tree is stored in an array and the coupled node indicator is an array element number of an array element in which is stored a primary node corresponding to the coupled node indicator, and a termination node with a discrimination bit position value of less than 0 is initially stored in the stack as a virtual branch node.

7. A bit string search method according to claim 6, wherein a coupled node indicator setting area is prepared for setting a coupled node indicator and a node position setting area is prepared for setting the bit value of a node position expressing whether a node is stored in the primary node side of the related node pair or in the non-primary node side, and the coupled node indicator setting area is initialized with the array element number of the array element holding the primary node of the node pair to which the search start node belongs, and the node position setting area is initialized with the bit value expressing the node position of the search start node, and whenever a branch node links to the next node the bit value of the search key at the discrimination bit position of the branch node is set in the node position setting area while the coupled node indicator of the branch node is set in the coupled node indicator setting area, and the node pair including the array element pointed to by the coupled node indicator that is set in the coupled node indicator setting area is read out, and the node in the node pair with the node position set in the node position setting area is made the link target.

8. A bit string search method according to claim 7, wherein when a branch node of a link source is stored in the stack, the bit value set in the node position setting area is added to the coupled node indicator of the branch node.

9. A bit string search method comprising:

a lower limit key acquiring step that acquires a lower limit key specifying a lower limit of the search range;

a search result key acquiring step that performs the bit string search method according to claim 7, using the lower limit key as the search key and the root node as the search start node, so as to obtain the search result key;

a determination step that determines whether the search result key is equal to or larger than the lower limit key;

a node extracting step that successively extracts nodes stored in the stack until the node position of the node pointed to by the coupled node indicator of the extracted node becomes that of a primary node side and obtains the node whose coupled node indicator points to the node whose node position is that of the primary node side;

a minimum value search initializing step that sets the coupled node indicator of the obtained node as the array element number of the array element holding the primary node of the node pair to which the search start node belongs while setting into the node position setting area as the node position, the value expressing that a node is the non-primary node side;

a minimum value search step that acquires as a search result key a minimum value of the index keys, based on the settings of the minimum value search initializing step, by means of a bit string search method that performs a step of linking to only a primary node of the node pair from the search start node until a leaf node is reached and an index key stored in the leaf node is obtained as the search result key, while saving successively in a stack the branch nodes on the link path from the search start node to the leaf node;

and wherein when the determination is made in a first time determination of the determination step that the search result key coincides with the lower limit key, the search result key is set as the lower limit value corresponding to the specified lower limit key, and when the determination is made that the search result key is smaller than the lower limit key, the determination step, the node extracting step, the minimum value search initializing step, and the minimum value search step are repeated until a determination is made in the determination step that the search result key is larger than the lower limit key, and the search result key determined to be larger than the lower limit key is set as the lower limit value corresponding to the specified lower limit key.

10. A computer-readable storage medium storing a program that a computer is caused to execute, for performing the bit string search method according to claim 9.

11. A bit string search method comprising:

an upper limit key acquiring step that acquires an upper limit key specifying an upper limit of the search range;

a search result key acquiring step that performs the bit string search method according to claim 7, using the upper limit key as the search key and the root node as the search start node, so as to obtain the search result key;

a determination step that determines whether the search result key is equal to or smaller than the upper limit key;

a node extracting step that successively extracts nodes stored in the stack until the node position of the node pointed to by the coupled node indicator of the extracted node becomes not that of a primary node side and obtains the node whose coupled node indicator points to the node whose node position is not that of the primary node side;

a maximum value search initializing step that sets a value decremented by the value expressing that a node is not the primary node side from the coupled node indicator of the obtained node as the array element number of the array element holding the primary node of the node pair to which the search start node belongs while setting into the node position setting area as the node position, the value expressing that a node is the primary node side;

a maximum value search step that acquires as a search result key the maximum value of the index keys, based on the settings of the maximum value search initializing step, by means of a bit string search method that performs a step of linking to only a non-primary node paired with a primary node of the two nodes forming the node pair from the search start node until a leaf node is reached, while saving successively in a stack the branch nodes on the link path from the search start node to the leaf node; and wherein when the determination is made in a first time determination of the determination step that the search result key coincides with the upper limit key, the search result key is set as the upper limit value corresponding to the specified upper limit key, and when the determination is made that the search result key is larger than the upper limit key, the determination step, the node extracting step, the maximum value search initializing step, and the maximum value search step are repeated until a determination is made in the determination step that the search result key is smaller than the upper limit key, and the search result key determined to be smaller than the upper limit key is set as the upper limit value corresponding to the specified upper limit key.

12. A computer-readable storage medium storing a program that a computer is caused to execute, for performing the bit string search method according to claim 11.

13. A bit string search method for searching a coupled node tree which is used in a bit string search and comprises a root node and a node pair, the node pair being a branch node and a leaf node, or a pair of branch nodes, or a pair of leaf nodes located in adjacent storage areas, wherein the root node is a node that expresses a starting point of the tree and which is a leaf node when there is one node in the tree and a branch node when there are two or more nodes in the tree, the branch node includes a discrimination bit position for a search key with which a bit string search is performed and position information indicating a position of a primary node, which is one node of a node pair of a link target, and the leaf node includes an index key that is a bit string that is the target of a search, and enabling by repeating linkage, at the branch node, to a primary node or a node at a position in a memory area adjacent thereto of a node pair of the link target from an arbitrary node of the tree as a search start node in accordance with a bit value of the search key at the discrimination bit position included in the branch node, until the leaf node is reached, an index key stored in the leaf node to be made a search result key, which is a search result using the search key of an arbitrary subtree having the search start node as its root node, comprising:

an initialization step that acquires an upper limit key specifying an upper limit of a search range and a lower limit key specifying a lower limit of a search range while making the root node into the search start node;

a lower limit value acquiring step that acquires a lower limit value that is a minimum value in index keys equal to or larger than the lower limit key;

an upper limit value acquiring step that acquires an upper limit value that is a maximum value in index keys equal to or smaller than the upper limit key;

a search result key acquiring step that extracts a search result key using the lower limit value as the search key in accordance with the bit string search method according to claim 7;

a determination step that determines whether the search result key coincides with the upper limit value;

a node extracting step that successively extracts nodes stored in the stack until the node position of the node pointed to by the coupled node indicator of the extracted node becomes that of a primary node side and obtains the node whose coupled node indicator points to the node whose node position is that of the primary node side;

a minimum value search initializing step that sets the coupled node indicator of the obtained node as the array element number of the array element holding the primary node of the node pair to which the search start node belongs while setting into the node position setting area as the node position, the value expressing that a node is not the primary node side;

a minimum value search step that acquires as a search result key a minimum value of the index keys, based on the settings of the minimum value search initializing step, by means of a bit string search method that performs a step of linking to only a primary node of the node pair from the search start node until a leaf node is reached and an index key stored in the leaf node is obtained as the search result key, while saving successively in a stack the branch nodes on the link path from the search start node to the leaf node; and wherein by repeating the determination step, the node extracting step, the minimum value search initializing step, and the minimum value search step until a determination is made in the determination step that the search result key coincides with the upper limit value, the index keys stored in the coupled node tree within the range specified by the lower limit key and the upper limit key are extracted in ascending order.

14. A computer-readable storage medium storing a program that a computer is caused to execute, for performing the bit string search method according to claim 13.

15. A bit string search method for searching a coupled node tree which is used in a bit string search and comprises a root node and a node pair, the node pair being a branch node and a leaf node, or a pair of branch nodes, or a pair of leaf nodes located in adjacent storage areas, wherein the root node is a node that expresses a starting point of the tree and which is a leaf node when there is one node in the tree and a branch node when there are two or more nodes in the tree, the branch node includes a discrimination bit position for a search key with which a bit string search is performed and position information indicating a position of a primary node, which is one node of a node pair of a link target, and the leaf node includes an index key that is a bit string that is the target of a search, and enabling by repeating linkage, at the branch node, to a primary node or a node at a position in a memory area adjacent thereto of a node pair of the link target from an arbitrary node of the tree as a search start node in accordance with a bit value of the search key at the discrimination bit position included in the branch node, until the leaf node is reached, an index key stored in the leaf node to be made a search result key, which is a search result using the search key of an arbitrary subtree having the search start node as its root node;

an initialization step that acquires an upper limit key specifying an upper limit of a search range and a lower limit key specifying a lower limit of a search range while making the root node into the search start node, comprising:

a lower limit value acquiring step that acquires a lower limit value that is a minimum value in index keys equal to or larger than the lower limit key;

an upper limit value acquiring step that acquires an upper limit value that is a maximum value in index keys equal to or smaller than the upper limit key;

a search result key acquiring step that extracts a search result key using the lower limit value as the search key in accordance with the bit string search method according to claim 7;

a determination step that determines whether the search result key coincides with the lower limit value;

a node extracting step that successively extracts nodes stored in the stack until the node position of the node pointed to by the coupled node indicator of the extracted node becomes not that of a primary node side and obtains the node whose coupled node indicator points to the node whose node position of the node is not that of the primary node side;

a maximum value search initializing step that sets a value decremented by the value expressing that a node is not the primary node side from the coupled node indicator of the obtained node as the array element number of the array element holding the primary node of the node pair to which the search start node belongs while setting into the node position setting area as the node position, the value expressing that a node is the primary node side; and a maximum value search step that acquires as a search result key the maximum value of the index keys, based on the settings of the maximum value search initializing step, by means of a bit string search method that performs a step of linking to only a non-primary node paired with a primary node of the two nodes forming the node pair from the search start node until a leaf node is reached, while saving successively in a stack the branch nodes on the link path from the search start node to the leaf node; and wherein by repeating the determination step, the node extracting step, the maximum value search initializing step, and the maximum value search step until a determination is made in the determination step that the search result key coincides with the lower limit value, the index keys stored in the coupled node tree within the range specified by the upper limit key and the lower limit key are extracted in descending order.

16. A computer-readable storage medium storing a program that a computer is caused to execute, for performing the bit string search method according to claim 15.

17. An index key insert method, wherein a bit string search apparatus which searches for index keys based on a tree data structure that holds index keys composed of bit strings that are the object of searches by means of a search key composed of a bit string in accordance with the bit string search method according to claim 6 inserts a leaf node holding a desired insert key composed of a bit string as the index key into the coupled node tree, comprising:

a search step performing the bit string search method according to claim 6 by using the insert key as the search key and the root node as the search start node and reading out the search result key;

a comparison step performing a magnitude comparison and a bit string comparison between the search result key read out in the search step and the insert key;

an empty node pair obtaining step obtaining an empty array element pair to store the node pair and obtaining an array element number of one array element of the empty array element pair in which a primary node is stored;

a leaf node storage position determination step determining as to which of empty array elements in the empty array element pair obtained in the empty node pair obtaining step is to be the leaf node holding the insert key by means of the magnitude comparison in the comparison step;

a node pair insert position determination step reading out, by the relative positional relationship between the bit position of a first differing bit found in the bit string comparison at the comparison step and each of the discrimination bit positions of the branch nodes stored in the stack at the search step, a primary node indicator of one of the branch nodes and making the node stored in the array element pointed to by the primary node indicator an insertion position that is the link origin for the node pair to be stored in the empty array element pair obtained in the empty node obtaining step;

an insertion node pair generating step generating an insertion node pair by writing the node type indicating a leaf node into the area holding the node type of the leaf node arranged in the empty array element determined at the leaf node storage position determination step and writing the insert key into the area holding the index key, and reading out contents of the node stored in the array element pointed to by the primary node indicator read out at the node pair insert position determination step and writing the contents into the other array element of the empty array element pair; and a branch node generating step making the node stored in the array element pointed to by the primary node indicator read out at the node pair insert position determination step into a branch node by writing the node type indicating a branch node into the area holding the node type, writing the bit position of the first differing bit found in the bit string comparison at the comparison step into the area holding the discrimination bit position, and writing the array element number obtained at the empty node pair obtaining step into the area holding the array element number of the array element which holds a primary node of the node pair that is the link target.

18. A computer-readable storage medium storing a program that a computer is caused to execute, for performing the index key insert method according to claim 17.

19. An index key delete method, wherein a bit string search apparatus which searches for index keys based on a tree data structure that holds index keys composed of bit strings that are the object of searches by means of a search key composed of a bit string in accordance with the bit string search method according to claim 5 deletes a delete key which is a desired index key composed of a bit string from the coupled node tree by deleting a leaf node including the index key, comprising:
- a search step performing, using the delete key as the search key and the root node as the search start node, the string search method according to claim 5 wherein, instead of the branch nodes on the link path from the search start node to the leaf node being successively stored in a stack, link target nodes on the link path from the search start node to the leaf node being successively saved and information that indicates position of branch nodes each of which is located in direct upper level of each of the link target nodes being successively saved as a position information of a parent node:
- a node read-out step reading out, if the index key read out in the search step coincides with the delete key, contents stored in an area in which is arranged a node that configures a node pair with the leaf node that is an node being saved in the search step;
- a writing step writing the contents being read out in the node read-out step into a storage area indicated by the position information of the parent node being saved in the search step; and
- a node pair delete step releasing the pair of storage area in which the node pair is stored.

20. A coupled node tree splitting method for splitting a coupled node tree being used in a bit string search and having a root node as the starting point of the coupled node tree and node pairs which are configurational elements of the coupled node tree and which are two nodes, a primary node and a non-primary node, arranged in adjacent areas of storage, wherein
- the nodes have an area that holds the node type, which indicates whether the node is a branch node or a leaf node, and
- the branch node having, in addition to the node type, an area that holds a discrimination bit position of the search key and an area holding a coupled node indicator that is position information indicating the position of the primary node of a node pair that is a link target but not having an area holding an index key composed of a bit string that is an object of searches,
- the leaf node having, in addition to the node type, an area holding the index key composed of a bit string that is the object of searches but not having an area that holds a discrimination bit position of the search key nor an area holding the coupled node indicator, and
- enabling by repeating linkage, at the branch node, to a primary node or a non-primary node of a node pair of the link target from an arbitrary node of the coupled node tree as a search start node in accordance with a bit value of the search key at the discrimination bit position included in the branch node until the leaf node is reached,
- an index key stored in the leaf node to be made a search result key, which is a search result using the search key of an arbitrary subtree having the search start node as its root node, the method comprising:
- a split key obtaining step obtaining a split key that establishes an index key that splits a processing source coupled node tree that is to be split;
- a processing source minimum value or maximum value obtaining step obtaining a minimum value or a maximum value of the index keys of the processing source coupled node tree by linking to only the primary node of the two nodes forming the node pair or to only the non-primary node of the node pair respectively from the root node of the processing source coupled node tree until a leaf node is reached, and saving successively in a stack the branch nodes on the link path from the root node to the leaf node;
- a comparing step comparing the split key with either the minimum value or the maximum value and, if the minimum value is larger than the split key or if the maximum value is smaller than the split key, ending processing;
- a generating step that,
- if the result of the comparison is that the minimum value is not lager than the split key or the maximum value is not smaller than the split key, and
- if a processing target coupled node tree into which the minimum value or the maximum value is to be inserted as an index key does not exist,
- generates the processing target coupled node tree having, as the root node, a leaf node that holds the minimum value or the maximum value as the index key, and
- if the processing target coupled node tree exists
- generates a new processing target coupled node tree by inserting the minimum value or the maximum value as the index key into the processing target coupled node tree;
- a deleting step that deletes the minimum value or maximum value index key from the processing source coupled node tree by means of the index key delete method according to claim 19; and
- wherein
- by making the processing source coupled node tree from which has been deleted the minimum value or maximum value index key into a new processing source coupled node tree,
- the processing source minimum value or maximum value obtaining step, the comparing step, the generating step, and the deleting step are repeated until the minimum value or maximum value obtained by the processing source minimum value or maximum value obtaining step becomes larger than the split key or becomes smaller than the split key respectively.

21. A coupled node tree splitting method according to claim 20, wherein
- the coupled node trees is stored in an array and the coupled node indicator is an array element number of an array element in which is stored a primary node corresponding to the coupled node indicator, and a termination node with a discrimination bit position value of less than 0 is initially stored in the stack as a virtual branch node, and
- the generating step includes, if the processing target coupled node tree exists, a step that, setting the minimum value or the maximum value obtained at the processing source minimum value or maximum value obtaining step as an insert key of the processing target coupled node tree,
- executes a processing target maximum value or minimum value obtaining step obtaining a maximum value or a minimum value of the index keys of the processing target coupled node tree by linking to only the non-primary node of the node pair or to only the primary node of the node pair respectively from the root node of the processing source coupled node tree until a leaf node is reached, and saving successively in a stack the branch nodes on the link path from the root node to the leaf node, and performs a bit string comparison between the insert key and the maximum or minimum value of the index keys so as to obtain the highest bit position that differs between the values, and determines a processing target parent node, which is an insertion point of a node that includes a leaf node holding the insert key, from the relative positional relationship between the highest bit position and the discrimination bit positions of branch nodes stored in the stack, and making the processing target parent node into a branch node whose coupled node indicator is the array element number of the array element in which is stored the primary node of the node pair including the leaf node holding the insert key.

22. A coupled node tree splitting method according to claim 21, wherein the generating step further includes a step that sets the processing target parent node as a search start node, and the processing target maximum value or minimum value obtaining step is the process that obtains the maximum or minimum value of the index keys in the processing target coupled node tree by linking to only the non-primary node of the node pair or to only the primary node of the node pair respectively from the search start node until a leaf node is reached, and saving successively in a stack the branch nodes on the link path from the search start node to the leaf node.

23. A computer-readable storage medium storing a program that a computer is caused to execute, for performing the coupled node tree conjoining method according to claim 21.

24. A computer-readable storage medium storing a program that a computer is caused to execute, for performing the coupled node tree splitting method according to claim 20.

25. A coupled node tree conjoining method for conjoining two coupled node trees each of which is used in a bit string search and has a root node as the starting point of the coupled node tree and node pairs which are configurational elements of the coupled node tree and which are two nodes, a primary node and a non-primary node, arranged in adjacent areas of storage, wherein the nodes have an area that holds the node type, which indicates whether the node is a branch node or a leaf node, and the branch node having, in addition to the node type, an area that holds a discrimination bit position of the search key and an area holding a coupled node indicator that is position information indicating the position of the primary node of a node pair that is a link target but not having an area holding an index key composed of a bit string that is an object of searches, the leaf node having, in addition to the node type, an area holding the index key composed of a bit string that is the object of searches but not having an area that holds a discrimination bit position of the search key nor an area holding the coupled node indicator, and enabling by repeating linkage, at the branch node, to a primary node or a non-primary node of a node pair of the link target from an arbitrary node of the coupled node tree as a search start node in accordance with a bit value of the search key at the discrimination bit position included in the branch node until the leaf node is reached, an index key stored in the leaf node to be made a search result key, which is a search result using the search key of an arbitrary subtree having the search start node as its root node, the method comprising:

a processing source minimum value or maximum value obtaining step obtaining a minimum value or a maximum value of the index keys of a processing source coupled node tree by linking to only the primary node of the two nodes forming the node pair or to only the non-primary node of the node pair respectively from the root node of the processing source coupled node tree until a leaf node is reached, and saving successively in a stack the branch nodes on the link path from the root node to the leaf node;

an inserting step inserting the minimum or maximum value of the index keys of the processing source coupled node tree into a processing target coupled node tree, that is, another coupled node tree of the two coupled node trees by, using the minimum or maximum value of the index keys as an insert key, repeating linkage, at the branch node, to a primary node or a non-primary node of a node pair of the link target from the root node of the processing target coupled node tree as a search start node in accordance with a bit value of the insert key at a discrimination bit position included in the branch node, until the leaf node is reached, while successively saving in a stack the branch nodes on the link path from the search start node to the leaf node, and performing a magnitude comparison and bit string comparison between the insert key and the index key contained in the leaf node, and determining a position for insertion of a node pair that includes a leaf node including the insert key and another node by the relative positional relationship between a leading bit position at which the bit values differ in a bit string comparison and a discrimination bit position of a branch node stored in the stack, and determining, by the magnitude comparison, which node of the node pair to be inserted is the leaf node including the insert key;

a deleting step that deletes the minimum value or maximum value index key from the processing source coupled node tree by means of the index key delete method according to claim 19; and wherein by making the processing source coupled node tree from which has been deleted the minimum value or maximum value index key into a new processing source coupled node tree, the processing source minimum value or maximum value obtaining step, the inserting step, and the deleting step are repeated until the processing source coupled node tree is completely deleted.

26. A coupled node tree conjoining method according to claim 25, wherein the coupled node trees are stored in an array or two and the coupled node indicator is an array element number of an array element in which is stored a primary node corresponding to the coupled node indicator, and a termination node with a discrimination bit position value of less than 0 is initially stored in the stack as a virtual branch node.

27. A computer-readable storage medium storing a program that a computer is caused to execute, for performing the index key delete method according to claim 19.

28. A computer-readable storage medium storing a program that a computer is caused to execute, for performing the bit string search method according to claim 5.

29. A bit string search method wherein the bit string search apparatus according to claim 1 searches the index keys based on the coupled node tree data structure by means of a search key composed of a bit string, comprising:

a search start node read-out step obtaining the information indicating a position of a search start node which is an arbitrary node of the coupled node tree and reading out the search start node by means of the information indicating the position of the search start node;

a node type determination step reading out the node type from the area that holds the node type of the node and determining whether the node type indicates a leaf node or a branch node;

an index key read-out step reading out the index key from the area in the leaf node holding the index key;

a link step reading out the coupled node indicator from the area in the branch node holding the coupled node indicator, and reading out as link target only the primary nodes stored in the area indicated by the coupled node indicator that is read out, or reading out as the link target only the non-primary nodes stored in the area the position whereof obtained by a calculation based on the coupled node indicator that is read out; and wherein making, by the node type determination step, a determination of the node type of the search start node read out by the search start node read-out step, and if the node type indicates a leaf node, reading out, by the index key read-out step, the index key from the leaf node, and if the node type indicates a branch node, reading out, by the link step, the link target node and the determination of the node type, by the node type determination step, of the link target node read out being repeated until the node type indicates a leaf node, and reading out, by the index key read-out step, the index key from the leaf node, an index key stored in the leaf node read out in the index key read out step is obtained as a search result key, which is the minimum or maximum value of the index keys, of an arbitrary subtree of the coupled node tree having the search start node as its root node, saving successively in a stack the branch nodes on the link path from the search start node to the leaf node.

30. A bit string search method according to claim 29, wherein the coupled node tree is stored in an array and the coupled node indicator is an array element number of an array element in which is stored a primary node corresponding to the coupled node indicator, and a termination node with a discrimination bit position value of less than 0 is initially stored in the stack as a virtual branch node.

31. A bit string search method according to claim 30, wherein a coupled node indicator setting area is prepared for setting a coupled node indicator and a node position setting area is prepared for setting the bit value of the node position expressing whether a node is stored in the primary node side of the related node pair or in the non-primary node side, and the coupled node indicator setting area is initialized with the array element number of the array element holding the primary node of the node pair to which the search start node belongs, and the node position setting area is initialized with the bit value expressing the node position of the search start node, and the search start node is read out from the array by means of the initial value of the coupled node indicator setting area and of the bit value set in the node position setting area, and whenever a branch node links to the next node the bit value of the node position expressing the node position is primary node side or not is set in the node position setting area while the coupled node indicator of the branch node is set in the coupled node indicator setting area, and the node pair including the array element pointed to by the coupled node indicator set in the coupled node indicator setting area is read out, and the node in the node pair with the node position set in the node position setting area is made the link target.

32. A bit string search method according to claim 31, wherein when a branch node of a link source is stored in the stack, the bit value set in the node position setting area is added to the coupled node indicator of the branch node.

33. A bit string search method comprising:

an initial search step that acquires the minimum or maximum value of the index keys in the coupled node tree in accordance with the bit string search method according to claim 31;

a determination step that extracts a node from the stack after executing the initial search step or the next search step described later and determines whether the extracted node is a termination node;

a next search initializing step that decrements the bit value that expresses the node position from the value of the coupled node indicator of the extracted node and sets it as the array element number of the array element holding the primary node of the node pair to which the next search start node belongs while setting in the node position setting area a bit value expressing that the node position is not that of the primary node side or a bit value expressing that the node position is that of the primary node side; and a next search step that acquires the minimum or maximum value of the index keys in the coupled node tree based on the settings of the next search initializing step in accordance with the bit string search method according to claim 31; and wherein, by repeating the determination step, the next search initializing step, and the next search step until the determination in the determination step is that the node extracted from the stack is a termination node, the index keys stored in the coupled node tree are extracted in ascending order or descending order.

34. A bit string search method for searching for index keys based on a tree data structure that holds index keys composed of bit strings that are the object of searches by means of a search key composed of a bit string, wherein the tree is a coupled node tree having a root node as the starting point of the tree and node pairs which are configurational elements of the tree and which are two nodes, a primary node and a non-primary node, arranged in adjacent areas of storage, and the nodes have an area that holds the node type, which indicates whether the node is a branch node or a leaf node, the branch node having, in addition to the node type, an area that holds a discrimination bit position of the search key and an area holding a coupled node indicator that is position information indicating the position of a primary node of a node pair that is a link target but not having an area holding an index key composed of a bit string that is an object of searches, and the leaf node having, in addition to the node type, an area holding the index key composed of a bit string that is the object of searches but not having an area that holds a discrimination bit position of the search key nor an area holding the coupled node indicator, and wherein the coupled node tree is stored in an array and the coupled node indicator is an array element number of an array element in which is stored a primary node corresponding to the coupled node indicator, the method comprising:

a prefix match key acquiring step that acquires a prefix match key specifying a prescribed number of higher level significant bits;

a lower limit key generating step that generates a lower limit key wherein all bit values of the prefix match key other than the significant bits are replaced with the value "0";

a lower limit value acquiring step that acquires a lower limit value by performing a bit string search method including steps of a search result key acquiring step that acquires a search result key by performing a bit string search method based on the coupled node tree data structure, using the lower limit key as the search key, including sub-steps of a root node read-out sub-step reading out the root node by means of the information indicating the position of the root node, a node type determination sub-step reading out the node type from the area that holds the node type of the node and determining whether the node type indicates a leaf node or a branch node, an index key read-out sub-step reading out the index key from the area in the leaf node holding the index key, a link sub-step reading out the discrimination bit position and the coupled node indicator from the area in the branch node holding the discrimination bit position and from the area holding the coupled node indicator respectively, and obtaining information indicating the node position of one of the nodes of a node pair by a calculation with the bit value in the search key at the discrimination bit position read out and the coupled node indicator, and, from a storage area indicated by the obtained information indicating the node position, reading out the node stored in the storage area as the link target node, and wherein making, by the node type determination sub-step, a determination of the node type of the root node read out by the root node read-out sub-step, and if the node type indicates a leaf node, reading out, by the index key read-out sub-step, the index key from the leaf node, and if the node type indicates a branch node, reading out, by the link sub-step, the link target node and the determination of the node type, by the node type determination sub-step, of the link target node read out are repeated until the node type indicates a leaf node, and reading out, by the index key read-out sub-step, the index key from the leaf node, an index key stored in the leaf node is obtained as the search result key, saving successively in a stack the branch nodes on the link path from the root node to the leaf node, and wherein a termination node with a discrimination bit position value of less than 0 is initially stored in the stack as a virtual branch node and a coupled node indicator setting area is prepared for setting a coupled node indicator and a node position setting area is prepared for setting the bit value of a node position expressing whether a node is stored in the primary node side of the related node pair or in the non-primary node side, and the coupled node indicator setting area is initialized with the array element number of the array element holding the primary node of the node pair to which a search start node belongs, and the node position setting area is initialized with the bit value expressing the node position of the search start node, and whenever a branch node links to the next node the bit value of the search key at the discrimination bit position of the branch node is set in the node position setting area while the coupled node indicator of the branch node is set in the coupled node indicator setting area, and the node pair including the array element pointed to by the coupled node indicator that is set in the coupled node indicator setting area is read out, and the node in the node pair with the node position set in the node position setting area is made the link target, a determination step that determines whether the search result key is equal to or larger than the lower limit key, a node extraction step that successively extracts nodes stored in the stack until the node position of the node pointed to by the coupled node indicator of the extracted node becomes that of a primary node side and obtains the node whose coupled node indicator points to the node whose node position is that of the primary node side, a minimum value search initializing step that sets the coupled node indicator of the obtained node as the array element number of the array element holding the primary node of the node pair to which the search start node belongs while setting into the node position setting area as the node position, the value expressing that a node is the non-primary node side, a minimum value search step that acquires as a search result key a minimum value of the index keys, based on the settings of the minimum value search initializing step, by means of a bit string search method that performs a step of linking to only a primary node of the node pair from the search start node until a leaf node is reached and an index key stored in the leaf node is obtained as the search result key, while saving successively in a stack the branch nodes on the link path from the search start node to the leaf node, and wherein when the determination is made in a first time determination of the determination step that the search result key coincides with the lower limit key, the search result key is set as the lower limit value corresponding to the lower limit key, and when the determination is made that the search result key is smaller than the lower limit key, the determination step, the node extraction step, the minimum value search initializing step, and the minimum value search step are repeated until a determination is made in the determination step that the search result key is larger than the lower limit key, and the search result key determined to be larger than the lower limit key is set as the lower limit value corresponding to the lower limit key;

a node extracting step that successively extracts nodes stored in the stack until the discrimination bit position of the extracted node is equal to or lower than the bit position of the end of the significant bits of the prefix match key and obtains the node that has a discrimination bit position equal to or lower than the bit position of the end of the significant bits of the prefix match key;

a search start node setting step that, if the obtained node is a termination node, sets the root node as the search start node and, if the obtained node is not a termination node, sets the node pointed to by the coupled node indicator of the obtained node as the search start node; and an index key extracting step that extracts index keys in ascending order using the search start node in accordance with the bit string search method according to claim 33 so as to obtain index keys whose higher level bit values within the prescribed number of bits coincide with the search key.

35. A computer-readable storage medium storing a program that a computer is caused to execute, for performing the bit string search method according to claim 34.

36. A computer-readable storage medium storing a program that a computer is caused to execute, for performing the bit string search method according to claim 33.

37. A computer-readable storage medium storing a program that a computer is caused to execute, for performing the bit string search method according to claim 29.

38. A coupled node tree splitting method for splitting a coupled node tree being used in a bit string search and having a root node as the starting point of the coupled node tree and node pairs which are configurational elements of the coupled node tree and which are two nodes, a primary node and a non-primary node, arranged in adjacent areas of storage, wherein the nodes have an area that holds the node type, which indicates whether the node is a branch node or a leaf node, and the branch node having, in addition to the node type, an area that holds a discrimination bit position of the search key and an area holding a coupled node indicator that is position information indicating the position of the primary node of a node pair that is a link target but not having an area holding an index key composed of a bit string that is an object of searches, the leaf node having, in addition to the node type, an area holding the index key composed of a bit string that is the object of searches but not having an area that holds a discrimination bit position of the search key nor an area holding the coupled node indicator, and enabling by repeating linkage, at the branch node, to a primary node or a non-primary node of a node pair of the link target from an arbitrary node of the coupled node tree as a search start node in accordance with a bit value of the search key at the discrimination bit position included in the branch node until the leaf node is reached, an index key stored in the leaf node to be made a search result key, which is a search result using the search key of an arbitrary subtree having the search start node as its root node, the method comprising:

a split key obtaining step obtaining a split key that establishes an index key that splits a processing source coupled node tree that is to be split;

a search step obtaining the split key as a search result key by searching the processing source coupled node tree using the split key as the search key and the root node as the search start node and saving successively in a stack the branch nodes on the link path from the root node to the leaf node including the split key as the index key, while changing the coupled node indicators of the branch nodes to the position information that indicates the position of one node of the node pair that is the link target corresponding to the bit value in the search key at the discrimination bit position;

a split node obtaining step successively reading out the branch nodes stored in the stack until the read-out branch node becomes a branch node whose coupled node indicator points to a primary node or until the read-out branch node becomes a branch node whose coupled node indicator points to a non-primary node, and obtaining the pointed primary node or the pointed non-primary node as a split node;

a generating step, if a processing target coupled node tree into which a split node tree that is a subtree of the processing source coupled node tree having the split node as the root node does not exist, making the processing target coupled node tree by the split node tree, and if the processing target coupled node tree exists, generating a new processing target coupled node tree by inserting the split node tree;

a deleting step that deletes the split node tree from the processing source coupled node tree.

39. A coupled node tree splitting method according to claim 38, further includes a next split node obtaining step successively reading out the branch nodes stored in the stack that have been stacked before the split node until a read-out branch node becomes a node whose coupled node indicator points to a non-primary node or until the read-out branch node becomes a node whose coupled node indicator points to a primary node, and obtaining as a split node a node paired with the pointed non-primary node or a node paired with the pointed primary node, and the generating step and deleting step are repeated using the next split node as the split node.

40. A coupled node tree splitting method according to claim 39, wherein the coupled node tree is stored in an array and the coupled node indicator is an array element number of an array element in which is stored a primary node corresponding to the coupled node indicator, and a termination node with a discrimination bit position value of less than 0 is initially stored in the stack as a virtual branch node.

41. A computer-readable storage medium storing a program that a computer is caused to execute, for performing the coupled node tree splitting method according to claim 38.

42. A coupled node tree conjoining method for conjoining two coupled node trees each of which is used in a bit string search and has a root node as the starting point of the coupled node tree and node pairs which are configurational elements of the coupled node tree and which are two nodes, a primary node and a non-primary node, arranged in adjacent areas of storage, wherein the nodes have an area that holds the node type, which indicates whether the node is a branch node or a leaf node, and the branch node having, in addition to the node type, an area that holds a discrimination bit position of the search key and an area holding a coupled node indicator that is position information indicating the position of the primary node of a node pair that is a link target but not having an area holding an index key composed of a bit string that is an object of searches, the leaf node having, in addition to the node type, an area holding the index key composed of a bit string that is the object of searches but not having an area that holds a discrimination bit position of the search key nor an area holding the coupled node indicator, and enabling by repeating linkage, at the branch node, to a primary node or a non-primary node of a node pair of the link target from an arbitrary node of the coupled node tree as a search start node in accordance with a bit value of the search key at the discrimination bit position included in the branch node until the leaf node is reached, an index key stored in the leaf node to be made a search result key, which is a search result using the search key of an arbitrary subtree having the search start node as its root node, the method comprising:

a processing source maximum value or minimum value obtaining step obtaining a maximum value or a minimum value of the index keys of a processing source coupled node tree that is one coupled node tree of the two coupled node trees by linking to only the non-primary node of the two nodes forming the node pair or to only the primary node of the node pair respectively from the root node of the processing source coupled node tree until a leaf node is reached, and saving successively in a stack the branch nodes on the link path from the root node to the leaf node, while changing the coupled node indicators of the branch nodes to the position information that indicates the position of one node of the node pair that is the link target corresponding to the bit value in the search key at the discrimination bit position;

a processing target minimum value or maximum value obtaining step obtaining a minimum value or a maximum value of the index keys of a processing target coupled node tree that is another of the two coupled node trees by linking to only the primary node of the two nodes forming the node pair or to only the non-primary node of the node pair respectively from the root node of the processing target coupled node tree until a leaf node is reached, and saving successively in a stack the branch nodes on the link path from the root node to the leaf node, while changing the coupled node indicators of the branch nodes to the position information that indicates the position of one node of the node pair that is the link target corresponding to the bit value in the search key at the discrimination bit position;

a difference bit position acquiring step that determines a difference bit position between the maximum value or minimum value of the index keys obtained in the processing source maximum or minimum value obtaining step and the minimum value or maximum value of the index keys obtained in the processing target minimum or maximum value obtaining step;

a split/conjoin node acquiring step that determines a split/conjoin node, which is the root node of the subtree that is to be split from the processing source coupled node tree and conjoined to the processing target coupled node tree, based on the difference bit position acquired in the difference bit position acquiring step;

a conjoining position acquiring step that determines a conjoining position in the processing target coupled node tree for conjoining the split/conjoin node obtained in the split/conjoin node acquiring step, based on the difference bit position acquired in the difference bit position acquiring step;

an inserting step that inserts the split/conjoin node obtained in the split/conjoin node acquiring step at the conjoining position of the processing target coupled node tree obtained in the conjoin position acquiring step; and a deleting step that deletes the split/conjoin node obtained in the split/conjoin node acquiring step from the processing source coupled node tree.

43. A coupled node tree conjoining method according to claim 42, wherein the coupled node indicator is an array element number of an array element in which is stored a primary node corresponding to the coupled node indicator, and a termination node with a discrimination bit position value of less than 0 is initially stored in the stack as a virtual branch node.

44. A coupled node tree conjoining method according to claim 43, wherein the split/conjoin node acquiring step extracts the branch nodes stored in the stack of the processing source coupled node tree until a discrimination bit position of a branch node is a higher position than the difference bit position, and the node stored in the array element with the array element number in the coupled node indicator of the extracted node is obtained as the split/conjoin node, and the conjoining position acquiring step extracts the branch nodes stored in the stack of the processing target coupled node tree until a discrimination bit position of a branch node is a higher position than the difference bit position, and obtains as the conjoining position a node stored in the array element having as its array element number the coupled node indicator of the extracted branch node.

45. A computer-readable storage medium storing a program that a computer is caused to execute, for performing the coupled node tree conjoining method according to claim 42.

* * * * *